United States Patent [19]

Chirokas et al.

[11] Patent Number: 5,111,397

[45] Date of Patent: May 5, 1992

[54] MANAGING LENGTHY FOOTNOTES IN A WORK PROCESSING DOCUMENT

[75] Inventors: David S. Chirokas, Arlington; Daniel G. Michaud, Methuen, both of Mass.; Arthur P. McDeed, III, Nashua, N.H.; Michael J. Shiel, Lunenburg; G. Michael Soper, Tyngsboro, both of Mass.; Dennis R. Mascio, Kingston, N.H.

[73] Assignee: Wang Laboratories, Inc., Lowell, Mass.

[21] Appl. No.: 449,693

[22] Filed: Dec. 11, 1989

[51] Int. Cl.$^5$ ................................................ G06F 9/00
[52] U.S. Cl. ................................................ 364/419
[58] Field of Search ................... 364/419, 200, 900

[56] References Cited

U.S. PATENT DOCUMENTS

| 4,503,515 | 3/1985 | Cuan et al. | 364/900 |
| 4,648,067 | 3/1987 | Repass et al. | 364/900 |
| 4,648,071 | 3/1987 | Repass et al. | 364/900 |

Primary Examiner—Dale M. Shaw
Assistant Examiner—Andrew Bodendorf
Attorney, Agent, or Firm—Michael H. Shanahan

[57] ABSTRACT

A footnote utility manages lengthy footnotes which extend beyond the body text page where they are first mentioned. Certain first and second style requirements are used for assembling body and footnote text into a final document. Each page contains at least one line of body text and portions of the text of each footnote referenced in that text.

9 Claims, 12 Drawing Sheets

MANAGING LENGTHY FOOTNOTES IN A WORD PROCESSING DOCUMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to a footnoted document prepared by a word processing application program, and more specifically, to managing lengthy footnotes which extend beyond the page where they are first referenced.

Several prior art word processing application programs which are commercially available have the ability for handling footnotes. Typically, these programs run on digital computers such as microprocessor-based machines (also known as personal computers) and minicomputers. An operator (user) provides textual input to the program usually via a typewriter keyboard. The text received as input by the program is subsequently displayed and various editing capabilities are permitted for changing the displayed text or adding new text. As is the normal procedure, the operator types in the main body text of the document being produced until a footnote reference point is reached. At the footnote reference point, a menu is called from which a footnote task is selected. This causes the display to change to a footnote text display and the operator then types in the footnote text. Various editing capabilities are also available for changing the footnote text being displayed or for adding new footnote text. The operator can then recall the body text display and continue typing further body text until the next footnote reference point is reached.

After all the body and footnote texts have been entered into the program, the operator then selects an operation which causes the program to assemble all body and footnote texts into respective pages of a final output document. This output document can be displayed for any further review and editing as desired before printing.

This arrangement is satisfactory if all referenced footnotes fit on the bottom of an output page of the output document. However, problems may arise when a footnote is lengthy and its entire text does not fit on the page where it is first referenced. As further explanation, there is a general rule of document style that all footnotes should appear on the same page containing the body text where they referenced. In the situation where a first footnote is referenced and only part of the footnote text fits on the remaining lines available on that page, it is known to continue the remaining footnote text on as many subsequent pages as needed to complete the footnote. If a second or additional footnote references are also on the same body text line containing the first footnote reference, the text of these other footnotes will not appear on the same page where they are referenced. This violation of the general rule of style can also result if a line of body text contains several footnote references and the text of an intermediate footnote fills the page so that the remaining footnotes must therefore appear on some other page or pages.

Another problem which can occur relates to lengthy footnotes having text that require more than two pages to complete. One particular prior art word processing application program will complete the footnote text on as many pages as needed and then continue with body text on the page having space for that body text. However, this arrangement violates a preference of many users who would like to have body text appearing on each and every page (except the last page) of the final document regardless of the amount of associated footnote text in those pages.

In other prior art word processing programs, body text is always on every page because they place a maximum line limitation on each page for footnote text. As can be understood, this arrangement can still result in footnotes not appearing on the page where referenced if the text of a footnote continued from a previous page exhausts the maximum line limitation of the present page. Alternatively, the text of a footnote referenced on the present page can also exhaust the maximum line limit preventing any remaining footnotes referenced on the present page from being included on that page.

Accordingly, even though prior art word processing application programs are satisfactory for handling many situations relating to footnotes, there is a need for an improved program which avoids certain style violation problems associated with lengthy footnotes. In particular, it is desirable for all footnotes to at least begin on the page where they are referenced and for all pages of the final document to include some body text.

SUMMARY OF THE INVENTION

The above mentioned problems and disadvantages of prior art arrangements for handling lengthy footnotes are overcome by the provision of a new and improved footnote handling application made in accordance with the teachings of the present invention. In a preferred embodiment, the present invention is part of a pagination/repagination utility program which produces the output pages of the final output document one page at a time so that certain rules of style are maintained. These rules include the following listed set of first style requirements: (A) a lengthy footnote is continued on as many pages as necessary to complete it, (B) at least two (2) lines of that lengthy footnote must appear on the initial page where it is first referenced, (C) at least two (2) lines of it must appear on every page on which that footnote is continued but is still incomplete, (D) a page must always contain at least one line of body text, and (E) every referenced footnote on a present page must have at least two (2) lines of text on the page (except where the footnote has only one line of text), in addition to the lines of other footnotes which are being continued on the present page from a previous page.

Thereafter, if all of the above mentioned first style requirements have been met and the output page being presently assembled still has vacant space for more lines of text, second style requirements are used wherein lines of lengthy footnote text are given priority over any subsequent lines of body text and are inserted according to the order of footnote references. As a result, the vacant space on the output page will be used first for lines of text of the incomplete footnote having the earliest reference. If space is still available, then the text of the next referenced incomplete footnote is inserted in the output page. This process continues with the succeeding incomplete footnotes in respective order so long as vacant space is available.

It should be pointed out that incomplete footnotes include not only those which are continued from previous pages but also those which start on the present output page. These latter footnotes are incomplete since only two lines of text were used when the first style requirements were processed Thus, when one or more of the incomplete footnotes can be completed on the present output page, they will be completed in the order of their reference in the body text. If all incomplete footnotes are completed on the present output page and space is still available, that additional space will be then used for the whatever succeeding lines of body text which will fit in that additional space.

However, if one of the succeeding lines of body text includes one or more new footnote references, then the configuration of the present output page with the footnote text as described above and the body text including only up to the line just prior to the one body line having the new footnote references is temporarily saved. The present output page configuration with the lines of body text inserted as discussed above to fill the available space is then reassembled starting with the first style requirements. If any of the first style requirements are not met, then the previously saved configuration of the output page becomes part of the final document. In that case, assemblage of the next output page is begun which will necessarily starts with the one body line having the aforementioned one or more new footnotes. On the other hand, if the re assemblage is successful with respect to the first style requirements, then the saved output page configuration is discarded. The reassembled page becomes the output page being assembled and assembly continues with the process relating to the second style requirements described above. In that case, if still more vacant space is available after all incomplete footnotes have been completed on the output page, then another line of body text is added. If that next line of body text includes new footnote references, then the previously described re-assemblage process is used.

After all output pages have been assembled into a final document, that document can then be displayed for review or used for printing. Alternatively, the final document can be filed away for subsequent retrieval and use.

BRIEF DESCRIPTION OF THE DRAWINGS

The various features of the present invention may be more fully understood from the following description when read together with the accompanying drawings in which.

DESCRIPTION OF THE PREFERRED EMBODIMENTS

Figure 1:
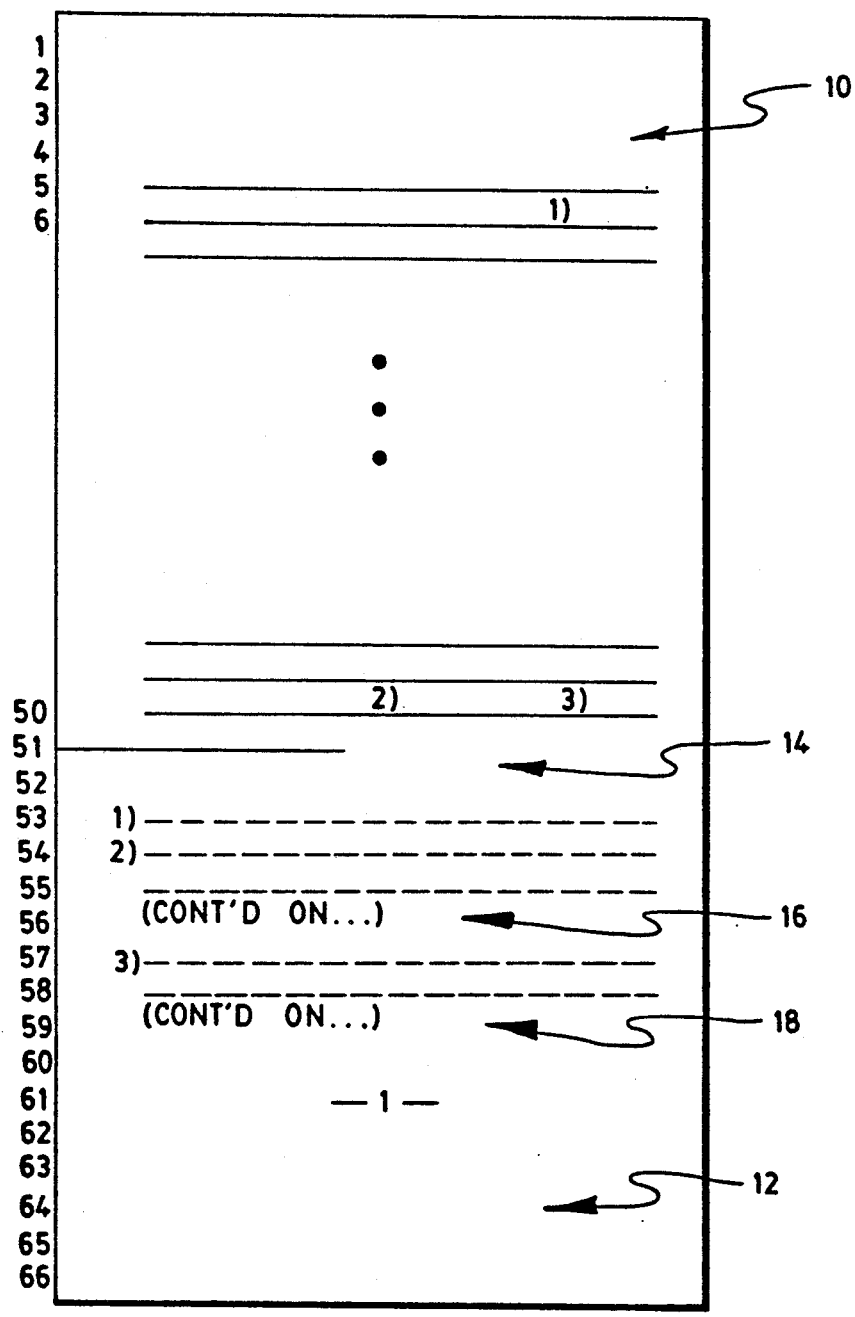
FIG. 1 is a page of the final document produced by an embodiment of the present invention.

Word processing application programs are well known in the prior art. As previously mentioned, many of these programs are commercially available with footnote utilities that can produce a final output document having referenced footnotes at the end of each page. One such commercial product is the WP Plus application program made by the same Assignee as for the present invention.

Three references which provide detailed descriptions of various prior art footnote utilities are U.S. Pat. No. 4,403,515 entitled "Footnote Assembly Management," U.S. Pat. No. 4,648,067 entitled "Footnote Management For Display and Printing," and U.S. Pat. No. 4,648,071 entitled "Designation of Footnotes and Footnote Reference." All of these patents are respectively assigned to International Business Corporation (IBM). However, neither the WP Plus product nor the three patents disclose or suggest how to prevent a lengthy footnote from displacing other footnotes from the page in which those other footnotes are referenced Depicted in FIGS. 1 through 4 are assembled output pages 1, 2, 3 and 4 of a final output document. The output document is produced by a word processing program which includes a pagination/repagination utility that assembles user inputted body text, footnote references and footnote text into final output pages of a final output document The manner in which the pagination/repagination utility handles lengthy footnotes and the resulting arrangement of such footnotes is in accordance with the teachings of the present invention. As is typical for a word processing program, a user creates an input document via keystrokes. That input document contains body and footnote text alongwith footnote references at places in the body text where footnotes are to be associated. The pagination/repagination utility then can be chosen by a user for rearranging the input document into final pages of the output document.

It should be explained that the solid lines in the output pages 1-4 of FIGS. 1 through 4 represent body text and dashed lines represent footnote text. It is assumed for illustrative purposes and for ease of explanation that the final output document comprises four final pages. It is further assumed that line numbers are shown on the left side of a page, each page is assumed to contain 66 lines of space from top to bottom, a conventional header area 10 extends between lines 1-4, and a conventional footer area 12 extends from lines 60-66. As can be seen, the page numbers of each respective page is provided in the footer area with dashes placed respectively before and after each page number.

A conventional footnote separator 14 is shown in each page for dividing the body text (corresponding to the solid lines shown in the Figures attached to this description) from the footnote text (corresponding to the dashed lines) In this description, the separator 14 preferably includes a line of graphic symbols (which in the Figures is a solid line extendinq a prescribed number of character spaces) and ending with another blank line. As a result of the above, the output pages of the present discussion each has 53 lines (of the 66 lines in total) available for both body and footnote texts.

Before a detailed description of the present invention is given, it is believed that a review of the output produced by the present invention would be instructive As already mentioned, pages 1-4 of FIGS. 1 through 4 were produced by a footnote handling utility based on the teachings of the present invention. Used for producing the output document a page at a time from the input document, that utility starts by assembling the first output line at a time according to the first and second style requirements that are listed in the SUMMARY OF THE INVENTION section of the present application.

In FIG. 1, page -1- of the output document contains 46 lines of body text with 3 footnote references 1), 2) and 3) The text of Footnote 1) requires only a single line, but the texts of Footnotes 2) and 3) are lengthy and do not fit in the space remaining on page -1-. It should be noted that the present invention has provided, as a result of the first style requirements, at least two lines of text for the lengthy footnotes (Footnotes 2) and 3)) alongwith continuation messages 16 and 18 Although the use of a CONTINUED TO message for referring a reader to the another page is well known, it is believed that no other prior art program will provide two (or more) of such messages on the same output page.

Figure 2:
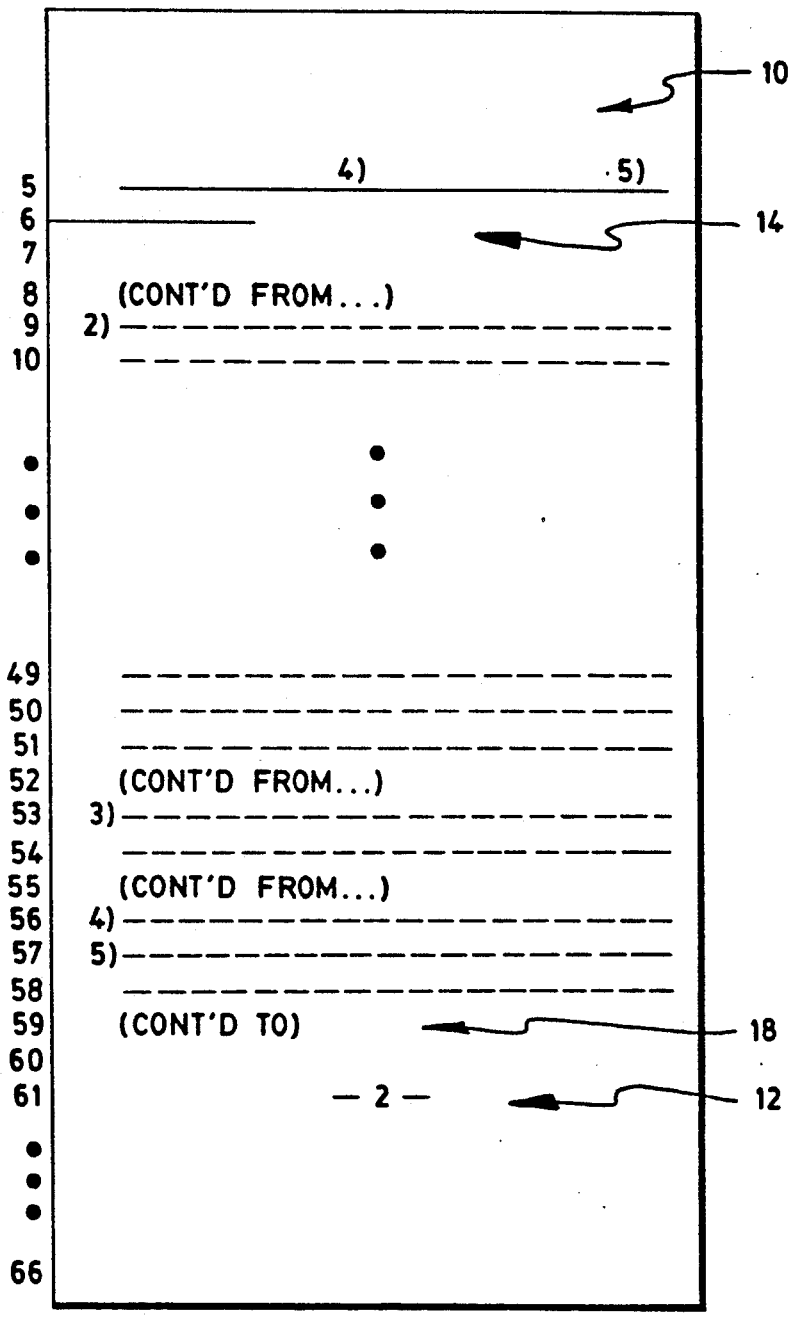
FIG. 2 is a second page of the final document

In FIG. 2 the minimum single line of body text is provided and no more was assembled because the aforementioned second style requirements give priority to footnote text before a second line of body text. In this example the remaining lines of the page are all needed for footnotes whether for footnotes continuing from page -1 or for new Footnotes 4) and 5) referenced on page 2 line 6. Accordingly, other results of the second style requirements should be explained. Specifically, after the minimum two lines of every footnote has been processed and the single line of footnote 4) has been included, the remaining vacant lines of the output page -2- are first used for footnote 2), which is shown to be completed. The remaining vacant lines are then used for continuing more text of Footnote 3) and no more is available for more text of incomplete footnote 5).

Figure 3:
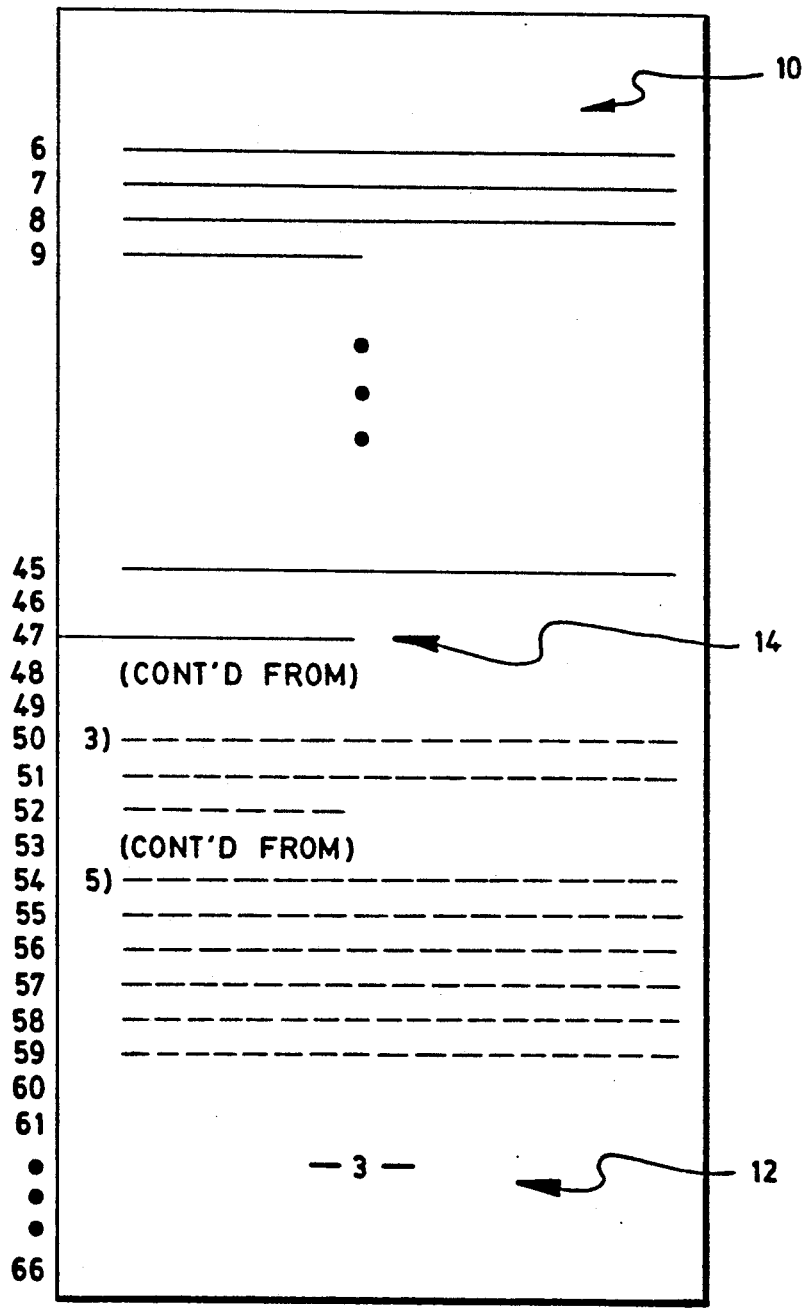
FIG. 3 is a third page of the final document.
Figure 4:
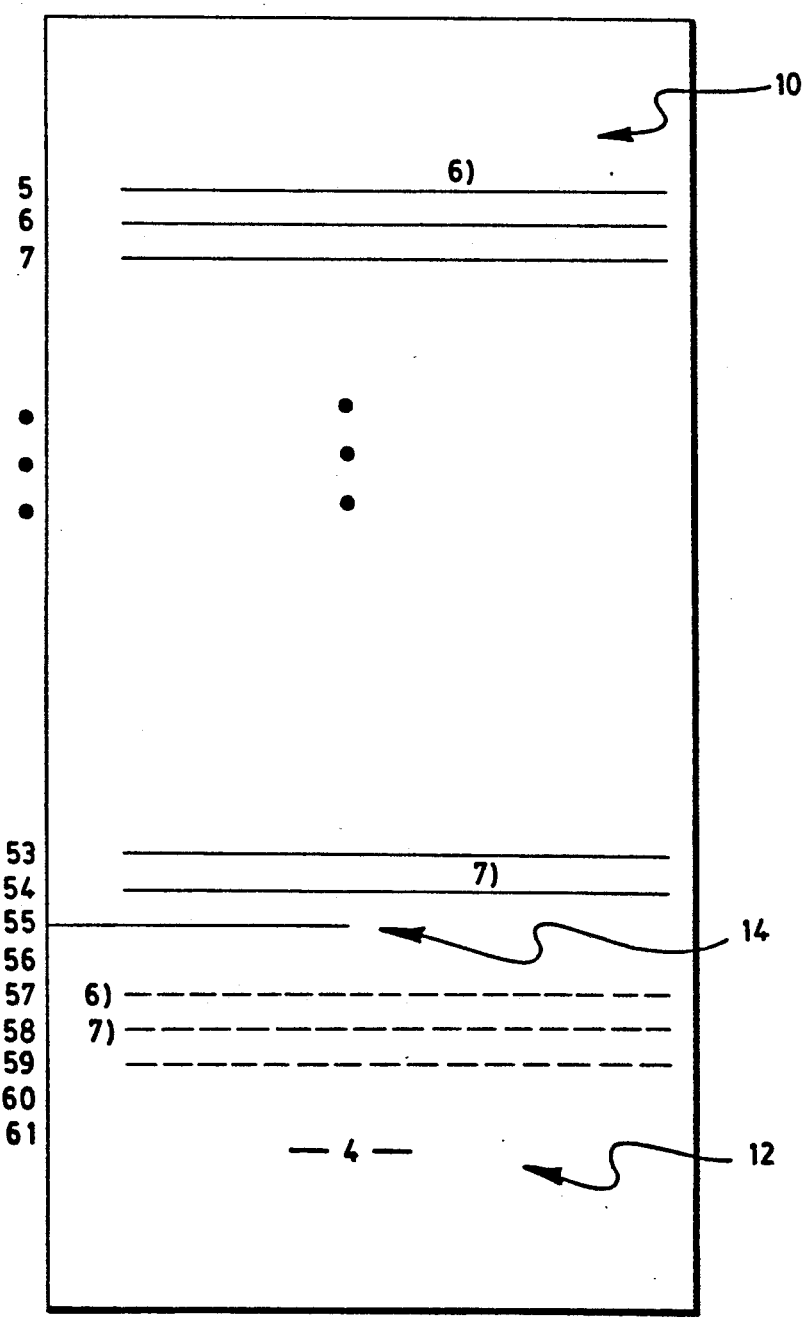
FIG. 4 is a fourth page of the final document.

With reference to FIG. 3, Footnotes 3) and 5) are completed in page 3 and more lines of body text are inserted since no further footnotes were in those body text lines. However, it should be noted that page 3 line 46 is blank. Ordinarily, another line of body text could be inserted if that line did not result in any violations of the style requirements. In page 4- shown in FIG. 4, the next body text line includes footnote reference 6). As a result, this next line cannot be placed in page -3- since that would exhaust the space available and leave no room for the text of Footnote 6).

Figure 5:
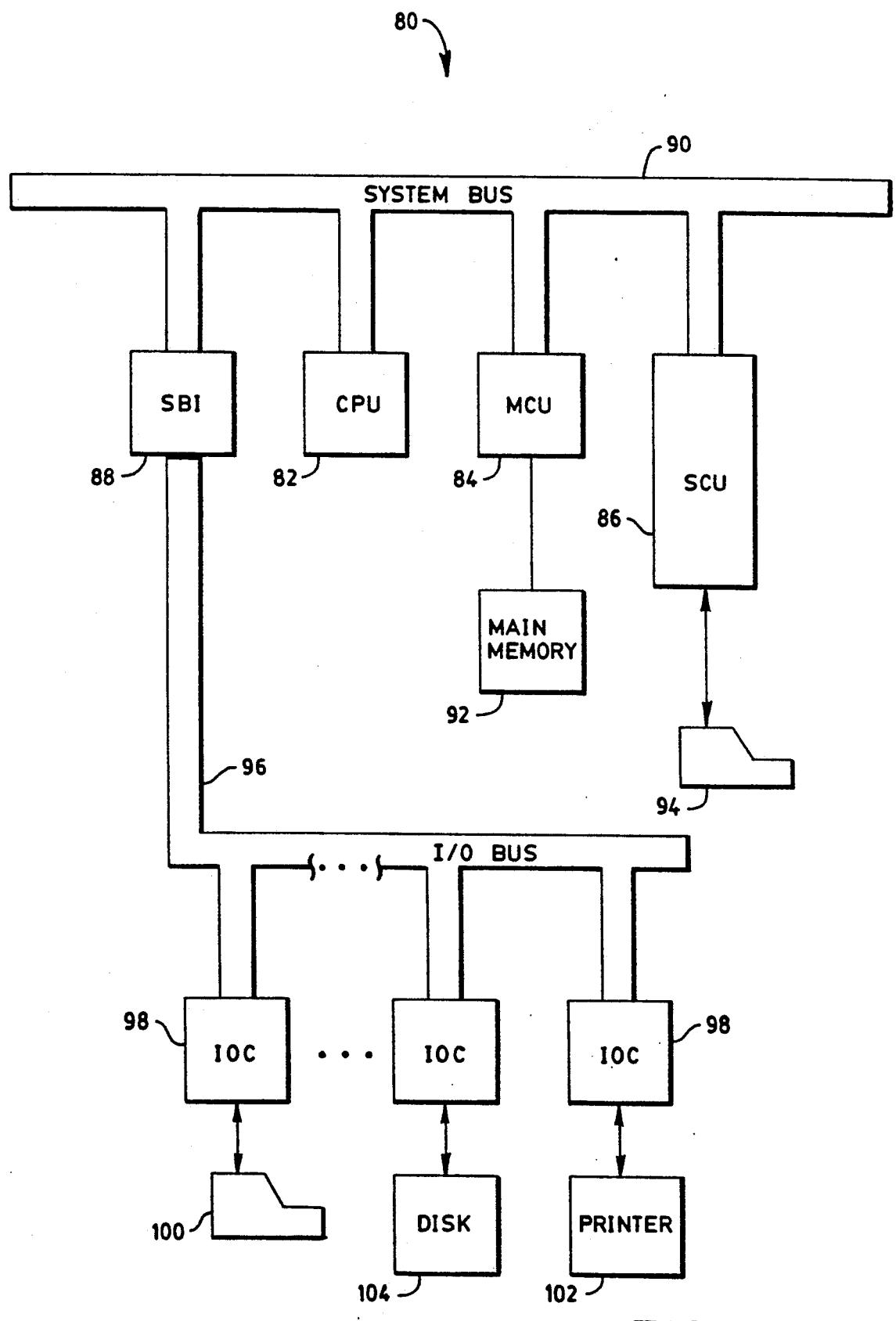
FIG. 5 is a block diagram of a minicomputer on which the preferred embodiment of the present invention is used.
Figure 6:
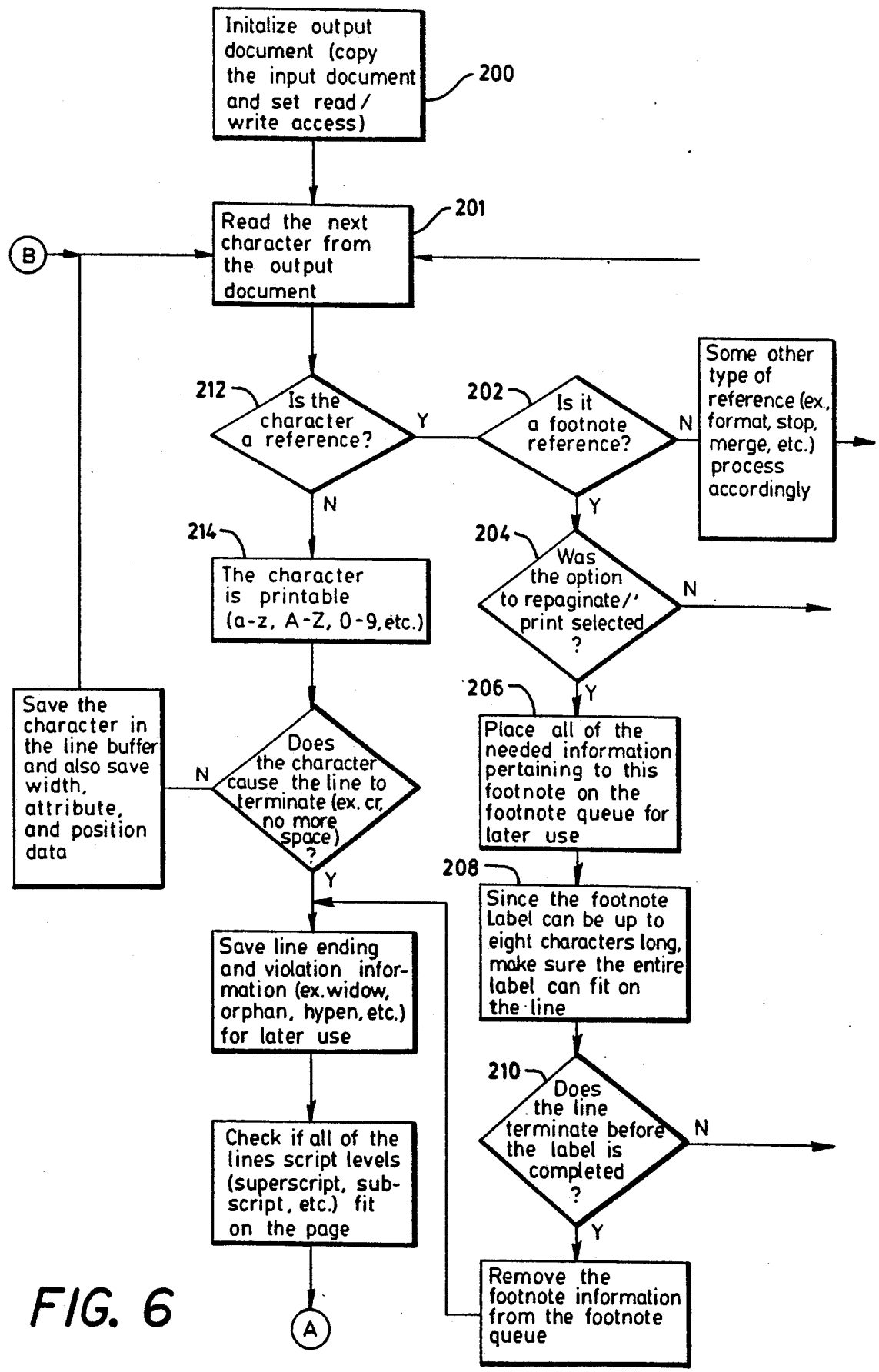
FIGS. 6, 7A-B, 8, 9 and 10 depict a flow chart of a computer program made in accordance with the teachings of the present invention.

An actual working version of the present invention was implemented in a WP Plus program operating in a VS minicomputer. Since it is a conventional and commercially available digital computer, only a brief description of the VS minicomputer will be given. Depicted in FIG. 5 is a block diagram showing the major components and architecture of a typical VS minicomputer system 80. A central processing unit (CPU) 82 is coupled to a memory control unit (MCU) 84, a support control unit (SCU) 86 and a system bus interface 88 via a system bus 90. The MCU 84 manages all access to a main memory 92. The SCU 86 includes a system console 94 and functions as a diagnostic processor. When other processors or components in the minicomputer system detect an error, they alert the SCU 86 which records the error. The SCU can also serve as an active user workstation if necessary.

An input/output (I/0) bus 96 is connected to the system bus interface (SBI) 88 and to a series of input output controllers (IOC s) 98. The SBI 88 translates data and commands traveling on the I/0 bus 96 into the proper format so that they can transmitted on the higher capacity system bus 90. Various peripheral devices such as workstation 100, printer 102 and disk drive memory device 104 are connected to their respective IOC's 98. During the usual input/output operation, the CPU 82 designates an area in main memory 92 for holding data which is either going outbound to a peripheral device or for receiving data inbound from a peripheral device. The IOC 98 associated with the peripheral device is then given specific instructions as to the data location and the device that will be sending or receiving the data.

FIGS. 6-10 show a flow chart of a program which implements the present invention. Starting with block 200 and continuing as indicated in the flows depicted in FIG. 6, the program is assembling from the original document (which is the input document created by the user) a line of body text for the final output document. When the program flows through blocks 202, 204 and 206, footnote references and other relevant information about the referenced footnotes are saved for later use.

It should be explained that blocks 208 and 210 relate to a feature of the actual working embodiment of the present invention wherein the footnote reference can be a label. Being an alternative to the usual numerical or alphabetical footnote character, this label can be up to 8 alphanumeric characters. Special procedures are needed for determining if the label will fit on the line being assembled.

The flow path extendinq from block 212 and through block 214 relate to conventional procedures for processing the body text line. The present invention does not change those operations. However, when the flow path proceeds to block 300 of FIG 7A and the line being assembled does not fit on the output page, the path leads to block 310 where the program recalls the "last good line" which is the last line of body text that did not violate any rules of style. The output page then ends with the recalled "last good line." Continuing along this path results in the footnotes that were processed after the last good line to be removed from the footnote queue. Those removed footnotes are then available for inclusion in the next output page to be assembled. The other blocks along this path starting with block 311 relate to concerns which do not directly involve the present invention If the line of text does fit on the output page being assembled, the program proceeds from block 300 through blocks 312 and 314 where checks are made for any footnotes referenced on the line or for the existence of any cascading footnotes. Cascading footnotes are those which have lengthy text that started in a previous page and continue in the present page being assembled. If there are footnotes, the Rfootnotes() routine of block 316 is used to process them. That routine will be described later in connection with FIG. 8.

When the program proceeds to block 318 and it is determined that two lines of each footnote and the associated continuation messages (if needed) do not fit on the page, then the previously mentioned "last good line" procedure of block 310 is used. Otherwise, block 320 is executed and a description of its function will be better understood in connection with the discussion to be given for the Rfootnotes() routine.

Figure 7A:
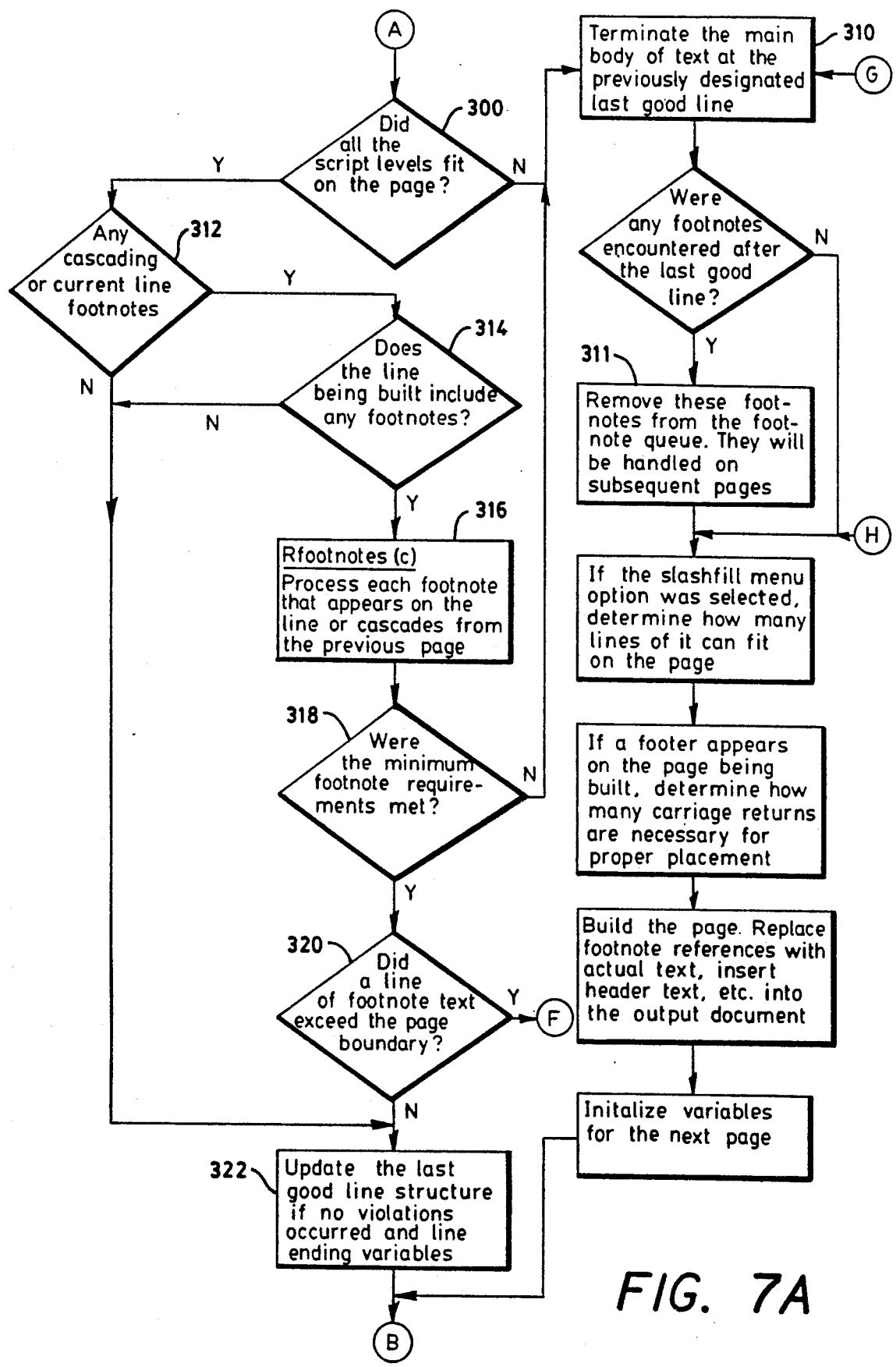
Figure 7B:
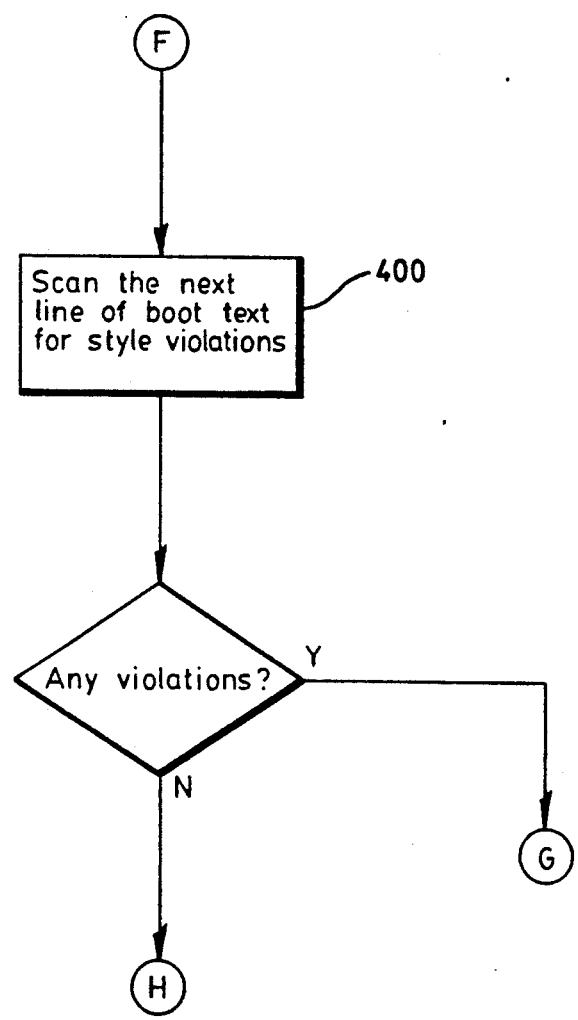

When the program reaches block 322 of FIG. 7A, there is still more space on the page being assembled for more text. Accordingly, the "last good line" structure is updated including the necessary line ending variables. The program then returns to block 201 of FIG. 6 and the process of assembling the next line of body text is started.

Figure 8:
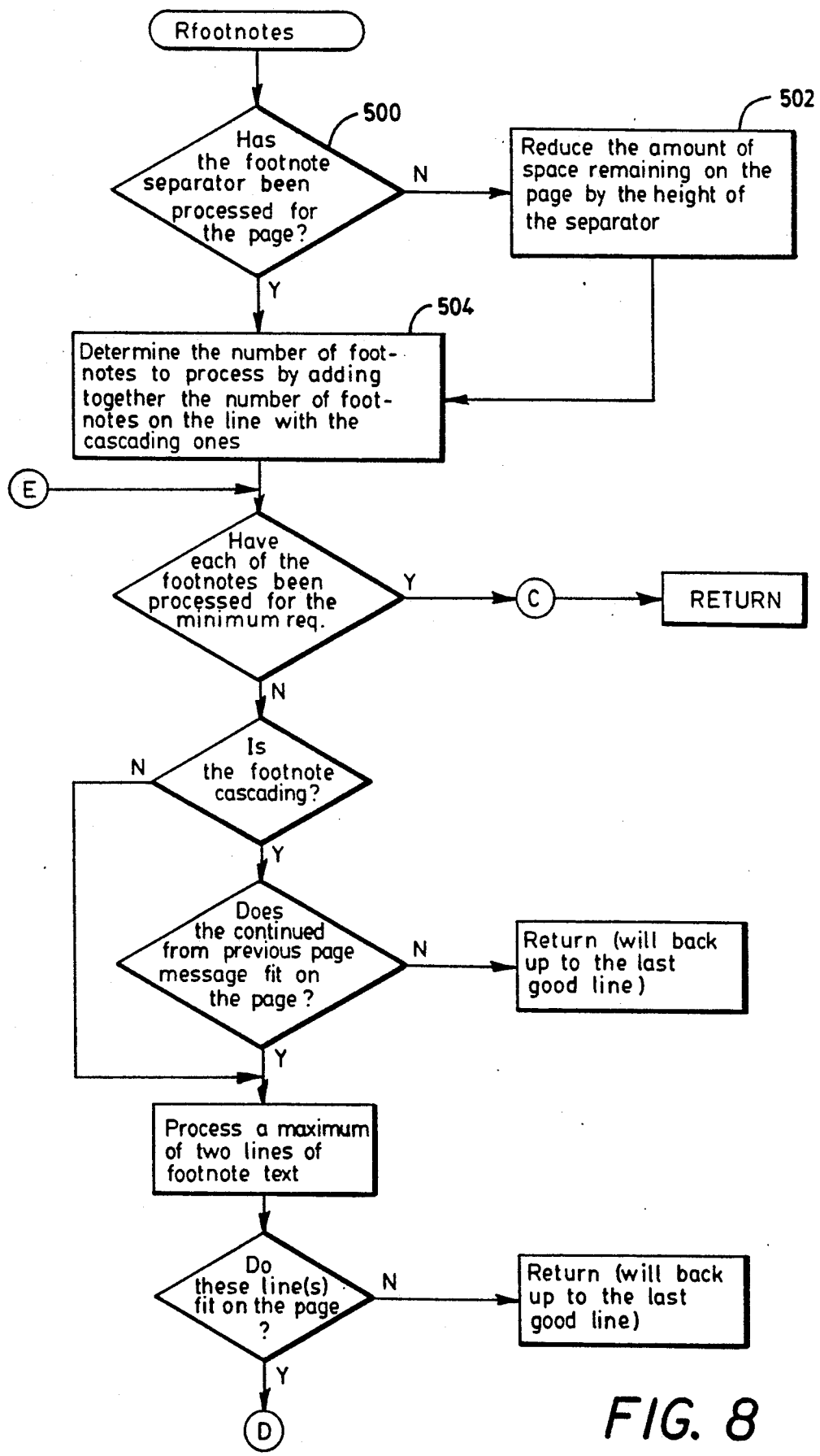
Figure 9:
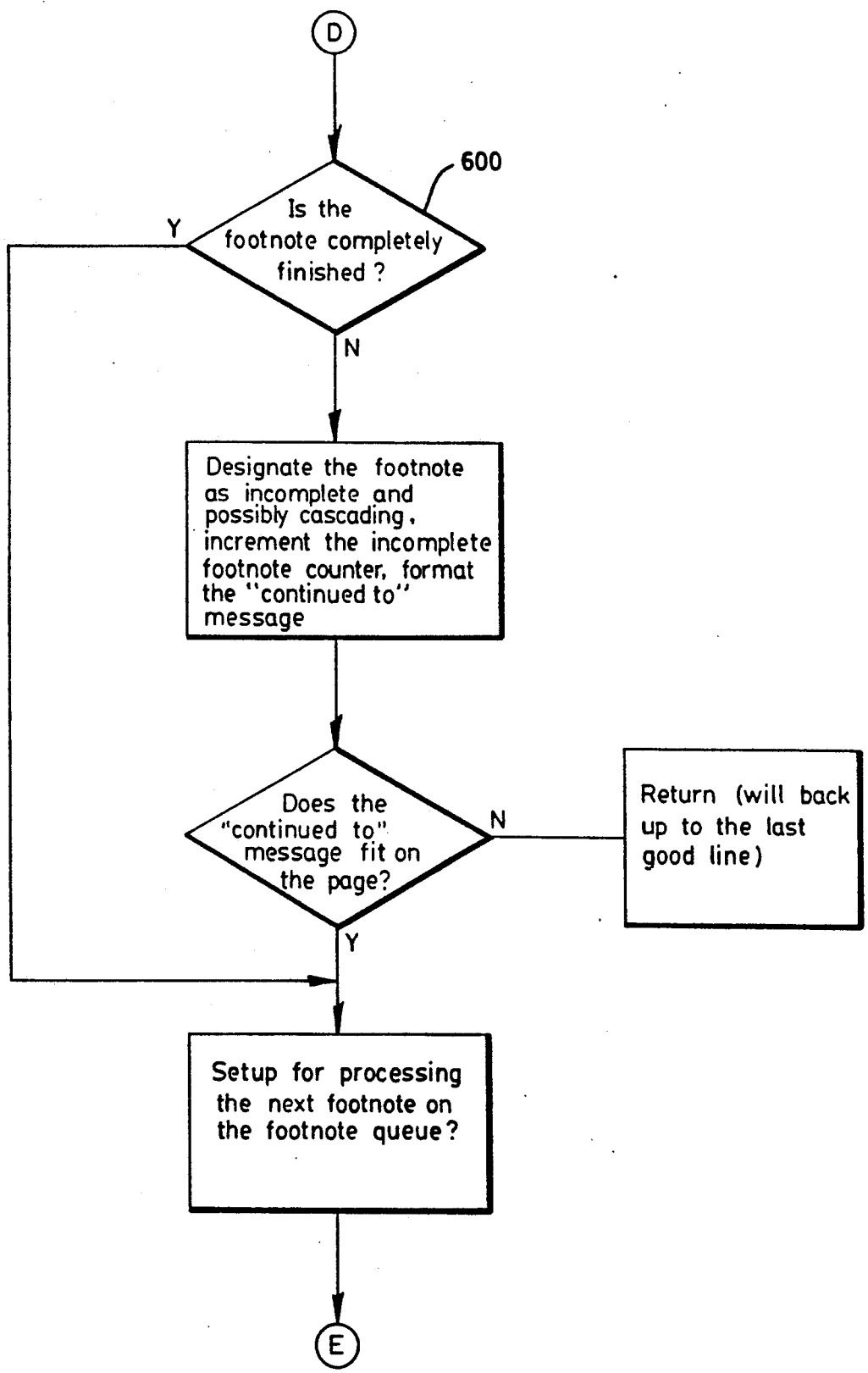
Figure 10:
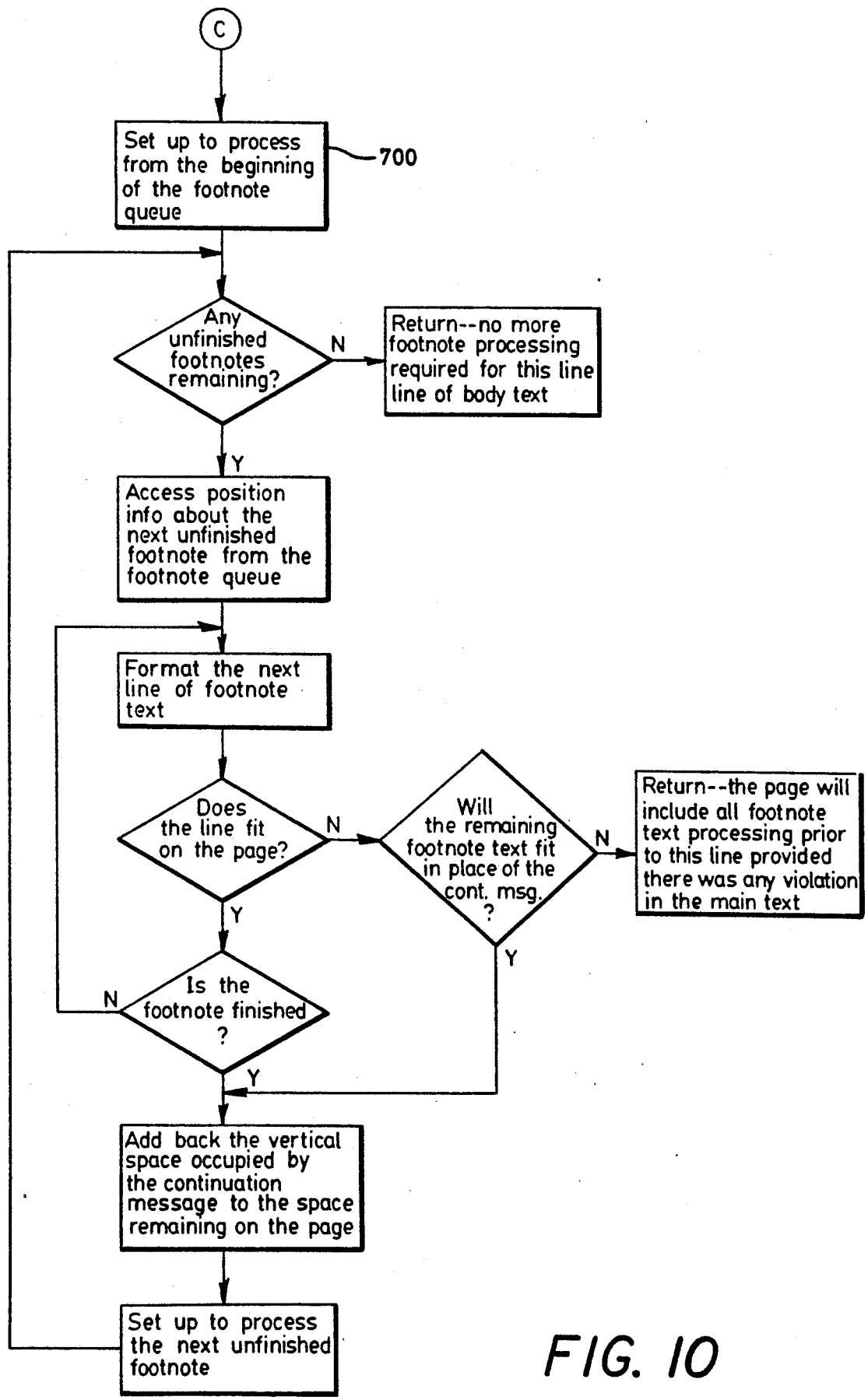

Depicted in FIGS. 8-10 are flow charts describing the Rfootnotes( ) routine. With reference to blocks 500 and 502, if the footnote separator has not yet been previously processed for the page being presently assembled, the space remaining on the page must be decreased by the number equal to the lines to be occupied by the separator.

Thereafter, a determination is made of the number of footnotes to be processed. As described in block 504, that number is calculated by adding the number of cascading footnotes to the number of new footnotes that are referenced in the line of body text being assembled for the output document. Next, a loop is executed for processing two lines of each footnote. For cascading footnotes the lines for the "CONTINUED FROM" messages are added to the page. If space is not available for any of the messages or for either the first or second line of a footnote, the program will return back to the calling routine and begin the "last good line" process of FIGS. 7A and 7B.

If any of the footnotes is longer than two lines, the Rfootnotes() routine proceeds with block 600 shown in FIG. 9. The "CONTINUED TO" messages are provided if space is available on the page. If space is insufficient, the program will return back to the calling routine and begin the "last good line" process of FIGS. 7A and 7B If two lines of each footnote fit on the page alongwith applicable continuation messages, then the Rfootnote() routine enters block 700 of FIG. 10 and the attempt is started to finish any continued footnotes that are in the footnote queue. As is described in blocks depicted in FIG. 10, any footnotes which are completed will require the removal of the apace occupied by the previously formatted continuation messages. routine returns to the calling routine and processing is begun for another line of body text. If any subsequent line of the footnote (beyond the minimum of two footnote lines and the line for the continuation message) does not fit on the page, the program executes block 320 shown in FIG. 7A and proceeds into block 400 shown in FIG. 7B. When in that path, the program scans the next line of body text for style rule violations (such as ending the page with an orphan.

If there is a violation, the program proceeds to block 310 and the "last good line" process is begun. Otherwise, the program goes to block 311 and begins other matters not relating to footnote processing. Eventually, the program returns to block 201 in FIG. 6 where the entire process of assembling a new line of body text commences again.

Figure 11:
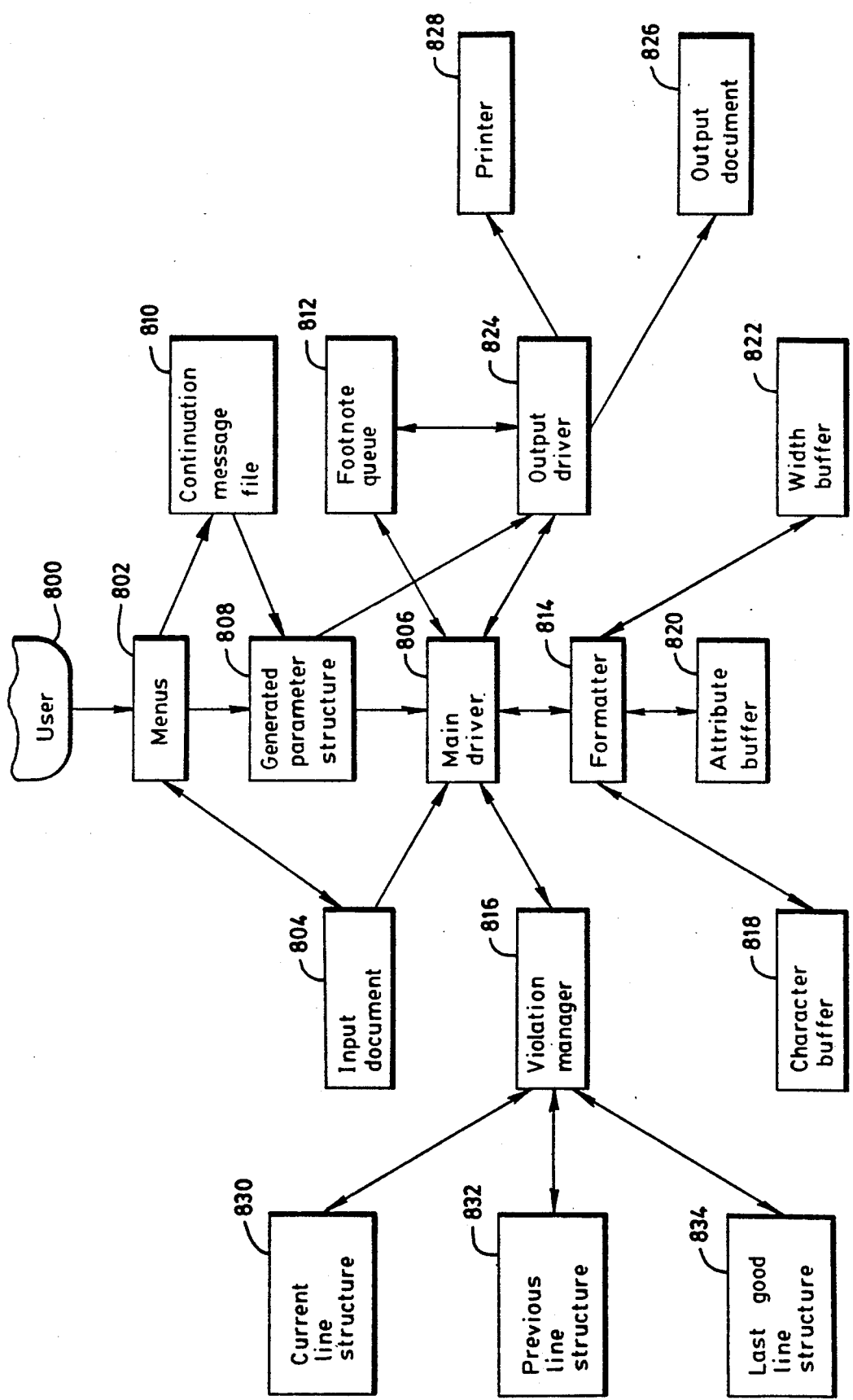
FIG. 11 is a block diagram of a computer program which uses the present invention.

With reference to FIG. 11, there is shown a block diagram of a program incorporating the present invention. A user 800 interacts with menus 802 for providing information such as headers, footers, page length in lines and what input document 804 is to be paginated. That information also results in a continuation message file 810 to be created which becomes part of block 808. A main driver 806 is coupled to receive the input document 804 and information from block 808 relating to generalized parameters and structure. Interacting with the main driver 806 as needed are footnote queue 812, formatter 814, violation manager 816, character buffer 818, attribute buffer 820, width buffer 822, and output driver 824. The main driver 806 operates to assemble the lines, pages and other components of the output document and the output driver 824 produces the output document 826 in final form for subsequent storage or display. The output driver 824 can also send the output document for printing by a printer 828. As can be seen, the output driver 824 is connected to receive information from block 808. Moreover, the violation manager 816 interacts with blocks 830, 832 and 834 regarding the structure of the current, previous and last good line.

The actual working embodiment of the present invention was compiled for use in the VS minicomputer system. The C code for the routines directly relating to the cascading feature of the present invention is given in the Appendix included with this specification.

There is one extremely rare situation where the first style requirements cannot be handled by the present invention. It is possible that a single line of body text references more footnotes than can be placed at the bottom of that page even at the minimum two lines for each lengthy footnote. Moreover, even if they were all single line footnotes, that one line of body text still could reference more footnotes than can be accommodated on that page. In the preferred embodiment of the present invention, the program aborts and a status message of such is provided to the user. One possible solution to this situation is to back up from the end of the single line and thus start to remove footnote references. Eventually, enough footnotes will be removed so the remainder will fit on that page according to the first style requirements. The disadvantage of this solution is the unwanted white space which results as the line of body text is shortened.

While the invention has been particularly shown and described with reference to a preferred embodiments it will be understood by those skilled in the art that various changes in form and detail may be made without departing from the spirit and scope of the invention. For example, the continuation messages can be deleted in order to provide more line space for lengthy footnote text. Alternatively, other well known word processing style requirements such as avoiding widow and orphan violations, showing redlines (previously deleted) text or using a footnote text font style different than used for the body text.

APPENDIX

```
Main Driver Routines
MFNQINIT  C
MFNQADD   C
MFNUTILS  C
RGETFNCH  C
RFNOTES   C
RSEPFORM  C
RCONTMSG  C
RFNPRTLN  C
RSENDFOR  C
RFNIDMAI  C
FVMANAGE  C
RPAGEBRK  C
RPRTLNGR  C
FPRTTEXT  C
RLTNEND   G
```

```
*************************************************************************
*************************************************************************

A0000001

FILE A0000001 IN LIBRARY #ASCTEMP ON VOLUME SYSTEM
     9:57:46 AM    DECEMBER 11, 1989           35 LINES       1 COPY
                  BY USER IWS (AT WORKSTATION 100)
             PRINT CLASS R     FORM# 000     PRINTER 14

*************************************************************************
*************************************************************************

/************************************************************************
Copyright (c) 1987 Wang Laboratories, Inc.  All rights reserved
PROJECT: WP Plus Footnote/Repagination Background Utility
COMPONENT: Mfnqinit - Main Driver initialize footnote queue procedure.
AUTHOR: Dan Michaud
DATE: 03/15/88

DESCRIPTION : This procedure is used to initialize the footnote queue for the
           Footnote/Repagination Background Utility.

C FUNCTION DEFINITION
  ERROR Mfnqinit
INPUT
  none
OUTPUT
  None
ERRORS
  SII errors are returned to the Main Driver
*************************************************************************/
#include <ODINS.H>
EXPORT ERROR  Mfnqinit()
$
/* Initialize the FOOTNOTE QUEUE CONTROL BLOCK */
fnqcb.status = ERSUCCESS;          /* start with success */
fnqcb.itemsize = sizeof(FNQELEM);  /* size of a queue element */
fnqcb.memsize  = 8192;             /* size of heap for all elements */
                                   /* allocate space and store pointer */
if (HPalloc(fnqcb.memsize, &fnqcb.memstart) != ERSUCCESS)
    return(ERget());
fnqcb.nextin = 0;                  /* next element number to go on queue */
fnqcb.maxitems = fnqcb.memsize / fnqcb.itemsize;  /* max number of elements */
fnqcb.dfid = 0;                    /* DFpack id for paging file */
fnqcb.lastpage = 0;                /* last logical page in paging file */
return ERSUCCESS;
&

*************************************************************************
*************************************************************************

A0000001

FILE A0000001 IN LIBRARY #ASCTEMP ON VOLUME SYSTEM
     9:52:27 AM    DECEMBER 11, 1989          118 LINES       1 COPY
                  BY USER IWS (AT WORKSTATION 100)
             PRINT CLASS R     FORM# 000     PRINTER 14

*************************************************************************
*************************************************************************
```

```
/******************************************************************
Copyright (c) 1987 Wang Laboratories, Inc.  All rights reserved PROJECT: WP Plus Footnote/Repagination Background Utility COMPONENT: Mfnqadd - Main Driver add footnote element to footnote queue routine AUTHOR: Dan Michaud DATE: 03/16/88
   Rev #    Date      Revisor         Revision History
   00v00    04-13-89   dc             BUG 131 user defined fn label problem DESCRIPTION : This procedure is used by the Main Driver to do the original
              adding of a footnote to the footnote queue.

C FUNCTION DEFINITION

ERROR Mfnqadd ()

INPUT
   none

OUTPUT
   None

ERRORS
   SII errors are returned to the Main Driver

******************************************************************/ include <ODINS.H>

EXPORT ERROR  Mfnqadd(pbptr, qid, fnidptr)
   DMLPB   *pbptr;      /* PB pointing to footnote reference attribute character */
   USHORT   qid;        /* footnote queue identifier byte */
   TEXT    *fnidptr[11]; /* ptr to footnote id (returned from 'fnidbuff' */

$

IMPORT   ERROR    DMitgoto();
   IMPORT   ERROR    DMrefginfo();
   IMPORT   ERROR    DMrefpinfo();
   IMPORT   DMLITEM  DMpbitem();
   IMPORT   TEXT    *STbcopy();
   IMPORT   VOID     STbfill();
   IMPORT   ERROR    FNqadd();

/* Declarations */
   FNQELEM   fnelem;
   DMLPB     temppb;
   DMLTYPE   type;
   DMLTYPE   fmtype;
   DMLITEM   item;
   DMLREFATTR datta;

/* Store the footnote queue identifier in the document */
/* dgm 10/20/88 ---- NOTE update the labeltype or old foreground */
/*                        documents won't work.           */
/* 00v00+ */
/* if (DMrefginfo(pbptr, &type, &fmtype, &item, &datta) != ERSUCCESS) */
/*    return (ERget()); */          /* get item number of footnote */
/* the queue identifier is now handled in Rfnident */
/* datta.footnote.labeltype = DMLFNLABNUM; */ /* dgm   10/20/88 */
/* datta.footnote.number = qid; */
/* if (DMrefpinfo(pbptr, &datta) != ERSUCCESS)   */
/*    return (ERget()); */          /* get the footnote data word */
/* 00v00- */
/* Fill the footnote queue element with nulls */
STbfill((USHORT)sizeof(FNQELEM), (TEXT)NULL, (TEXT *)&fnelem);
/* 00v00+ */
/* store the pb of the footnote reference */
STbcopy((USHORT)sizeof(DMLPB), (TEXT *)pbptr, (TEXT *)&fnelem.fnrefpb);
/* 00v00- */
```

```
/* Now copy the beginning PB of the footnote chain to the footnote element */
/* NOTE - the Main Driver will later format the footnote and update the  */
/*        ending PB.                                                      */
if (DMrefginfo(pbptr, &type, &fmtype, &item, &datta) != ERSUCCESS)
    return (ERget());          /* get item number of footnote */ if (DMitgoto(DMLTYFTNOTE, item, &temppb) != ERSUCCESS)
    return (ERget());          /* point to beginning of footnote */

/* copy to 'fnbegpb' */
STbcopy((USHORT)sizeof(DMLPB), (TEXT *)&temppb, (TEXT *)&fnelem.fnbegpb);

/* Store the footnote queue identifier */
fnelem.fnqid = qid;

/* Store the footnote ID */
STbcopy((USHORT)(DMLNMMAX + 1), (TEXT *)fnidptr, (TEXT *)&fnelem.fnid[0]);

/* Store the footnote format item number */
if (DMitgoto(DMLTYFTNOTE, DMpbitem(&fnelem.fnbegpb), &temppb) != ERSUCCESS)
    return (ERget());
if (DMrefginfo(&temppb, &type, &fmtype, &fnelem.fnfmtitem, NULL) != ERSUCCESS)
    return (ERget());

/* Finally, add the element to the footnote queue */
if (FNqadd(&fnqcb, &fnelem) != ERSUCCESS)
    return (ERget());

return ERSUCCESS;

¢

*********************************************************************
*********************************************************************

A0000001

FILE A0000001 IN LIBRARY #ASCTEMP ON VOLUME SYSTEM
    9:58:15 AM    DECEMBER 11, 1989           58 LINES       1 COPY
                 BY USER IWS (AT WORKSTATION 100)
            PRINT CLASS R    FORM# 000    PRINTER 14

*********************************************************************
*********************************************************************

/*----------------------------------------------------------------*/
/*   Copyright (C) 1986 Wang Laboratories, Inc.   All rights reserved  */
/*                                                                */
/*     Module   : MFNset_id_attr()                                */
/*     Creation :                                                 */
/*     Author   : Dave Chirokas                                   */
/*                                                                */
/*     Description:                                               */
/*              Set up the attribute word for the footnote ID's   */
/*              from the menu selections.                         */
/*                                                                */
/*                                                                */
/*     Inputs: none.                                              */
/*                                                                */
/*     Outputs: none.                                             */
/*                                                                */
/*                                                                */
/*     Revision History      Date       Revisor                   */
/*                                                                */
/*                                                                */
/*----------------------------------------------------------------*/
#include <rINCLUDE.H>                  /* include all neccesary headers */
EXPORT ERROR MFNset_id_attr()
$
/* set up the attribute word for the footnote ID in the Main body of text. */
/* Note the font attribute is always set so that in Msendfor() the correct */
```

```
/* font number can be applied */
if (MDvars->gps->application.wp.fn_id_mstyle)
    $
    if (MDvars->gps->application.wp.fn_id_mstyle & FTBUNDER)
        mfnidattr = mfnidattr £ DMLVBUNDER;
    if (MDvars->gps->application.wp.fn_id_mstyle & FTBBOLD)
        mfnidattr = mfnidattr £ DMLVBBOLD;
    if (MDvars->gps->application.wp.fn_id_mstyle & FTBSUPER)
        mfnidattr = mfnidattr £ DMLVBSUPER;
    else
        if (MDvars->gps->application.wp.fn_id_mstyle & FTBSUB)
            mfnidattr = mfnidattr £ DMLVBSUB;
    é
mfnidattr = mfnidattr £ DMLVBFONT;
/* set up the attribute word for the footnote ID in the FN portion of the text*/
/* Note the font attribute is always set so that in Msendfor() the correct    */
/* font number can be applied */
if (MDvars->gps->application.wp.fn_id_fstyle)
    $
    if (MDvars->gps->application.wp.fn_id_fstyle & FTBUNDER)
        ffnidattr = ffnidattr £ DMLVBUNDER;
    if (MDvars->gps->application.wp.fn_id_fstyle & FTBBOLD)
        ffnidattr = ffnidattr £ DMLVBBOLD;
    if (MDvars->gps->application.wp.fn_id_fstyle & FTBSUPER)
        ffnidattr = ffnidattr £ DMLVBSUPER;
    else
        if (MDvars->gps->application.wp.fn_id_fstyle & FTBSUB)
            ffnidattr = mfnidattr £ DMLVBSUB;
    é
ffnidattr = ffnidattr £ DMLVBFONT;
return(ERSUCCESS);
é

***********************************************************************
***********************************************************************

A0000001

FILE A0000001 IN LIBRARY #ASCTEMP ON VOLUME SYSTEM
   10:05:32 AM    DECEMBER 11, 1989        102 LINES       1 COPY
                    BY USER IWS (AT WORKSTATION 100)
              PRINT CLASS R    FORM# 000    PRINTER 14

***********************************************************************
***********************************************************************

/*---------------------------------------------------------------------*/
/*    Copyright (C) 1986 Wang Laboratories, Inc.   All rights reserved */
/*                                                                     */
/*      Module   : RGETFNCH                                            */
/*      Creation : 06-02-88                                            */
/*      Author   : Dave Chirokas                                       */
/*                                                                     */
/*      Description:                                                   */
/*                   This module sequentially accesses characters from the */
/*                   footnote and passes them to the formatter.        */
/*                                                                     */
/*      Inputs:                                                        */
/*                                                                     */
/*      Outputs:                                                       */
/*                                                                     */
/*                                                                     */
/*    Rev #    Date     Revisor        Revision History                */
/*    00v00   11-18-88    dc           save largest pointsize at ETX   */
/*    00v01   04-05-89    dc           reorder calling sequence        */
/*    00v02   04-10-89    dc           BUG 169 comment out end of column */
/*                                     indicator when footnote finishes */
/*---------------------------------------------------------------------*/
#include <rINCLUDE.H>              /* include all neccesary headers */
/* IMPORTable routines*/
IMPORT STATUS Madvance2();         /* advance to next sequential position */
IMPORT STATUS Mset_format();       /* get the format line/ set up PB's */
IMPORT STATUS Rfnform();           /* send char. to formatter */
IMPORT STATUS Rfnprt_line();       /* print the line */
EXPORT STATUS Rget_fn_chars()
$
```

```
TEXT         character;              /* current character */
DMLVSMALL    data;                   /* ref. or char. attributes */
UTINY        advance = FALSE;        /* flag to advance the character */
UTINY        status;                 /* return status */
/* get the next sequential character from the document. */
while ((MDvars->error_status = DMsqgsmall(&character, &data)) == ERSUCCESS)
    $
/* if the character is a reference attribute, process it accordingly */
    if (character == DMLCHATTR)
        $
        switch (data.type)
            $
/* format reference */
            case DMLTYFORMAT:
                if (Mset_format() != SUCCESS)
                    return(FAILED);
                advance = TRUE;
                break;
/* for all other attributes, send the dummy character to the formatter */
            default:
                if (Rfnform(DUMMY_CHAR,(DMLSMAP)0,data.type) != SUCCESS)
                    return(FAILED);
                break;
            é
        é
    else
        $
/* If the character is ETX, we are done with the format region. */
        if (character == DMLCHETX)
            $
/* 00v00+ */
            if (MDvars->word_ptsize > MDvars->line_ptsize)
                MDvars->line_ptsize = MDvars->word_ptsize;
/* 00v00- */
            fn_end_etx = TRUE;       /* indicates fn line ended in ETX */
                                     /* signify column is finished */
/* 00v02+ */
/*          MDvars->column[MDvars->column_in] = 0; */
/* 00v02- */
            if (Rfnprt_line() != SUCCESS)
                return(FAILED);
            advance = TRUE;          /* set to advance to next character */
            é
        else
            $
/* the character must be formattable, send the character off to the formatter */
            if (Rfnform(character, data.attr, 0) != SUCCESS)
                return(FAILED);
            é
        é
/* 00v01+ */
/* reordered calling sequence if (advance == TRUE) after other 2 ifs */
    if (!REPvars->REP_brk_page_flag) /* denotes page broke while processing */
        return(FAILED);
    if (fn_pass_finished)
        return(SUCCESS);
    if (advance)
        $
        advance = FALSE;
        if ((status = Madvance2()) != SUCCESS)
            $
            if (status == END_OF_CHAIN)
                return(SUCCESS);
            else
            return(FAILED);
            é
        é
/* 00v01- */
    MDvars->lastchar = character;    /* save the last character */
    é
return(SUCCESS);
é
```

```
/*---------------------------------------------------------------------*/
/*    Copyright (C) 1986 Wang Laboratories, Inc.   All rights reserved   */
/*                                                                       */
/*      Module   : RFOOTNOTES/RPROCESS_2_LINES                           */
/*      Creation : 11-16-88                                              */
/*      Author   : Dave Chirokas                                         */
/*                                                                       */
/*      Description: This module contains the routines:                  */
/*                          RFOOTNOTES                                   */
/*                          RPROCESS_2_LINES                             */
/*                                                                       */
/*                                                                       */
/*   Rev #     Date       Revisor         Revision History               */
/*   00v00   11-16-88       dc        created -- split from Fvmanage     */
/*   00v01   11-16-88       dc        added code to get the point size of*/
/*                                    the continuation message           */
/*   00v02   03-01-89       dc        bug 115 report error when 2 lines of*/
/*                                    each fn can't fit on page          */
/*   00v03   03-01-89       MTP       Rest of footnote replaces cont. msg.*/
/*   00v04   03-02-89       dc        flag error if CM breaks page b4 2  */
/*                                    lines of each fn are processed     */
/*   00v05   03-31-89       MTP       if violation set REP_brk_page_flg so*/
/*                                    Mvi_manager can handle error properly*/
/*   00v06   04-21-89       MTP       bug 160 maintain proper indent level*/
/*                                    for cascading footnotes            */
/*   00v07   05-05-89       MTP       bug 160 update parameter list      */
/*                                                                       */
/*---------------------------------------------------------------------*/
/***********************************************************************/
/* Rfootnotes -- This routine processes footnotes at the end of pages.  */
/* overview --  This routines is invoked only if a line of main text has a*/
/*              footnote reference and the user wants to repaginate footnotes*/
/*              at the end of pages.  First, the footnote seperator is  */
/*              formatted.  Next, two lines of each footnote (cascading and*/
/*              the ones that are on the line) are formatted along with the*/
/*              continuation message (if they are greater than two lines).*/
/*                  If two lines of each footnote cannot fit on the page, then*/
/*                  then the routine is exited and an attempt is made to backup to*/
/*                  the LAST_GOOD line.                                  */
/*                  If two lines of each fit and there is more room left on the*/
/*                  page, Rfnfinish() is called to process as much of the footnote*/
/*                  text as possible starting with the first incomplete footnote.*/
/*                                                                       */
/***********************************************************************/
#include <rINCLUDE.H>   /* include all neccesary headers */
IMPORT ERROR Rfnfinish();       /* process the remaining portion of fns */
IMPORT ERROR Rfnfmtln();        /* process the fmt line for cont'd fns */
/* 00v06+ */
IMPORT VOID  Fset_column_indents();
/* 00v06- */
EXPORT UTINY  cm_font_num;      /* continuation message font number */
EXPORT ERROR Rfootnotes()
$
DMLPB   save_prime[3];          /* pbs for main text b4 fnotes are processed*/
DMLPB   mark_pb, save_pb;       /* temporary pbs */
UTINY   num_fns;                /* number of footnotes on the line */
UTINY   dummy;                  /* dummy parameter for function calls */
UTINY   i;                      /* loop indexer */
USHORT  save_col;               /* current column b4 fnotes are processed */
USHORT  mcol_save[3];           /* column values before processing fns */
DMLITEM save_item;              /* current item # b4 fnotes are processed */
UTINY   more_fns;               /* # of fns that are > than 2 lines */
UINT    line_count;             /* desired line count returned by formatter */
BOOL    fit_on_page;            /* line fit check 1 = fit, 0 = no fit */
UTINY   save_indents[3];        /* column indents before processing fnotes */
/* 00v01+ */
```

```
UTINY    cm_frn;                    /* continuation message frn */
PRIVATE BOOL cm_check_font;         /* check to find the cont. msg. font */
PRIVATE UTINY cm_point_size;        /* point size of the continuation msg font */
/* 00v01- */
/* 00v03+ */
UINT     tmp_lncnt;                 /* line count before cont msg is processed */
/* 00v03- */
/* 00v06+ */
UTINY    save_fnindlvl;
/* 00v06- */
/* 00v07+ */
UTINY    ind_level;
/* 00v07- */
Fmod_line_count(&line_count, 0, &fit_on_page);
/* printf("\n\nline_count before the separator = %x\n", line_count); */
fn_flag = TRUE;
/* if the footnote separator hasn't been processed for this page, add back */
/* to the line count the amount of vertical space it requires. If it won't */
/* fit on the page, set the break page flag and return                     */
if (sep_done == FALSE)
    $
/* 00v01+ */
/* get font information about the continuation message ONCE */
    if (!cm_check_font)
        $
        if (MDvars->gps->application.wp.fn_cm_font_flag)
            cm_font_num = MDvars->gps->application.wp.fn_cont_font;
        else
            cm_font_num = MDvars->format_opt[0]->font;
        if (Mfonts(cm_font_num,&cm_frn) == FAILED)
            return(FAILED);
/* Get the point size of the continuation messages. If it is a typewriter   */
/* font, set the pointsize to 12 (1/6").                                    */
        if(FTfrn2font(cm_frn)->tywtys)
            cm_point_size = FTfrn2font(cm_frn)->pointsz;
        else
            cm_point_size = 12;
        cm_check_font = TRUE;
        é
/* 00v01- */
    Fmod_line_count(&line_count, sep_height, &fit_on_page);
    sep_done = TRUE;
    if (!fit_on_page)
        $
/* 00v02+ */
        REPvars->curr_line.pos_len_ftnote[MDvars->column_in] = TRUE;
        ++REPvars->curr_line.num_violations[MDvars->column_in];
/* 00v05+ */
        REPvars->REP_brk_page_flag = 0;
/* 00v05- */
        return(FAILED);
/*      REPvars->REP_brk_page_flag = 0; */
/*      return(SUCCESS);                */
/* 00v02- */
        é
    é
if (MDvars->error_status = DMsqstop(&MDvars->pb_ptr))
    return(FAILED);
/* save the current pb */
STbcopy(MDvars->dmlpb_size, (TEXT *)&MDvars->pb_ptr, (TEXT *)&save_pb);
STbcopy(MDvars->dmlpb_size, (TEXT *)&MDvars->mark_pb, (TEXT *)&mark_pb);
for (i = 0; i <= MDvars->num_cols; i++)
    $
    STbcopy(MDvars->dmlpb_size, (TEXT *)&MDvars->primary_pb[i],
            (TEXT *)&save_prime[i]);
    mcol_save[i] = MDvars->column[i];
    save_indents[i] = REPvars->curr_line.indents[i];
    é
save_col = MDvars->column_in;
save_item = MDvars->item;
/* fnote_index_num = 0; */
num_fns = fnote_on_line + fn_next_page;
more_fns = 0;
proc_2_fn_lines = TRUE;
/* process two lines of each footnote on the line */
while (num_fns)
    $
    fn_2_line_count = 0;
    fnidline1 = TRUE;
    cont_to_msg = FALSE;
```

```
            fn_end_etx =FALSE;
            if (FNqread(&fnqcb, fnote_index_num, &qdata_buffer))
                return(FAILED);
            qdata_buffer.ctflag = FALSE;
            STbcopy(MDvars->dmlpb_size, (TEXT*)&qdata_buffer.fnbegpb,
                    (TEXT*)&MDvars->pb_ptr);
            if (MDvars->error_status = DMsqinit(&MDvars->pb_ptr))
                return(FAILED);
/*If the footnote is continued, reset the format line and then the cont msg */
            if (qdata_buffer.cfflag)
                {
                if (MDvars->gps->application.wp.fn_cont_message)
                    Rcontmsg(FROM_MSG);
/* 00v02+ */
/* if the continuation message can't fit on the page, flag it as a */
/* possible violation                                                */
            Fmod_line_count(&line_count, 0, &fit_on_page);
            if ((!fit_on_page) && (!REPvars->REP_brk_page_flag))
                    {
                    REPvars->curr_line.pos_len_ftnote[MDvars->column_in] = TRUE;
                    ++REPvars->curr_line.num_violations[MDvars->column_in];
/* 00v05+ */
                    REPvars->REP_brk_page_flag = 0;
/* 00v05- */
                    return(FAILED);
                    }
/* 00v02- */
            MDvars->item = qdata_buffer.lastfnitem;
/* 00v06+ */
/* 00v07+ */
            ind_level = 0;
                                                /* reset the format line */
            if (MFNreset_form(qdata_buffer.lastfnitem, &dummy, &dummy,
                            RESET_FORM, &ind_level) != SUCCESS)
/* 00v07- */
                return(FAILED);
/* 00v06- */
                                                /* process the footnote ID */
            if (MFNidtext(qdata_buffer.fnid, &dummy, FFNID)!= SUCCESS)
                return(FAILED);
/* 00v06+ */
/* send the correct number of indents on to the formatter */
            if (qdata_buffer.fnindlvl > 0)
                Fset_column_indents(0, &qdata_buffer.fnindlvl, fnidlinel);
/* store the indent level of the first line of the cascading footnote so */
/* ODinsfn will insert the correct number of indents for the current page */
                qdata_buffer.firstlnind = qdata_buffer.fnindlvl;
/* 00v06- */
            fnidlinel = FALSE;                  /* don't process ftnote ID */
                }
/* DEBUG */
        Fmod_line_count(&line_count, 0, &fit_on_page);
/* DEBUG */
        if (Rget_fn_chars() != SUCCESS)
                {
/* 00v02+ */
                REPvars->curr_line.pos_len_ftnote[MDvars->column_in] = TRUE;
                ++REPvars->curr_line.num_violations[MDvars->column_in];
/* 00v02- */
/* 00v05+ */
                REPvars->REP_brk_page_flag = 0;
/* 00v05- */
                return(FAILED);
                }
/* DEBUG */
        Fmod_line_count(&line_count, 0, &fit_on_page);
/* DEBUG */
            if (MDvars->error_status = DMsqbackup())
                return(FAILED);
            if (MDvars->error_status = DMsqstop(&MDvars->pb_ptr))
                return(FAILED);
            STbcopy(MDvars->dmlpb_size, (TEXT*)&MDvars->pb_ptr,
                    (TEXT *)&qdata_buffer.fnendpb);
/* save the last footnote format item for later use */
            qdata_buffer.lastfnitem = MDvars->item;
/* call the routine to print the continuation message */
            if (cont_to_msg)
                {
                ++more_fns;
                qdata_buffer.ctflag = TRUE;
```

```
                    if (MDvars->gps->application.wp.fn_cont_message)
                        §
/* 00v03+ */
                        /* Save the line count before processing continuation message */
                        Fmod_line_count(&tmp_lncnt, 0, &fit_on_page);
/* 00v03- */
                        Rcontmsg(TO_MSG);
/* if the continuation message can't fit on the page, set the break page flag */
/* and the flags to exit the footnote processing loops                         */
                        Fmod_line_count(&line_count, 0, &fit_on_page);
                        if ((!fit_on_page) && (!REPvars->REP_brk_page_flag))
                            §
/* 00v03+ */
                            /* Reset linecount before the footnote broke the page */
                            Fmod_line_count(&line_count, (tmp_lncnt-line_count),
                                    &fit_on_page);
                            /* Reset flags to continue processing footnote */
                            REPvars->REP_brk_page_flag = 1;
                            proc_2_fn_lines = FALSE;
                            fn_pass_finished = FALSE;
/* 00v06+ */
                            save_fnindlvl = qdata_buffer.fnindlvl;
/* 00v06- */
                            if (MDvars->error_status = DMsqinit(&MDvars->pb_ptr))
                                return(FAILED);
                            if (MDvars->error_status = DMsqadvance())
                                return(FAILED);
/* 00v06+ */
/* reset the format line to continue processing the footnote */
                            MDvars->item = qdata_buffer.lastfnitem;
                            if (MFNreset_form(qdata_buffer.lastfnitem, &dummy, &dummy,
                                    RESET_FORM, &qdata_buffer.fnindlvl) != SUCCESS)
                                return(FAILED);
/* 00v06- */
                            if (Rget_fn_chars() != SUCCESS)
                                §
                                /* The rest of the footnote can't fit in place of the */
                                /* continuation message. */
                                REPvars->REP_brk_page_flag = 0;
                                check_next_line = FALSE;
                                more_fns = 0;
                                num_fns = 1;
/* 00v06+ */
                                qdata_buffer.fnindlvl = save_fnindlvl;
/* 00v06- */
/* 00v04+ */
                                REPvars->curr_line.pos_len_ftnote[MDvars->column_in] = TRUE;
                                ++REPvars->curr_line.num_violations[MDvars->column_in];
                                return(FAILED);
/* 00v04- */
                                é
                            else
                                §
                                /* The footnote fits in place of the cont.msg. update */
                                /* the end footnote position pointer. */
                                if (MDvars->error_status = DMsqbackup())
                                    return(FAILED);
                                if (MDvars->error_status = DMsqstop(&MDvars->pb_ptr))
                                    return(FAILED);
                                STbcopy(MDvars->dmlpb_size, (TEXT*)&MDvars->pb_ptr,
                                    (TEXT *)&qdata_buffer.fnendpb);
                                /* Reset to continue processing remaining footnotes */
                                proc_2_fn_lines = TRUE;
                                /* Reset so cont. msg. and violation will not print */
                                --more_fns;
                                qdata_buffer.ctflag = FALSE;
                                if (REPvars->curr_line.pos_len_ftnote[MDvars->column_in])
                                    §
                                    REPvars->curr_line.pos_len_ftnote[MDvars->column_in] = FALSE;
                                    --REPvars->curr_line.num_violations[MDvars->column_in];
                                    é
                                é
/* 00v03- */
                            é
                        é
/* if the footnote that was just processed was cascaded from the previous */
/* page decrement the footnote on next page flag to prevent processing it on */
/* the next page */
        else
```

```
            $
                if (qdata_buffer.cfflag)
                    --fn_next_page;
            ¢
        if (FNqrewrite(&fnqcb, fnote_index_num, &qdata_buffer))
            return(FAILED);
        ++fnote_index_num;
        fn_pass_finished = FALSE;
        fn_end_etx = FALSE;
        --num_fns;
        ¢
proc_2_fn_lines = FALSE;
if (more_fns)
    Rfnfinish(more_fns);
/* restore the saved pb */
STbcopy(MDvars->dmlpb_size, (TEXT *)&save_pb, (TEXT *)&MDvars->pb_ptr);
STbcopy(MDvars->dmlpb_size, (TEXT *)&mark_pb, (TEXT *)&MDvars->mark_pb);
for (i = 0; i <= MDvars->num_cols; i++)
    $
        STbcopy(MDvars->dmlpb_size, (TEXT *)&save_prime[i],
            (TEXT *)&MDvars->primary_pb[i]);
        MDvars->column[i] = mcol_save[i];
    ¢
MDvars->column_in = save_col;
MDvars->item = save_item ;
if (MDvars->error_status = DMsqinit(&MDvars->pb_ptr))
    return(FAILED);
fn_flag = FALSE;
if (MFNreset_form(save_item, &dummy, &dummy, RESET_FORM, save_indents) != SUCCESS)
    return(FAILED);
return(SUCCESS);
¢
/*-----------------------------------------------------------------*/
/*      Module   : Rprocess_2_lines()                              */    */
/*                                                                 */    */
/*      Description: This routine will process at least two lines of each  */
/*                   fnote that appears on the line                 */
/*-----------------------------------------------------------------*/
EXPORT ERROR Rprocess_2_lines()
$
TEXT         character;             /* current character */
DMLVSMALL    data;                  /* ref. or char. attributes */
/* Don't count the extra line that is inserted for double line spacing as one */
/* of the two lines */
    if (dbl_fn_ls_flag)
        return(SUCCESS);
/* if the first two lines of a fnote are being processed, increment the */
/* fnote count */
    if (proc_2_fn_lines == TRUE)
        ++fn_2_line_count;
/* if the last character processed was an ETX, advance the pbptr to see */
/* if the end of chain has been reached.  If it has, the fnote is finished */
    if (fn_end_etx)
        $
        if (DMsqadvance())
            $
            if (ERget() == DMEENDCHAIN)
                $
                fn_pass_finished = TRUE;
                return(SUCCESS);
                ¢
            else
                DMsqbackup();
            ¢
        ¢
    if (fn_2_line_count == 2)
        $
        fn_pass_finished = TRUE;
/* this code will determine if a continuation message is necessary for this */
/* footnote.  If two lines of the footnote have been successfully processed, */
/* the pb_ptr is advanced to check for an ETX character. If it is, the pb_ptr*/
/* is advanced another character to check for an END_OF_CHAIN condition. If */
/* it is, the flag to insert a CM is set otherwise we will backup to the last*/
/* character before this mess */
```

```
        if (DMsqadvance())
           return(FAILED);
        else
         $
           DMsqgsmall(&character, &data);
             $
              if (character == DMLCHETX)
                 $
                  if (DMsqadvance())
                     $
                       if (ERget() == DMEENDCHAIN)
                          cont_to_msg = FALSE;
                     é
                 else
                    $
                      cont_to_msg = TRUE;
                      DMsqbackup();
                    é
                 é
              else
                 cont_to_msg = TRUE;
              é
           DMsqbackup();
         é
      é
   return(SUCCESS);
é
```

```
******************************************************************************
******************************************************************************

A0000002

FILE A0000002 IN LIBRARY #ASCTEMP ON VOLUME SYSTEM
   10:10:45 AM    DECEMBER 11, 1989              130 LINES       1 COPY
                    BY USER IWS (AT WORKSTATION 100)
              PRINT CLASS R     FORM# 000      PRINTER 14

******************************************************************************
******************************************************************************

/*----------------------------------------------------------------------------*/
/*      Copyright (C) 1986 Wang Laboratories, Inc.   All rights reserved      */
/*                                                                            */
/*      Module   : MFNreset_form                                              */
/*      Creation : 3-16-88                                                    */
/*      Author   : Dave Chirokas                                              */
/*                                                                            */
/*      Description:                                                          */
/*                 This module sets up the format line for the footnote       */
/*                 seperator and slashfill based on the item number           */
/*                 supplied by ODcrefmt()                                     */
/*                                                                            */
/*                                                                            */
/*      Inputs:  none.                                                        */
/*                                                                            */
/*      Outputs: none.                                                        */
/*                                                                            */
/*                                                                            */
/*   Rev #      Date      Revisor         Revision History                    */
/*   00v00    12-20-88     dc             Add leading support                 */
/*   00v01    04-07-89     MTP            Bug 131 - wrong page length with    */
/*                                         multi columns and hanging indent   */
/*   00v02    04-25-89     MTP            Bug 160 - indents and cascading     */
/*                                                  footnotes                 */
/*                                                                            */
/*                                                                            */
/*----------------------------------------------------------------------------*/
#include <rINCLUDE.H>   /* include all neccesary headers */
/* IMPORTable routines*/
IMPORT STATUS    Mfonts();                  /* get the font reference number */
IMPORT ERROR     DMfmget();                 /* get a format line and all data blocks */
IMPORT FTFONTID  *FTfrn2font();             /* get the pitch of the font */
IMPORT BOOL      Fset_format();             /* send the format line to the formatter */
/* 00v01+ */
IMPORT VOID      Fset_column_indents();     /* insert indents into each column */
/* 00v01- */
EXPORT STATUS    MFNreset_form(item_num, frn, char_ptsize, type, indents)
```

```
    DMLITEM     item_num;
    UTINY       *frn;
    UTINY       *char_ptsize;
    UTINY       type;
    UTINY       *indents;
$
STISTR(252)     format_str;         /* length and content of format line (DMfmget) */
UTINY           i,index;            /* loop indexer */
UTINY           advance;
UTINY           num_indents[3];
/* get the format information */
if (MDvars->error_status = DMfmget(item_num, &format_str, &MDvars->num_cols,
                            MDvars->format_opt))
    return(FAILED);
if ((type == SLASHFILL) && (type == SEPERATOR))
    MDvars->num_cols = 0;
else
    --(MDvars->num_cols);           /* num_cols = #of columns - 1 */
/* check if the linespacing, justification, and lines per inch fields are    */
/* set to the default value. If so, get the default values from the gps.    */
/* Each field is decremented by one for use by the formatter (regardless    */
/* if it is the default value or not). */
for(i = 0; i <= MDvars->num_cols; i++)
    $
    if (!MDvars->format_opt[i]->linespace)           /* line spacing */
        MDvars->fmt_option[i].line_spacing = MDvars->gps->common.linessp;
    else
        MDvars->fmt_option[i].line_spacing = MDvars->format_opt[i]->linespace;
    MDvars->fmt_option[i].justify = 0;
    if (!MDvars->format_opt[i]->linesper)            /* lines per inch */
        MDvars->fmt_option[i].lines_per_inch = MDvars->gps->common.vertpit;
    else
        MDvars->fmt_option[i].lines_per_inch = MDvars->format_opt[i]->linesper;
    MDvars->fmt_option[i].font = MDvars->format_opt[i]->font;    /* font */
/* 00v00+ */
/* get the leading amount from either the gps or the document */
    if (MDvars->fmt_option[i].lines_per_inch == DMLFMLFL)
            $
            if (!MDvars->format_opt[i]->linesper)    /* lines per inch */
                MDvars->fmt_option[i].leading_amount = MDvars->format_opt[i]->fixedlead;
            else
                MDvars->fmt_option[i].leading_amount = MDvars->gps->application.wp.lead_amt;
            &
/* 00v00- */
    if (Mfonts(MDvars->fmt_option[i].font,&frn[i]) == FAILED)
        return(FAILED);
/* if it's a typesetter font, handle the pitch like it is PS. If it's a pitch */
/* font, get the actual pitch value                                           */
    if (FTfrn2font(frn[i])->tywtys)
        $
        MDvars->default_pitch[i] = 3;
        MDvars->def_char_ptsize[i] = FTfrn2font(frn[i])->pointsz;
        &
    else
        $
        MDvars->default_pitch[i] = FTfrn2font(frn[i])->pitch;
        MDvars->def_char_ptsize[i] = 0;
        &
/* determine the pitch */
    switch (MDvars->default_pitch[i])
            $
            case 3: MDvars->format_pitch[i] = 12;    /* PS -- format pitch = 12 */
                    break;
            case 2: MDvars->format_pitch[i] = 15;    /* 15 pitch */
                    break;
            case 1: MDvars->format_pitch[i] = 12;    /* 12 pitch */
                    break;
            default: MDvars->format_pitch[i] = 10;   /* 10 pitch (default value) */
                    break;
            &
    & /* end loop */
/* set up the format line */
Fset_format(format_str.data, MDvars->fmt_option, MDvars->num_cols+1,MDvars->format_pitch);
for (i = 0; i <= MDvars->num_cols; i++)
    $
    num_indents[i] = *indents;
    ++indents;
    &
/* 00v01+ */
i = 0;
```

```
while (i <= MDvars->num_cols)
  $
   if (num_indents[i])
     $
/* 00v02+ */
     Fset_column_indents(i, &num_indents[i], FALSE);
/* 00v02- */
     é
   ++i;
   é
/* 00v01- */
return(SUCCESS);
é
```

```
****************************************************************************
****************************************************************************

A0000001

FILE A0000001 IN LIBRARY #ASCTEMP ON VOLUME SYSTEM
        9:59:18 AM    DECEMBER 11, 1989         129 LINES      1 COPY
                     BY USER IWS (AT WORKSTATION 100)
              PRINT CLASS R    FORM# 000    PRINTER 14

****************************************************************************
****************************************************************************

/*--------------------------------------------------------------------------*/
/*     Copyright (C) 1986 Wang Laboratories, Inc.   All rights reserved   */
/*                                                                         */
/*       Module   : RCONTMSG                                               */
/*       Creation : 04-19-88                                               */
/*       Author   : Dave Chirokas                                          */
/*                                                                         */
/*       Description:                                                     */
/*  This procedure formats a footnote continuation message before or after */
/*  a footnote.  Any pound sign characters are replaced with page numbers  */
/*  Call this routine only when continuation messages exist.               */
/*                                                                         */
/*                                                                         */
/*   Rev #    Date     Revisor           Revision History                  */
/*   00v00   04-19-88    dc       new module partially stolen from ODinscm */
/*   00v01   11-16-88    dc       set the font attribute for Cont. Msg.    */
/*--------------------------------------------------------------------------*/
/* include all header files, external data */
#include <rinclude.h>
/* external functions */
IMPORT  TEXT    *STccopy();
IMPORT  USHORT  STcinsert();
IMPORT  VOID    Fmod_line_count();  /* fmt routine to change the line count */
EXPORT ERROR Rcontmsg(msgtype)
    UTINY    msgtype;              /* message type "cont. from or "cont. to" */
$
        /* For continuation messages, allocate a buffer big enough in case */
        /* the fool wants long roman numeral page numbers every other     */
        /* character.  Computed as [cntmsglen+(romanlen*halfcntmsglen)].  */
TEXT         fnmsgbuf[72+(8*36)];  /* work buffer for continuation message */
TEXT         returnchar[2];        /* return graphic string for blank line */
FAST USHORT  offset = 0;           /* offset into string during search */
UTINY        case_return;          /* return value from Fformat */
UTINY        i, savei;             /* loop indexers */
UTINY        dummy;
DMLSMAP      attr = 0;             /* attribute word for the correct FNID */
UINT         lc1, lc2;             /* line count before and after formatting */
BOOL         fit_on_page;          /* line fit on page flag 1 = fit, 0 = no fit */
UTINY        advance;
UINT         height;               /* height of the continuation message */
UTINY        ind_level;
/* Initialize the return character string */
returnchar[0] = DMLCHRETURN;
returnchar[1] = (TEXT)NULL;
/* Make a copy of the continuation message to parse for page numbers */
if (msgtype == FROM_MSG)
   $
   STccopy(MDvars->gps->application.wp.fn_from_msg, fnmsgbuf);
   STcappend(returnchar, fnmsgbuf);     /* terminate with <CR> */
   if (MDvars->gps->application.wp.fn_from_blnk_b4)
```

```
        STcinsert(returnchar, offset, fnmsgbuf);      /* prepend blank line */
    if (MDvars->gps->application.wp.fn_from_blnk_after)
        STcappend(returnchar, fnmsgbuf);              /* append blank line  */
    è
else    /* it is a TO_MSG */
    $
    STccopy(MDvars->gps->application.wp.fn_to_msg, fnmsgbuf);
    STcappend(returnchar, fnmsgbuf);                  /* terminate with <CR> */
    if (MDvars->gps->application.wp.fn_to_blnk_b4)
        STcinsert(returnchar, offset, fnmsgbuf);      /* prepend blank line */
    if (MDvars->gps->application.wp.fn_to_blnk_after)
        STcappend(returnchar, fnmsgbuf);              /* append blank line  */
    è
    ind_level = 0;
    if (MFNreset_form(qdata_buffer.fnfmtitem, &dummy, &dummy, RESET_FORM, &ind_level) != SUCCESS)
        return(FAILED);
/* set the FONT attribute so that the correct font is used */
/* 00v01+ */
/* if (MDvars->gps->application.wp.fn_cm_font_flag)  */
        attr = DMLVBFONT;
/* 00v01- */
    MDvars->num_page_flag = 1;    /* set numbering page flag */
    proc_cm_flag = TRUE;
/* get the line count before characters are sent to the formatter */
Fmod_line_count(&lc1, 0, &fit_on_page);
    i = 0;
/* send the page number to the formatter a character at a time and handle */
/* the return. */
    while (fnmsgbuf[i])
        $
/* send the characters to the formatter */
/* 00v01+ */
        if ((case_return = Mformat(fnmsgbuf[i], attr, 0)) == FAILED)
            return(FAILED);
/* 00v01- */
/* handle the returns from the formatter */
        switch (case_return) $
/* the character just sent caused a wordwrap.  Processing in the next line */
/* should start with the last character 'marked'. */
                case 2:
                        i= savei - 1;
                        break;
/* the current character just sent terminates the current column and will be */
/* first character sent on the next line. */
                case 3:
                        --i;
                        break;
/* mark the character in case the line breaks in the middle of the word */
                case 4:
                        savei = i;
                        break;
/* no special action is necessary (case 0 and case 1 ) */
                default:
                        ++i;
                        break;
        è
        if (!REPvars->REP_brk_page_flag)
            $
                REPvars->curr_line.pos_len_ftnote[MDvars->column_in] = TRUE;
                ++REPvars->curr_line.num_violations[MDvars->column_in];
                MDvars->num_page_flag = 0;   /* clear numbering page flag */
                proc_cm_flag = FALSE;
/*              Remsg();
                MDvars->error_status = MSG_FATAL;  */
                return(FAILED);
            è
        è
/* get the line count after the cont message has been formatted */
Fmod_line_count(&lc2, 0, &fit_on_page);
/* calculate the height of the continuation message */
height = lc1 - lc2;
if (msgtype == FROM_MSG)
    qdata_buffer.cm_from_size = height;
else
    qdata_buffer.cm_to_size = height;
MDvars->num_page_flag = 0;        /* clear numbering page flag */
proc_cm_flag = FALSE;
return(SUCCESS);
è
```

```
/*--------------------------------------------------------------------*/
/*   Copyright (C) 1986 Wang Laboratories, Inc.  All rights reserved  */
/*                                                                    */
/*      Module   : RFNPRTLN                                           */
/*      Creation : 06-02-88                                           */
/*      Author   : Dave Chirokas                                      */
/*                                                                    */
/*      Description: This routine sets up the formatter to print a line of */
/*                   footnote text.                                   */
/*                                                                    */
/*      Inputs: none.                                                 */
/*                                                                    */
/*      Outputs: none.                                                */
/*                                                                    */
/*                                                                    */
/*   Rev #    Date     Revisor           Revision History             */
/*   00v00   02-13-89    dc       check for hyphen as the last char on the */
/*                                footnote line                       */
/*                                                                    */
/*--------------------------------------------------------------------*/
#include <rINCLUDE.H>              /* include all necessary headers */
/* IMPORTable routines */
IMPORT ERROR Mprint_script();      /* print the line */
IMPORT ERROR Fjust_col();          /* prepare the column for printing */
IMPORT VOID  Fprepare_to_print();  /* formatter setup call */
IMPORT ERROR Rprtlngr();           /* print each script level */
EXPORT STATUS Rfnprt_line()
  $
USHORT  next_col;                  /* next column to format */
BOOL    last_column;               /* TRUE if all the columns on the line are finished */
/* 00v00+ */
  TEXT   last_char;                  /* last printable char. on the line*/
  BOOL   end_cr_flag;                /* line ended with a CR (T or F)   */
  BOOL   keep_flag;                  /* last character keep_to attr.?   */
  BOOL   no_brk_flag;                /* last character no break attr.?  */
  BOOL   hyphen_flag;                /* last character a hyphen?        */
  BOOL   ra_flag;                    /* reserved area or graph on line? */
REPvars->last_hyphen = FALSE;
/* 00v00- */
next_col = 0;
MDvars->fscript = MDvars->end_col_script[next_col];
/* prepare the column for printing */
if (MDvars->error_status = Fjust_col(next_col,&last_column))
    return(FAILED);
/* if there is any printable text, call Rprtlngr() to print each script level */
if (Fbuf_test())
    $
/* 00v00+ */
    Flast_char_data(&end_cr_flag, &last_char, &keep_flag, &no_brk_flag,
                    &ra_flag, &hyphen_flag);
    if (hyphen_flag)              /* line ends with a hyphen */
        REPvars->last_hyphen = TRUE;
/* 00v00- */
    Fprepare_to_print();
/* if formatting/repagination of a script level caused an error, abort out */
    if (Rprtlngr() != SUCCESS)
        return(FAILED);
    é
return(SUCCESS);
é
```

```
A0000001

FILE A0000001 IN LIBRARY #ASCTEMP ON VOLUME SYSTEM
10:10:05 AM    DECEMBER 11, 1989        412 LINES        1 COPY
              BY USER IWS (AT WORKSTATION 100)
           PRINT CLASS R     FORM# 000    PRINTER 14
```

```c
/*---------------------------------------------------------------------*/
/*   Copyright (C) 1986 Wang Laboratories, Inc.  All rights reserved   */
/*                                                                     */
/*      Module   : MSENDFORM                                           */
/*      Creation :                                                     */
/*      Author   : Dave Chirokas                                       */
/*                                                                     */
/*      Description:                                                   */
/*                 this module sends each character to the formatter and */
/*                 handles any returns dictating whether to print the line, */
/*                 mark the character, advance the character etc.      */
/*                                                                     */
/*      Inputs: none.                                                  */
/*                                                                     */
/*      Outputs: none.                                                 */
/*                                                                     */
/*                                                                     */
/*    Rev #    Date     Revisor        Revision History                */
/*    00v00   02/16/89  MTP            Add code to handle diacritics   */
/*                                                                     */
/*                                                                     */
/*---------------------------------------------------------------------*/
#include <rINCLUDE.H>                    /* include all neccesary headers */
/* IMPORTable routines */
IMPORT STATUS Madvance2();    /* advance to the next character */
IMPORT STATUS Mprint_line();  /* print the column or line */
IMPORT STATUS Mcolumns();     /* handle columns */
IMPORT ERROR DMsqvgdata();    /* get the data associated with a visual attr */
IMPORT ERROR FFormat();       /* send char, attr, width, script, frn to format*/
IMPORT ERROR FTdeffont();     /* assign a font reference number to a fontid */
IMPORT ERROR FTwidth();       /* obtain a width of the character */
IMPORT ERROR Mfnidcase2();
IMPORT UTINY  cm_font_num;    /* continuation message font number */
EXPORT STATUS Mformat(character, attribute, att_type)
       TEXT     character;              /* input -- character */
       DMLSMAP  attribute;              /* input -- associated attributes */
       USHORT   att_type;               /* attribute type (if reference) */
{
PDTCB    fchar;                /* character in output format */
#ifdef REPAG
     ULONG   fattr;            /* attribute in output format */
#else
     PDTAB   fattr;            /* attribute in output format */
#endif
PDTWB    fwidth;               /* width in output format */
USHORT   font_num;             /* font number for DMvisgdata */
PRIVATE UTINY  last_frn;       /* font number of the last character */
PRIVATE UTINY  frn;            /* font reference number */
H16      char_width;
H16      primary, overstrike;
PRIVATE USHORT pitch_value;    /* pitch # returned from FTfrn2font */
USHORT   script_level;         /* level of scripting */
USHORT   i;                    /* loop indexer */
PRIVATE DMLPB  save_prime_pb;
PRIVATE UTINY  save_first_switch;
/* 00v00+ */
H16    diac_width;
UTINY  diac_frn;
/* 00v00- */
fchar = (PDTCB)character;      /* get character in Output Buffer format */
DMsqgpb(&MDvars->pb_ptr);
/* if the font attribute is set, it means that we have to process a new font. */
/* Get the font number from DMsqvdata and submit this to get the frn, else    */
/* use the default frn */
if ((DMLVBFONT & attribute) == DMLVBFONT)   /* font attribute set? */
{
```

```
/* If a footnote ID is being processed, use the appropriate font */
    if (proc_fnid_flag)
        $
        if (MDvars->gps->application.wp.fn_id_mstyle & FTBFONT)
            font_num = MDvars->gps->application.wp.fn_id_mstyle;
        else
            font_num = doc_def_font;
        é
    else
    if (proc_cm_flag)
        $
        font_num = cm_font_num;      /* determined in Rfootnotes() */
/*      if (MDvars->gps->application.wp.fn_cm_font_flag)          */
/*          font_num = MDvars->gps->application.wp.fn_cont_font;  */
/*      else                                                      */
/*          font_num = MDvars->format_opt[0]->font;               */
        é
    else
        if (MDvars->error_status = DMsqvgdata(DMLTVFONT,&font_num))   /* get the new font number
            return(FAILED);
    if (font_num != MDvars->last_font_num)
        $
        MDvars->last_font_num = font_num;
        if (Mfonts(font_num,&frn) == FAILED)
            return(FAILED);
        last_frn = frn;
/* Get the pitch value and point size for the character being processed. If */
/* it is a typesetter font, set the pitch tp PS. If it is a pitch font, set */
/* the MDvars->char_ptsize to 12 point                                      */
        if(FTfrn2font(frn)->tywtys)
            $
            pitch_value = 3;
            MDvars->char_ptsize = FTfrn2font(frn)->pointsz;
            é
        else
            $
            pitch_value = FTfrn2font(frn)->pitch;
            MDvars->char_ptsize = 0;
            é
        é
else
    $
    MDvars->last_font_num = MDvars->fmt_option[MDvars->column_in].font;
    frn = MDvars->default_frn[MDvars->column_in];
    pitch_value = MDvars->default_pitch[MDvars->column_in];
    last_frn = frn;      /* new stuff */
    MDvars->char_ptsize = MDvars->def_char_ptsize[MDvars->column_in];
    é
DMsqgpb(&MDvars->pb_ptr); /*******************************************/
/* get the pitch in blips */
switch (pitch_value)
    $
    case 0: char_width = 120;    /* 10 pitch (default value) */
        break;
    case 1: char_width = 100;    /* 12 pitch */
        break;
    case 2: char_width = 80;     /* 15 pitch */
        break;
    case 3:
    default:
        $
        if (MDvars->error_status = FTwidth(character,frn,&char_width))
            return(FAILED);
/* 00v00+ */
        /* If the diacritic attribute is set, get the diacritic mark */
        /* shown with the character. */
        if ((DMLVBDIACRT & attribute) == DMLVBDIACRT)
            $
            diac_frn = frn;
            if (Rdiacritic_width(diac_frn,&diac_width) == SUCCESS)
                $
                if (diac_width > char_width)
                    char_width = diac_width;
                é
            é
/* 00v00- */
        break;
        é
    é
fwidth = (PDTWB)char_width;
```

```c
DMsqgpb(&MDvars->pb_ptr); /*****************************************/
/* process revision marks */
if (attribute & DMLVBREVIS)
    S
    if (MDvars->gps->application.wp.rev == WP_NOREVMRK)
        attribute = attribute & cDMLVBREVIS;
    else if (MDvars->gps->application.wp.rev == WP_UNDRSCR)
        attribute |= DMLVBDOUBLE;
    é
#ifdef REPAG
    fattr = attribute;      /* get the attributes in Output Buffer format */
#else
    fattr = (PDTAB)attribute;     /* get the attributes in Output Buffer format */
#endif
MDvars->end_col_script[MDvars->column_in] = MDvars->fscript; /* save the script of the last char
MDvars->fscript = NORMAL;             /* set character to normal script */
DMsqgpb(&MDvars->pb_ptr);
/* Get the level of subscripting (normal, sub, or double subscripting). */
if (DMLVBSUB & attribute)
    S
    if (proc_fnid_flag)
        MDvars->fscript = SUBSCRIPT;
    else
        S
        if (MDvars->error_status = DMsqvgdata(DMLTVSUB,&script_level))
            return(FAILED);
        if (script_level & 1)
            MDvars->fscript = SUBSUBSCRIPT;
        else
            MDvars->fscript = SUBSCRIPT;
        é
    é
/* Get the level of superscripting (normal, super, or double superscripting). */
if (DMLVBSUPER & attribute)    /* check scripting for superscript and set if true */
    S
    if (proc_fnid_flag)
        MDvars->fscript = SUPERSCRIPT;
    else
        S
        if (MDvars->error_status = DMsqvgdata(DMLTVSUPER,&script_level))
            return(FAILED);
        if (script_level & 1)
            MDvars->fscript = SUPSUPSCRIPT;
        else
            MDvars->fscript = SUPERSCRIPT;
        é
    é
/* if the character is a dummy space, set the script to the level of the */
/* last character processed in the current column. */
    if (fchar == DUMMY_CHAR)
        MDvars->fscript = MDvars->end_col_script[MDvars->column_in];
/* if the optional text attribute is set, clear Fformat_stat and get the next */
/* character, else send the character along with it's width, attributes, and  */
/* script to the formatter */
if (((MDvars->gps->application.wp.opttext) == 0) && (DMLVBOPTION & attribute))
    S
    MDvars->Fformat_stat = 0;
#ifdef REPAG
    pps.delomit = TRUE;
#endif
    é
/* if the deleted text attribute is set, clear Fformat_stat and get the next */
/* character, else send the character along with it's width, attributes, and  */
/* script to the formatter */
else
if (((MDvars->gps->application.wp.redline) == 0) && (DMLVBDEL & attribute))
    S
    MDvars->Fformat_stat = 0;
#ifdef REPAG
    pps.delomit = TRUE;
#endif
    é
else
    MDvars->Fformat_stat = FFormat(fchar, fattr, fwidth, MDvars->fscript, frn);
/* this section of code will determine if there are typesetter, typewriter, */
/* or both type of fonts on the current line. It was coded as a separate    */
/* switch statement to facilitate porting point sizing to the 114.          */
switch (MDvars->Fformat_stat) S
    case 0:
```

```
                    if (!MDvars->char_ptsize)
                        MDvars->wpitch = TRUE;
                    if (MDvars->char_ptsize > MDvars->word_ptsize)
                        MDvars->word_ptsize = MDvars->char_ptsize;
                    break;
            case 1:
                    if (!MDvars->char_ptsize)
                        MDvars->wpitch = TRUE;
                    if (MDvars->char_ptsize > MDvars->word_ptsize)
                        MDvars->word_ptsize = MDvars->char_ptsize;
            case 3: if (MDvars->wpitch)
                        MDvars->lpitch = TRUE;
                    if (MDvars->word_ptsize > MDvars->line_ptsize)
                        MDvars->line_ptsize = MDvars->word_ptsize;
                    break;
            case 4: if (MDvars->word_ptsize > MDvars->line_ptsize)
                        MDvars->line_ptsize = MDvars->word_ptsize;
                    if (MDvars->wpitch)
                        MDvars->lpitch = TRUE;
                    if (!MDvars->char_ptsize)
                        MDvars->wpitch = TRUE;
                    if (MDvars->char_ptsize > MDvars->word_ptsize)
                        MDvars->word_ptsize = MDvars->char_ptsize;
                    break;
            default:
                    break;
            é
/* the following switch statement handles returns from Fformat (0-4) */
 switch (MDvars->Fformat_stat) §
/* CASE 0: Advance one character and  continue processing */
            case 0:
                    if (MDvars->num_page_flag)        /* if processing a page # */
                        return(SUCCESS);              /* get next character */
                    if (proc_fnid_flag)               /* if processing a fnote ID, */
                        return(0);                    /* get the next character */
                    if (Madvance2() == FAILED)        /* advance character */
                        return(FAILED);
                    break;
/* CASE 1: The character just sent is the the last character on the current  */
/*         line or column.  Call Mprint_line to see if we are at the end of  */
/*         a line, else go to the next column and get the next character.<CR>*/
            case 1:
                    MDvars->end_col_script[MDvars->column_in] = MDvars->fscript; /* save the ending
                                                                                 /*    script level
                    if (Mprint_line() != SUCCESS)   /* send line to the formatter */
                        return(FAILED);
/* 4/21 */          if (fn_pass_finished)
                        return(SUCCESS);
                    if (MDvars->num_page_flag)         /* if processing a page # */
                        return(SUCCESS);               /*    get next character */
                    if (dbl_fn_ls_flag)
                        return(SUCCESS);
                    if (Mcolumns() == FAILED)          /* handle next column */
                        return(FAILED);
                    if (Madvance2() == FAILED)    /*   advance character  */
                        return(FAILED);
                    fnid_in_word_count = 0;
                    break;
/* CASE 2: Print the current line, and continue processing from last mark  */
/*         when this column resumes. Start printing the next column.       */
            case 2:
/* save the ending script level */
                    MDvars->end_col_script[MDvars->column_in] = MDvars->mark_script;
                    if (MDvars->rs_wrap_flag)
                        MDvars->rs_count = MDvars->rs_count - MDvars->rs_wrap_flag;
                    if (fnid_in_word_count)     /* cleanup any footnotes in */
                        Mfnidcase2();           /* the word group           */
                    if (Mprint_line() != SUCCESS)  /* send line to the formatter */
                        return(FAILED);
                    if (MDvars->num_page_flag)     /* if processing a page # */
                        return(2);                 /* send last marked char */
                    if (MDvars->error_status = DMsqstop(&MDvars->pb_ptr))
                        return(FAILED);
                    STbcopy(MDvars->dmlpb_size, (TEXT *)&MDvars->save_last_pb,
                            (TEXT *)&MDvars->next_merge_pb);
                    MDvars->first_switch = save_first_switch;
                    if (!MDvars->XDOC)        /* primary document */
                        §
/* if the word that broke the line began in the secondary document and broke */
/* in the primary, reset back to the secondary document */
                        if (MDvars->column_type[MDvars->column_in])    /* 1 = secondary */
```

```
                    $
                    STbcopy(MDvars->dmlpb_size, (TEXT *)&save_prime_pb,
                            (TEXT *)&MDvars->primary_pb[MDvars->column_in]);
                    MDvars->XDOC = 1;                /* secondary document */
                    DMdocset(MDvars->dcbptr1);       /* reset to secondary document */
                    é
                    é
                else
                    $
/* if the word that broke the line began in the primary document and broke in */
/* the secondary, reset back to the primary document */
                    if (!MDvars->column_type[MDvars->column_in])    /* 0 = primary */
                        $
                        MDvars->XDOC = 0;            /* primary document */
                        DMdocset(MDvars->dcbptr);    /* reset to primary document */
                        é
                    else
                        STbcopy(MDvars->dmlpb_size, (TEXT *)&save_prime_pb,
                                (TEXT *)&MDvars->primary_pb[MDvars->column_in]);
                    é
                STbcopy(MDvars->dmlpb_size, (TEXT *)&MDvars->mark_pb, (TEXT *)&MDvars->pb_ptr);
                if (MDvars->error_status = DMsqinit(&MDvars->pb_ptr))
                    return(FAILED);
                if (MDvars->error_status = DMsqbackup())
                    return(FAILED);
/* if we are in the secondary document, and the word that     */
/* caused the line break is in the secondary argument, save   */
/* the PB */
                if ((MDvars->XDOC) && (MDvars->column_type[MDvars->column_in]))
                    $
                    DMsqgpb(&MDvars->pb_ptr);
                    STbcopy(MDvars->dmlpb_size, (TEXT *)&MDvars->pb_ptr,
                            (TEXT *)&MDvars->merge_pb[MDvars->column_in]);
                    é
                if (Mcolumns() == FAILED)      /* switch to the next column */
                    return(FAILED);
                if (Madvance2() == FAILED)     /* advance character */
                    return(FAILED);
                if (proc_fnid_flag)            /* if processing a fnote ID, */
                    return(2);                 /* get the next character */
                break;
/* CASE 3: Mark the current character position in the document, print the   */
/*         line, and continue processing from the mark when this column     */
/*         resumes. Start printing in the next column if one exists.        */
            case 3:
                if (proc_fnid_flag)
                    return(3);
/* NEW */   if ((fchar == DUMMY_CHAR) && ((att_type == DMLTYEXT)
                    && (att_type == DMLTYRSPACE)))
                    --(MDvars->rs_count);
                                              /* if the line breaks when */
                                              /* formatting a fnote ID   */
                                              /* set some flags for later*/
                if (Mprint_line() != SUCCESS)  /* send line to the formatter */
                    return(FAILED);
                if (MDvars->num_page_flag)     /* if processing a page # */
                    return(3);                 /* send char again */
                if (MDvars->error_status = DMsqbackup())
                    return(FAILED);
                if (Mcolumns() == FAILED)
                    return(FAILED);
                if (Madvance2() == FAILED)     /* advance character */
                    return(FAILED);
                fnid_in_word_count = 0;
                break;
/* CASE 4: Mark the current character position in the document, and advance */
/*         to the next character.                                           */
            case 4:
/* mark the ending script level */
                MDvars->mark_script = MDvars->end_col_script[MDvars->column_in];
/* set the column_type(starting point of the marked word) */
/* 0 = primary, 1 = secondary */
                if (MDvars->num_page_flag)    /* if processing a page # */
                    return(4);                /* return and mark */
/* NEW */   if (fchar != DUMMY_CHAR)
                    MDvars->rs_wrap_flag = 0;
                else
                    if ((att_type != DMLTYEXT) && (att_type != DMLTYRSPACE))
                        MDvars->rs_wrap_flag = 0;
                MDvars->column_type[MDvars->column_in] = MDvars->XDOC;
                DMsqgpb(&MDvars->pb_ptr);
```

```
* If the application is merge printing, save the first merge flag, the next */
* merge PB pointer, and the primary documnet PB pointer in case of a word   */
* break */
            if (MDvars->gps->application.wp.printapp == WP_MERGPRNT)
                {
                save_first_switch = MDvars->first_switch;
                STbcopy(MDvars->dmlpb_size, (TEXT *)&MDvars->next_merge_pb,
                        (TEXT *)&MDvars->save_last_pb);
                STbcopy(MDvars->dmlpb_size, (TEXT *)&MDvars->primary_pb[MDvars->column_in],
                        (TEXT *)&save_prime_pb);
                }
            STbcopy(MDvars->dmlpb_size, (TEXT *)&MDvars->pb_ptr, (TEXT *)&MDvars->mark_pb);
            if (MDvars->gps->application.wp.footnotes)
                {
                fnid_in_word_count = 0;
                if (proc_fnid_flag)       /* if processing a fnote ID, */
                    return(4);            /* get the next character */
                }
            if (Madvance2() == FAILED)    /* advance character */
                return(FAILED);
            break;
        } /* End of CASE */
return(SUCCESS);
}
```

```
****************************************************************************
****************************************************************************

A0000001

FILE A0000001 IN LIBRARY #ASCTEMP ON VOLUME SYSTEM
    10:03:46 AM   DECEMBER 11, 1989          217 LINES          1 COPY
                       BY USER IWS (AT WORKSTATION 100)
                 PRINT CLASS R     FORM# 000    PRINTER 14

****************************************************************************
****************************************************************************

/*--------------------------------------------------------------------------*/
/*    Copyright (C) 1986 Wang Laboratories, Inc.   All rights reserved      */
/*                                                                          */
/*      Module   : MFNIDTEXT()                                              */
/*      Creation : 4-4-88                                                   */
/*      Author   : Dave Chirokas                                            */
/*                                                                          */
/*      Description: This routine will pass the footnote ID to the formatter*/
/*                   and make sure that it fits on the line.                */
/*                                                                          */
/*      Inputs:                                                             */
/*                                                                          */
/*      Outputs:                                                            */
/*                                                                          */
/*                                                                          */
/*    Rev #    Date      Revisor         Revision History                   */
/*    00v00   11-29-88    dc      was return(ERSUCCESS)                     */
/*    00v01   11-29-88    dc      HANDLE fnote IDs that break the pg        */
/*    00v02   01-25-89    dc      handle fnote references that cause CASE 3 */
/*                                in the main body of text                  */
/*    00v03   02-17-89    dc      reset fnote ID correctly when style is OTHER */
/*    00v04   02-23-89    dc      CASE 3 in Main text truncates the fnote ID */
/*    00v05   02-24-89    dc      backport VS changes for OTHER problems    */
/*    00v08   05-02-89    dc      backing up problems when fnid reaches limits */
/*                                                                          */
/*--------------------------------------------------------------------------*/
#include <rINCLUDE.H>                /* include all neccesary headers */
/* IMPORTable routines */
IMPORT STATUS Madvance2();           /* advance to the next character */
IMPORT STATUS Mcolumns();            /* setup for the next column */
IMPORT ERROR Mfnidcase2();
/* 00v03+ */
IMPORT VOID  FNbackup_other();       /* reset fn id correctly when style is OTHER */
/* 00v03- */
EXPORT ERROR Mfnidtext(buf,adv,type)
    TEXT buf[];               /* footnote ID */
    UTINY *adv;               /* bool to advance to next PB */
    UTINY type;               /* main body = MFNID, footnote = FFNID */
{
UTINY i = 0;                  /* loop indexer */
USHORT case_return;           /* return values from Fformat */
```

```
TEXT temp_buf[11];              /* temporary buffer for the ID */
DMLSMAP attr;                   /* attribute word for the correct FNID */
*adv = FALSE;
STccopy(buf, temp_buf);
proc_fnid_flag = TRUE;          /* indicate processing a footnote ID */
                                /* get the correct attribute word */
if (type == FFNID)
    $
    attr = ffnidattr;
                                /* format an extra CR if double line spacing    */
                                /* between the footnote is required, and if it  */
                                /* is not the only footnote on the page         */
    if ((MDvars->gps->application.wp.fn_line_spacing == WP_DBLLS_FN)
        && (MDvars->gps->application.wp.fnote_loc == WP_FN_END_PG)
        && (fnote_index_num > 0))
        $
        dbl_fn_ls_flag = TRUE;
        Mformat(0x83, (DMLSMAP)0, 0);
        dbl_fn_ls_flag = FALSE;
        é
    é
else
    attr = mfnidattr;
                                /* send the footnote ID to the formatter a */
                                /* character at a time and handle and handle */
                                /* the return. */
while (temp_buf[i])
    $
                                /* send the characters to the formatter */
    case_return = Mformat(temp_buf[i], attr, 0);
/* 00v01+ */
/* if the page broke while inserting the footnote ID, return failed to */
/* start processing the next page */
    if (MDvars->error_status == REP_ENDPAGE)
        $
        proc_fnid_flag = FALSE;     /* finished processing footnote ID */
        return(FAILED);
        é
/* 00v01- */
                                /* handle the returns from the formatter */
    switch (case_return) $
    case 0:
            ++i;                /* increment to the next character */
            break;
    case 1:
            temp_buf[i]= 0;
            break;
    case 2:
            temp_buf[i]= 0;
            break;
                                /* A case 3 returned while processing */
    case 3:                     /* fnote ID's in the footnoteis an abort*/
            proc_fnid_flag = FALSE;
/*00v02+*/
            if (type == MFNID)
                $
/* 00v04+ */
                Mfnidcase2();
/*              if (FNqread(&fnqcb, qid - 1, &qdata_buffer))        */
/*                  return(FAILED);                                 */
/*              qdata_buffer.fnid[i] = 0;                           */
/*              if (FNqrewrite(&fnqcb, qid - 1, &qdata_buffer))     */
/*                  return(FAILED);                                 */
/* 00v04- */
                temp_buf[i]= 0;
                if (Mprint_line() != SUCCESS)  /* send line to the formatter */
                    return(FAILED);
/* 00v05+ */
                if (MDvars->error_status = DMsqbackup())
                    return(FAILED);
/* 00v05- */
                if (Mcolumns() == FAILED)
                    return(FAILED);
                if (Madvance2() == FAILED)   /* advance character */
                    return(FAILED);
                fnid_in_word_count = 0;
                é
            else
/*00v02-*/
                return(FALSE);
            break;
    case 4:
```

```
                fnid_in_word_count = 1;
                ++i;                    /* increment to the next character */
                break;
            é
        é
    /* if (case_return <= 1)   */
    /* 00v05+ */
    if ((case_return == 0) && (case_return == 4))
    /* if (case_return != 2) */
    /* 00v05- */
        *adv = TRUE;
    else
        *adv = FALSE;
    proc_fnid_flag = FALSE;         /* indicate processing a footnote ID */
    /* 00v00+ */
    return(SUCCESS);
    /* 00v00- */
é
EXPORT ERROR Mfnidcase2()
$
USHORT  case_return;            /* return values from Fformat */
FNQELEM retfnelem;              /* place to store element deleted from queue */
FNQELEM buffnelem;              /* place to buffer elements during deleted */
UINT    elemnum;                /* running element number */
/* 00v06+ */
DMLTYPE    type;
DMLTYPE    fmtype;
DMLITEM    item;
DMLREFATTR datta;
/* 00v06- */
fnote_on_line -= fnid_in_word_count;
qid -= fnid_in_word_count;
/* 00v03+ */
if (MDvars->gps->application.wp.fnote_seq_num == WP_OTHER_SEQ)
    FNbackup_other(fnid_in_word_count);
else
/* 00v03-*/
/* 00v06+ */
/*  REPvars->fn_num -= fnid_in_word_count;  */
/* 00v06- */
/* 00v07+ */
if (MDvars->error_status = DMsqstop(&MDvars->pb_ptr))
    return(FAILED);
/* 00v07- */
elemnum = fnqcb.nextin;
while (fnid_in_word_count)
        $
        --elemnum;
/* 00v06+ */
        if (FNqread(&fnqcb, elemnum, &qdata_buffer))
                return(FAILED);
        if (MDvars->error_status = DMrefginfo(&qdata_buffer.fnrefpb,
                                &type, &fmtype, &item, &datta))
            return(FAILED);
        if (datta.footnote.labeltype != DMLFNLABUSER)
/* 00v08+ */
        $
/*          --REPvars->fn_num;   */
            if (MDvars->gps->application.wp.fnote_seq_num == WP_ARABIC_SEQ)
                $
                if (REPvars->fn_num == 1)
                    REPvars->fn_num = 15000;
                else
                    --REPvars->fn_num;
                é
            else
            if (MDvars->gps->application.wp.fnote_seq_num == WP_ALPHA_SEQ)
                $
                if (REPvars->fn_num == 'a')
                    REPvars->fn_num = 'z';
                else
                    --REPvars->fn_num;
                é
            else
            if (MDvars->gps->application.wp.fnote_seq_num == WP_ROMAN_SEQ)
                $
                if (REPvars->fn_num == 1)
                    REPvars->fn_num = 187;
                else
                    --REPvars->fn_num;
                é
```

```
/* 00v08- */
/* 00v06- */
        if (FNqremove(&fnqcb, elemnum, &buffnelem, &retfnelem))
            return(ERget());
        --fnid_in_word_count;

fnqcb.nextin = elemnum;
/* 00v07+ */
if (MDvars->error_status = DMsqinit(&MDvars->pb_ptr))
    return(FAILED);
/* 00v07- */
```

A:\FVMANAGE.C          Date:12/11/1989          Time:09:26:01

```
FFFFFFF  VV  VV  XX   XX   AA       XX   XX   AA        GGGG    EEEEEE
FF   F   VV  VV  XXX XXX  AAAA     XXXX  XX  AAAA      GG  GG   EE   E
FF F     VV  VV  XXXXXXX  AA  AA   XXXX XX  AA  AA    GG        EE E
FFFF     VV  VV  XXXXXXX  AA  AA   XX XXXX  AA  AA    GG        EEEE
FF F     VV  VV  XX X XX  AAAAAA   XX  XXX  AAAAAA    GG  GGG   EE E
FF        VVVV   XX   XX  AA  AA   XX   XX  AA  AA    GG  GG    EE   E
FFFF       VV    XX   XX  AA  AA   XX   XX  AA  AA     GGGGG    EEEEEE

FFFFFFF  VV  VV  XX   XX   AA       XX   XX   AA        GGGG    EEEEEE
FF   F   VV  VV  XXX XXX  AAAA     XXXX  XX  AAAA      GG  GG   EE   E
FF F     VV  VV  XXXXXXX  AA  AA   XXXX XX  AA  AA    GG        EE E
FFFF     VV  VV  XXXXXXX  AA  AA   XX XXXX  AA  AA    GG        EEEE
FF F     VV  VV  XX X XX  AAAAAA   XX  XXX  AAAAAA    GG  GGG   EE E
FF        VVVV   XX   XX  AA  AA   XX   XX  AA  AA    GG  GG    EE   E
FFFF       VV    XX   XX  AA  AA   XX   XX  AA  AA     GGGGG    EEEEEE

FFFFFFF  VV  VV  XX   XX   AA       XX   XX   AA        GGGG    EEEEEE
FF   F   VV  VV  XXX XXX  AAAA     XXXX  XX  AAAA      GG  GG   EE   E
FF F     VV  VV  XXXXXXX  AA  AA   XXXX NN  AA  AA    GG        EE E
FFFF     VV  VV  XXXXXXX  AA  AA   NN NNNN  AA  AA    GG        EEEE
FF F     VV  VV  XX X XX  AAAAAA   NN  NNN  AAAAAA    GG  GGG   EE E
FF        VVVV   XX   XX  AA  AA   NN   NN  AA  AA    GG  GG    EE   E
FFFF       VV    XX   XX  AA  AA   NN   NN  AA  AA     GGGGG    EEEEEE

FFFFFFF  VV  VV  XX   XX   AA       NN   NN   AA        GGGG    EEEEEE
FF   F   VV  VV  XXX XXX  AAAA     NNN   NN  AAAA      GG  GG   EE   E
FF F     VV  VV  XXXXXXX  AA  AA   NNNN  NN  AA  AA    GG        EE E
FFFF     VV  VV  XXXXXXX  AA  AA   NN NNNN  AA  AA    GG        EEEE
FF F     VV  VV  XX X XX  AAAAAA   NN  NNN  AAAAAA    GG  GGG   EE E
FF        VVVV   XX   XX  AA  AA   NN   NN  AA  AA    GG  GG    EE   E
FFFF       VV    XX   XX  AA  AA   NN   NN  AA  AA     GGGGG    EEEEEE
```

```
/*--------------------------------------------------------------------------
/*    Copyright (C) 1986 Wang Laboratories, Inc.   All rights reserved
/*
/*       Module   : MVI_MANAGER
/*       Creation : 6-25-87
/*       Author   : Dave Chirokas
/*
/*       Description: This routine is the Repaginator Violation Manager.
/*                    It will check the Line_check structures and determine
/*                    if a page break is necessary.
/*
/*
/*
/*       Inputs:  none.
/*
/*       Outputs: none.
/*
/*
/*       Rev #    Date       Revisor        Revision History
/*       00v00    11-16-88    dc            spun off Rpage_break(), Rfootnotes()
/*                                          seperate modules
/*       00v01    01-26-89    dc            handle returns from Remsg()
/*       00v02    02-17-89    dc            reset fn id correctly when style is OTHER
```

```
/*    00v03    02-24-89    dc        use fnote_seq_num for OTHER
/*    00v04    02-27-89    dc        bug 111 keep_together not being flagged
/*    00v05    03-01-89    dc        bug 115 if 2 lines of fns can't fit on
/*                                       the line, flag as a violation
/*    00v06    03-20-89    dc        bug 18 Footer linenumber 1 error
/*    00v07    03-21-89    dc        bug 101, 139 Cascading fns wid/orphans
/*                                       not being flagged
/*    00v08    03-29-89    MTP       bug 74,75,94, Footnotes along side
/*                                       reserved areas
/*    00v09    04-05-89    MTP       correctly set PB pointer to prevent a
/*                                       fatal error
/*    00v10    04-14-89    dc        if a labeled fn is being removed off the
/*                                       queue don't decrement the fn number
/*    00v11    05-02-89    dc        backing up problems when fnid reaches limits
/*------------------------------------------------------------------- include <rINCLUDE.H>    /* include all neccesary headers */

IMPORT ERROR ODbldpage();           /* builds a page in the output document */
IMPORT ERROR Rpage_break();         /* invokes the page builder */
IMPORT ERROR Rprocess_2_lines();    /* checks that 2 lines of fnotes are done
IMPORT ERROR Rfootnotes();          /* process any footnotes on the line */
IMPORT ERROR prev_line_check();     /* check the previous line for violations
IMPORT ERROR Rfnfinish();           /* process the remaining portion of fns */
IMPORT ERROR Rfnfmtln();            /* process the fmt line for cont'd fns */
IMPORT ERROR Rslash_cr();           /* inserts slashfill and carriage returns
IMPORT ERROR Remsg();               /* put the err msg into a note */
/* 00v02+ */
IMPORT VOID  FNbackup_other();      /* reset fn id correctly when style is OTH
/* 00v02- */
/* 00v08+ */
IMPORT VOID  save_graph_values();   /* save ra values while processing ftnote
IMPORT VOID  restore_graph_values(); /* reset ra values when finish process fn
IMPORT BOOL  graph_fits();          /* check graph fits after processing fn */
/* 00v08- */

EXPORT UTINY debug_page_num;

EXPORT ERROR Mvi_manager()
{
UTINY    i;                         /* loop indexer */
USHORT   cols;                      /* number of columns to check for violatio
FNQELEM  retfnelem;                 /* place to store element deleted from que
FNQELEM  buffnelem;                 /* place to buffer elements during deleted
UINT     elemnum;                   /* running element number */
USHORT   ret_val;                   /* contains error message */
UTINY    backup_flag = FALSE;       /* backup to last good line flag */
UTINY    check_prev_flag = FALSE;   /* check the REPvars->prev_line for viol.f
PRIVATE LINE_CHECK first_line;
/* 00v05+ */
BOOL     fnote_error = FALSE;
/* 00v05- */

/* 00v06+ */
TEXT     temp_buf[5], buffer[5];
TEXT     *string[2];
UTINY    length, pad;
TEXT     *ptr;
ULONG    num;
UINT     lc1;
BOOL fit_on_page;

/* 00v10+ */
DMLTYPE     type;
DMLTYPE     fntype;
DMLITEM     item;
DMLREFATTR  datta;
/* 00v10- */

PRIVATE UTINY last_page_EOP[3];

/* return an error if the header cannot fit on the page in its entirety */
if (MDvars->hf_flag)
    {
    if (MDvars->hf_flag == 1)
        {
        Fmod_line_count(&lc1, 0, &fit_on_page);

if ((REPvars->REP_brk_page_flag) && (lc1 > 0))
            return(SUCCESS);
```

```
            num = MDvars->current_page;
            if (MDvars->error_status = NTulngdec(num, buffer, &ptr))
                return(FAILED);

length = STclength(buffer);
            STbfill(4, 0x30, temp_buf);
            pad = 4 - length;
            STccopy(buffer, temp_buf + pad);
            string[0] = temp_buf;
            string[1] = NULL;
            if (MDvars->error_status = ODputmsg(MSG_HEADER, string))

return(FAILED);

return(FAILED);
            } return(SUCCESS);
        }
/* 00v06- */

/* don't check headers and footers    */
                            /* for violations                     */
if (MDvars->hf_flag >= 1)
    return(SUCCESS);

/* check violations only for the lesser */
                            /* of the current and previous columns  */
if (REPvars->prev_line.num_cols < MDvars->num_cols)
    cols = REPvars->prev_line.num_cols;
else
    cols = MDvars->num_cols;

/* if there are footnote(s) on the line, check *
                            /* that at least the first two lines of each   *
                            /* fit on the page                             *
/*  if ((MDvars->column_in == MDvars->num_cols) && (fnote_on_line > 0)
    || ((fn_next_page) && (REPvars->first_line_flag))) */ if ((REPvars->REP_brk_page_flag) && (MDvars->gps->application.wp.fnote_lo
        {
        if ((fnote_on_line || (fn_next_page && REPvars->first_line_flag))
            && !check_next_line)
            {
/* 00v08+ */
            /* if reserve area on line, stop processing ra to process fnt */
            if (REPvars->curr_line.pos_overflow[MDvars->column_in])
                save_graph_values();
/* 00v08- */
            ret_val = Rfootnotes();

madj_point = TRUE;      /* set flag to adjust 1/3 component */ fn_flag = FALSE;

/* if the return value is FAILED, check to see
                            /* if there is a "real" error. Do to recursive
                            /* logic, some errors have to be faked to break
                            /* out of loops correctly.
            if (ret_val != SUCCESS)
                {
                if (MDvars->error_status)
                    return(FAILED);
/* 00v05+ */
                if (REPvars->first_line_flag)
                    {
                    for (i = 0; i <= MDvars->num_cols; i++)
                        {
                        if (REPvars->curr_line.pos_len_ftnote[i] == TRUE)
                            fnote_error = TRUE;
                        }
                                            /* put the error into the note
                    if (fnote_error)
                        {
                        STbcopy(sizeof(LINE_CHECK),
                            (TEXT*)&REPvars->curr_line, (TEXT*)&REPvars->las
                        if (Remsg() != SUCCESS)
                            return(FAILED);
                        }
```

```
                return(FAILED);

}
/* 00v05- */

}
            fnote_on_line = 0;

/* if check_next_line = TRUE, the last line of main text had a footnote   */
/* that caused the page to break. Since two lines of each footnote has    */
/* been processed it is possible to break the page on this line.  Set the */
/* brk_page flag so that a "look ahead" line of main text is processed to */
/* insure the line line that broke the page is not a widow or an orphan.  */
            if ((check_next_line) && (!REPvars->end_doc_flag))
                {
/* if the page breaks after only the first line of text has been processed, */
/* don't bother looking ahead */

/* 00v04+ */
/* comment lines out */
/*                  if (REPvars->first_line_flag)
/*                      {
/*                          STbcopy(sizeof(LINE_CHECK), (TEXT*)&REPvars->curr_lin
/*                          STbcopy(sizeof(LINE_CHECK), (TEXT*)&REPvars->curr_lin
/*                      }
/*                  else
/* 00v04- */
                        REPvars->REP_brk_page_flag = 1;
                }
/* 00v08+ */
            /* if ra on line, after process ftnote continue to process ra */
            if (REPvars->curr_line.pos_overflow[MDvars->column_in])
                restore_graph_values();

/* if the ftnote fits on the page, check if the rest of the */
            /* reserve area will also fit. */
            if ((REPvars->curr_line.pos_overflow[MDvars->column_in]) &&
                (REPvars->REP_brk_page_flag))
                REPvars->REP_brk_page_flag = graph_fits(check_next_line);
/* 00v08- */
        }
    } if (REPvars->first_line_flag)
        STbcopy(sizeof(LINE_CHECK), (TEXT*)&REPvars->curr_line, (TEXT*)&first
                            /* if the line fits on the page,        */
                            /* update the curr. and prev. line's    */
                            /* structure members for each column.   */
    if (REPvars->REP_brk_page_flag)
        {
                            /* if this is the last page to repag,   */
                            /* call the output driver to build      */
                            /* the page.                            */
        if (REPvars->end_doc_flag)
            {
            REPvars->end_doc_flag = FALSE;
            pps.pageinfo = 0;   /* don't insert a page break-- last page */

/* invoke the Output Driver and reset */
                            /* variables                          */
            if (Rpage_break() != SUCCESS)
                return(FAILED);
            else
                return(SUCCESS);
            }

/* if the flag is set, then don't worry */
                            /* about widows and orphans */
        if (!MDvars->gps->application.wp.rep_wo)
            {
            for (i = 0; i <= cols; i++)
                {
                            /* set the widow flag and increment the  *
                            /* number of violations on the line if,  *
                            /* the current line is the end of a      *
                            /* paragraph, the previous line is not   *
                            /* the EOL or an orphan, and it's not    *
                            /* the first line on the page.           *
                if (REPvars->curr_line.EOP[i])
```

```
            {
            if ((!REPvars->first_line_flag) && (!REPvars->prev_line.p
               (!REPvars->prev_line.EOP[i]))
               {
                  REPvars->prev_line.pos_widow[i] = TRUE;
                  ++REPvars->prev_line.num_violations[i];
               }
            }
/* 00v07+ */
            else
            {
/* Set a the possible orphan flag if the first line of main text is being  */
/* processed, AND there were no cascading footnotes AND the previous page  */
/* did not end with a CR                                                   */
            if (REPvars->first_line_flag == TRUE)
               {
                  if ((fn_next_page) && (!last_page_EOP[i]))
                     ;
                  else
                  {
                     REPvars->curr_line.pos_orphan[i] = TRUE;
                     ++REPvars->curr_line.num_violations[i];
                  } last_page_EOP[i] = FALSE;

} if (REPvars->prev_line.EOP[i])
               {
                  REPvars->curr_line.pos_orphan[i] = TRUE;
                  ++REPvars->curr_line.num_violations[i];
               }
            }
/* 00v07- */

/* if the curr. line does not end a paragraph *
                        /* and the prev. line is a widow, or it's the *
                        /* first line on the page, set the orphan     *
                        /* flag for the REPvars->curr_line.           *
/*          else
/*             {
/*             if ((REPvars->prev_line.EOP[i]) || (REPvars->first_line_
/*                {
/*                REPvars->curr_line.pos_orphan[i] = TRUE;
/*                ++REPvars->curr_line.num_violations[i];
/*                }
            } /* end loop */
         }
                        /* indicate the first line of text on the page *
                        /* has been processed, and check the previous  *
                        /* line for any violations.                    *
         REPvars->first_line_flag = FALSE;
         prev_line_check(cols);

/* copy the REPvars->curr_line into the REPvars
                        /* processing the next line.
         STbcopy(sizeof(LINE_CHECK), (TEXT*)&REPvars->curr_line, (TEXT*)&RE
                                                 /* reset for next lin
         STbfill(sizeof(LINE_CHECK), 0x0, (TEXT*)&REPvars->curr_line);

}
      else
         {
         if (REPvars->end_doc_flag)
            {
            STbcopy(sizeof(LINE_CHECK), (TEXT*)&REPvars->curr_line, (TEXT*)&
            STbcopy(sizeof(LINE_CHECK), (TEXT*)&REPvars->curr_line, (TEXT*)&
            }
/* 10/19 */ /*  if (REPvars->first_line_flag)  */

/* if the flag is set, then don't worry  */
                        /* about widows and orphans              */
         if (!MDvars->gps->application.wp.rep_wo)
            {
```

```
                                            /* if the line doesn't fit */
                                            /* on the page.            */
            for (i = 0; i <= cols; i++)
            {
                                /* if the current line is the end of a  *
                                /* paragraph, and the previous line is  *
                                /* not, set the widow violation for the *
                                /* previous line and set the backup to  *
                                /* last good line flag TRUE.            * if (REPvars->curr_line.EOP[i])
                    {
                    if (!REPvars->prev_line.EOP[i])
                        {
                        REPvars->prev_line.pos_widow[i] = TRUE;
                        ++REPvars->prev_line.num_violations[i];
                        backup_flag = TRUE;
                        }
                    else
                                /* There are 2 lines that end a paragraph
                                /* in a row, check the previous line for
                                /* any violations.
                        check_prev_flag = TRUE;
                    }
                else
                                /* if the current line isn't the end of a
                                /* paragraph.
                    {
                                /* orphan violation, backup to the last
                                /* good line.
                    if (REPvars->prev_line.pos_orphan[i])
                        backup_flag = TRUE;

else
                                /* set the check_prev_flag to check the *
                                /* previous line.                       *
                        check_prev_flag = TRUE;
                    }
            }
        else                        /* set the check_prev_flag to check  */
/* 7/28 */   check_prev_flag = TRUE;  /* the previous line.              */

/* if the backup flag is FALSE, check */
                                /* the previous line for violations.  */
                                /* if none appear, then this line will*/
                                /* be the last line on the page.      */
        if (!backup_flag)
            {
            if (check_prev_flag)
                prev_line_check(cols);
            } if (MDvars->error_status = DMsqstop(&MDvars->pb_ptr))
            return(FAILED);

if (MDvars->error_status = DMsqinit(&REPvars->last_good.pb_ptrs[0]))
            {
/*          printf("\nVIOLATION ON PAGE !!!!!!!!!!!!!!!!!!!!\n\n"); */
            if (ERget() == DMEPBINV)
                {
                STbcopy(sizeof(LINE_CHECK), (TEXT*)&REPvars->prev_line,
                    (TEXT*)&REPvars->last_good);
/* 00v09+ */
/* If the last good PB pointer is still bad after copying prev line ptr */
/* into last good then copy curr line ptr into last good ptr */
                if (MDvars->error_status = DMsqinit(&REPvars->last_good.pb_ptr
                    {
                    if (ERget() == DMEPBINV)
                        STbcopy(sizeof(LINE_CHECK), (TEXT*)&REPvars->curr_line,
                            (TEXT*)&REPvars->last_good);
/* 00v09- */
                    }
                }
/* put the error into the note */
            if (Remsg() != SUCCESS)
                return(FAILED);
            }
```

```
                                           /* fill page builder structure */
          pps.colcntend = REPvars->last_good.num_cols;

/* this section of code bumps up the */
                                           /* PB pointers one place so that page*/
                                           /* breaks are inserted properly.     */
          for (i = 0; i <= REPvars->last_good.num_cols; i++)
              {

/* if the columns finished, don't advance the PB .. nasty things happen */
              if (REPvars->last_good.column_info[i])
                  {
                  if (MDvars->error_status = DMsqinit(&REPvars->last_good.p
                      return(FAILED);

DMsqadvance();

if (MDvars->error_status = DMsqstop(&REPvars->last_good.p
                      return(FAILED);
                  }

STbcopy(MDvars->dmlpb_size, (TEXT *)&REPvars->last_good.pb_p
                      (TEXT *)&pps.endpb[i]);

/* 00v07+ */
                  last_page_EOP[i] = REPvars->last_good.EOP[i];
/* 00v07- */
              }

/* reinitialize the current PB pointer */
          if (MDvars->error_status = DMsqinit(&MDvars->pb_ptr))
              return(FAILED);
          pps.pageinfo = 1;       /* insert a soft page break */ if (MDvars->gps->application.wp.footnotes == WP_FTNOTES)
              {
              while (REPvars->last_good.last_ftnote < fnqcb.nextin)
                  {
/* 8/5 */         fn_next_page = 0;
/* 00v10+ */
                  if (FNqread(&fnqcb, fnqcb.nextin - 1, &qdata_buffer))
                      return(FAILED);

if (MDvars->error_status = DMrefginfo(&qdata_buffer.fnre
                                              &type, &fmtype, &item, &datta))
                      return(FAILED);

if (datta.footnote.labeltype != DMLFNLABUSER)
                      {
/* 00v10- */
                      if (MDvars->gps->application.wp.fnote_seq_num == WP
                          FNbackup_other(1);
                      else
/* 00v02-*/
/* 00v11+ */
                          {
/*                        --REPvars->fn_num;     */ if (MDvars->gps->application.wp.fnote_seq_num =
                              {
                              if (REPvars->fn_num == 1)
                                  REPvars->fn_num = 15000;
                              else
                                  --REPvars->fn_num;
                              }
                          else
                              if (MDvars->gps->application.wp.fnote_seq_num
                                  {
                                  if (REPvars->fn_num == 'a')
                                      REPvars->fn_num = 'z';
                                  else
                                      --REPvars->fn_num;
                                  }
                              else
                                  if (MDvars->gps->application.wp.fnote_seq_num
                                      {
                                      if (REPvars->fn_num == 1)
                                          REPvars->fn_num = 187;
                                      else
                                          --REPvars->fn_num;
                                      }
```

```
/* 00v11- */
                                    }

--fnqcb.nextin;
                        if (FNqremove(&fnqcb, fnqcb.nextin, &buffnelem, &retfnel
                            return(ERget());

}
/* 00v02+ */
            }

/* invoke the Output Driver and reset */
                                        /* variables                           */
            REPvars->last_line_position = REPvars->last_good.cur_line_position;
            if (Rpage_break() != SUCCESS)
                return(FAILED);

/* clear the end of document flag
                                        /* since we are backing up the page
            REPvars->end_doc_flag = FALSE;

} return(SUCCESS);
}

/*------------------------------------------------------------------------
/*      Module   : PREV_LINE_CHECK
/*
/*      Description: This routine will check for violations on the previous
/*                   line. If none exist, then this line becomes the last
/*                   good backup position.
/*------------------------------------------------------------------------

EXPORT ERROR prev_line_check(num_cols)
    USHORT num_cols;                  /* # of columns to check */
    {
UTINY   i;                            /* loop indexer */
UTINY   v_flag = FALSE;               /* flag any violations on the line */ for (i = 0; i <= num_cols; i++)
            {
            if (REPvars->prev_line.num_violations[i])
                {
                v_flag = TRUE;
                break;
                }
            }

/* if there are no violations then the  */
                                    /* previous line becomes the last good  */
                                    /* line.                                */
        if (!v_flag)
            STbcopy(sizeof(LINE_CHECK), (TEXT*)&REPvars->prev_line, (TEXT*)&REPv
        return;
        }
```

```
/*---------------------------------------------------------------------*/
/*    Copyright (C) 1986 Wang Laboratories, Inc.    All rights reserved  */
/*                                                                       */
/*      Module   : RPAGE_BREAK                                           */
/*      Creation : 11-16-88                                              */
/*      Author   : Dave Chirokas                                         */
/*                                                                       */
/*      Description: This routine is called when the repaginator determines */
/*                   the location to break the page, or the end of the document */
/*                   is reached.  First, RSLASH_CR is called to insert   */
/*                   slashfill (if specified from the menus) and if a footer */
/*                   exists on the page, carriage returns are inserted to */
/*                   properly space it in the ouput document.  Next, the ouput */
/*                   driver is invoked to build the page (ODBLDPAGE) based on */
/*                   the parameters specified in the PPS, GPS, and FNQ. */
/*                   Variables are then reset for the start of the next page. */
/*                                                                       */
/*                                                                       */
/*                                                                       */
/*      Inputs:  none.                                                   */
/*                                                                       */
/*      Outputs: none.                                                   */
/*                                                                       */
/*                                                                       */
/*    Rev #     Date     Revisor         Revision History                */
/*    00v00    11-16-88    dc      Created -- seperated from FVmanage()  */
/*    00v01    01-26-89    dc      get ending pbptr for end of doc fnotes */
/*    00v02    02-13-89    dc      notify OD if hyphen ended the page    */
/*    00v03    03-27-89    dc      BUG 151 clear hdr/ftr flags after page */
/*    00v04    04-13-89    dc      BUG 156 user defined fn labels aren't */
/*                                 handled properly                      */
/*    00v05    04-21-89    dc      fix for BUG 156 fix (same code)       */
/*    00v06    04-26-89    MTP     Clear indent level when end of document */
/*                                 or end of column                      */
/*                                                                       */
/*---------------------------------------------------------------------*/
#include <rINCLUDE.H>    /* include all neccesary headers */
IMPORT ERROR ODbldpage();         /* builds a page in the output document */
IMPORT ERROR Rslash_cr();         /* inserts slashfill and carriage returns */
/* 00v04+ */
IMPORT ERROR Rfnident();          /* store the queue identifier */
/* 00v04- */
PRIVATE UTINY debug_page_num;
/* 00v04+ */
EXPORT UINT last_fn;
/* 00v04- */
EXPORT ERROR Rpage_break()
    $
UTINY i = 0;                      /* loop indexer */
DMLITEM end_page;
/* determine the number of slashfill lines and carriage returns (if necessary)*/
    if (RSLASH_CR() != SUCCESS)
        return(FAILED);
/* pound signs (#) in continuation messages are no longer being replaced by */
/* page numbers */
    if (MDvars->gps->application.wp.footnotes)
        $
        pps.ctpndsign = FALSE;
        pps.cfpndsign = FALSE;
        é
                                            /* insert indents at start */
    chk_indent = TRUE;                      /* of next page if necessary */
                                            /* save indent info. for the */
                                            /* start of the next page    */
    for (i = 0; i <= REPvars->last_good.num_cols; i++)
        $
/* 00v06+ */
        if (REPvars->last_good.column_info[i] != 0)
            pps.indentlvl[i] = REPvars->last_good.indents[i];
        else
            pps.indentlvl[i] = 0;
/* 00v06- */
/* 00v02+ */
        pps.end_hyphen[i] = REPvars->last_good.pos_hyphen[i];
/* 00v02- */
        é
/* 00v06+ */
/* if end of document has been reached clear indent level for all columns */
    if (REPvars->end_doc_flag)
        i = 0;
/* 00v06- */
```

```
                                             /* zero out columns not used */
        while (i <= MAXCOL)
            $
             pps.indentlvl[i] = 0;
             ++i;
            é
/* 00v01 + */
/* use the pbptr of the last character on the last page for end of document */
/* footnotes */
        if (proc_endnotes)
            $
                if (MDvars->error_status = DMpglast(&end_page))
                    return(FAILED);
                if (MDvars->error_status = DMpgend(end_page, &pps.endpb[0]))
                    return(FAILED);
            é
/* 00v01- */
/* 00v04+ */
/* if footnotes are being processed, call Rfnident to check for user defined*/
/* labels and upon finding them, convert them to numbers so the output      */
/* driver can number them properly.                                         */
        if ((MDvars->gps->application.wp.footnotes == WP_FTNOTES)
            && (fnqcb.nextin))
            $
             if (last_fn < fnqcb.nextin)
                $
                 if (Rfnident(last_fn) != SUCCESS)
                    return(FAILED);
                é
            é
/* 00v04- */
                                             /* build the page */
        printf("invoking ODbldpage page %d\n", debug_page_num);
        ++debug_page_num;
        if (MDvars->error_status = ODbldpage())

$
             printf("ODbldpage failed %lx\n",MDvars->error_status);
             return(FAILED);
            é
/* 00v04+ */
        last_fn = fnqcb.nextin;
/* 00v04- */
/* If footnote numbering is reset for each page and footnotes are being     */
/* processed at the end of pages, reset the starting footnote number (for   */
/* FNidbuffer() */
        if ((MDvars->gps->application.wp.fnote_loc == WP_FN_END_PG) &&
            (MDvars->gps->application.wp.fn_numbering == WP_RESET_NUM))
                first_fn_flag = TRUE;
        fnote_index_num = 0;                 /* reset to access 1st fnote */
        fnote_on_line = 0;
        fnqcb.fns_on_page = 0;               /* reset count (for end_doc)*/
                                             /* reset so fn separator is */
        sep_done = FALSE;                    /* processed on the next page*/
        check_next_line = FALSE;             /* reset */
        REPvars->last_line_position = 0;
        pps.delomit = FALSE;                 /* reset omitted text flag */
        pps.delpages = FALSE;                /* reset deleted pages flag */
/* 00v03+ */
        pps.hdrcnt = FALSE;                  /* clear header flag */
        pps.ftrcnt = FALSE;                  /* clear footer flag */
/* 00v03- */
        madj_point = FALSE;                  /* reset 1/3 component flag */
        STbfill(sizeof(LINE_CHECK), 0x0, (TEXT*)&REPvars->prev_line);
        STbfill(sizeof(LINE_CHECK), 0x0, (TEXT*)&REPvars->last_good);
        STbfill(sizeof(LINE_CHECK), 0x0, (TEXT*)&REPvars->curr_line);
        REPvars->first_line_flag = TRUE;
        REPvars->REP_brk_page_flag = 1;
/* return the error_status REP_END_PAGE and failed to get back to the main() */
/* this is a known kludge                                                    */
        MDvars->error_status = REP_ENDPAGE;
        return(FAILED);
        é
```

A0000001

FILE A0000001 IN LIBRARY #ASCTEMP ON VOLUME SYSTEM
10:09:29 AM   DECEMBER 11, 1989         207 LINES        1 COPY
BY USER IWS (AT WORKSTATION 100)
PRINT CLASS R    FORM# 000    PRINTER 14

```
/*---------------------------------------------------------------------*/
/*    Copyright (C) 1986 Wang Laboratories, Inc.   All rights reserved  */
/*                                                                     */
/*    Module   : RPRTLNGR                                               */
/*    Creation : 03-06-88                                               */
/*    Author   : Dave Chirokas                                          */
/*                                                                     */
/*    Description:                                                     */
/*         This Repaginator routine will send each script level to the */
/*    Formatter who will determine if it can fit on the line. If it can't, */
/*    the Violation manager will be invoked to backup the page to the  */
/*    last good line and invoke the Output Driver. This routine is only */
/*    used for repagination.                                            */
/*                                                                     */
/*    Inputs: none.                                                    */
/*                                                                     */
/*    Outputs: none.                                                   */
/*                                                                     */
/*                                                                     */
/*    Rev #    Date     Revisor          Revision History              */
/*    00v00   10-03-88    dc      removed pps.ftr stuff                */
/*    00v01   12-08-88    dc      font_type = pitch when printer = TYPESETTER*/
/*                                and line of text is all pitched fonts */
/*    00v02   02-13-89    dc      save the hyphen value in the footnote queue*/
/*    00v03   02-29-89    dc      BUG 117,118 remove archaic code      */
/*    00v04   04-21-89    MTP     BUG 160 update indent level count only if */
/*                                the line fits on the page            */
/*                                                                     */
/*---------------------------------------------------------------------*/
#include <rINCLUDE.H>   /* include all neccesary headers */
IMPORT ERROR Mprt_script();              /* print the line */
IMPORT ERROR Mvi_manager();              /* check for Repag violations */
IMPORT ERROR Rprocess_2_lines();         /* process 2 fn lines check */
IMPORT ERROR DMsqinit();                 /* initialize sequential access */
IMPORT ERROR DMsqstop();                 /* stop sequential access */
IMPORT VOID  Fmod_line_count();          /* modify the fmt line count */
IMPORT VOID  Freset_for_next_line();     /* reset fmt for next line */
IMPORT VOID  Fadvance_by_one_line();     /*advance to next line */
IMPORT ERROR Mvi_endnotes();
EXPORT ERROR Rprtlngr()
$
BOOL fit_on_page;       /* line fit on page flag 1 = fit, 0 = no fit */
UINT lcl;
 font_type = TYPE_WRITER;/* initially set to be type writer */
/* 00v01+ */
                        /* determine the font type for the line of text */
                        /* that was just formatted. If all the chars on */
                        /* the line are pitched, set the font_type to   */
                        /* WRITER. Set the point size to 12 if the line */
                        /* is all pitched or there is a mixture with the */
                        /* largest pointsize less than 12 point.        */
if (dev_type)
    $
    font_type = TYPE_SETTER;
    if (MDvars->lpitch)
        $
        if (MDvars->line_ptsize == 0)
            font_type = TYPE_WRITER;
        if (MDvars->line_ptsize <= 12)
            MDvars->line_ptsize = 12;
        é
    é
/* 00v01- */
                        /* Send each line script level to the formatter. If */
                        /* REP_brk_page_flag returns a FALSE, the script */
                        /* level couldn't fit on the page. Jump out and */
                        /* call the violation manager.                  */
```

```
        if (check_next_line)
            REPvars->REP_brk_page_flag = 0;
    /* new 8/2 */
    if (dev_type)
        ș
            if (!fn_flag)
                REPvars->curr_line.max_ptsize_on_line = MDvars->line_ptsize;
            if ((fin_fnflag) && ((qdata_buffer.lastlnmaxpt != MDvars->line_ptsize)))
                Fadj_diff_point_size(qdata_buffer.lastlnmaxpt, MDvars->line_ptsize,
                    &REPvars->REP_brk_page_flag);
            else
                ș
                if ((madj_point) && ((REPvars->prev_line.max_ptsize_on_line != MDvars->line_ptsize
                    Fadj_diff_point_size(REPvars->prev_line.max_ptsize_on_line, MDvars->line_ptsize,
                        &REPvars->REP_brk_page_flag);
                é
            Fget_desired_line_count(NORMAL, &REPvars->REP_brk_page_flag,
                            MDvars->line_ptsize, font_type);
        é
    else
        ș
        while (TRUE)
            ș
                if (MDvars->error_status = Mprt_script(SUPSUPSCRIPT))
                    return(FAILED);
                if (!REPvars->REP_brk_page_flag)
                    break;
                if (MDvars->error_status = Mprt_script(SUPERSCRIPT))
                    return(FAILED);
                if (!REPvars->REP_brk_page_flag)
                    break;
                if (MDvars->error_status = Mprt_script(NORMAL))
                    return(FAILED);
                if (!REPvars->REP_brk_page_flag)
                    break;
                Fadvance_by_one_line(&REPvars->REP_brk_page_flag);
                if (!REPvars->REP_brk_page_flag)
/* 00v03+ */
                    break;
/*              ș                                          */
/* if there is a footer on the page, do not allow this line to fit on the page */
/* since it will screw up the positioning of the footer. If there isn't a      */
/* footer, allow the line to fit. The next line will break the page.           */
/*              if (pps.ftrcnt)                              */
/*                  break;                                   */
/*              else                                         */
/*                  ș                                        */
/*                  REPvars->REP_brk_page_flag = 1;          */
/* 9/27 dc        check_next_line = TRUE;                    */
/*                  é                                        */
/*                                                           */
/* 00v03- */
                if (MDvars->error_status = Mprt_script(SUBSCRIPT))
                    return(FAILED);
                if (!REPvars->REP_brk_page_flag)
                    break;
                if (MDvars->error_status = Mprt_script(SUBSUBSCRIPT))
                    return(FAILED);
                break;
            é
        é
    Freset_for_next_line(0);
    /* if a footnote is being processed and the page is to be broken, check   */
    /* that at least two lines of the footnote and the cont. msg have been    */
    /* processed. If they haven't, the line of main text will be shifted to   */
    /* the next page. If the page doesn't break, normal footnote processing   */
    /* will occur. */
    if (fn_flag)
        ș
/* 00v04+
        if (!proc_cm_flag)
            qdata_buffer.fnindlvl = Findnt_count();
    00v04- */
        if (!REPvars->REP_brk_page_flag) /* denotes page broke while processing */
            ș                            /* a footnote */
            if (!proc_2_fn_lines)
                ș
                if (MDvars->error_status = DMsqstop(&MDvars->pb_ptr))
                    return(FAILED);
                STbcopy((BYTE *)&MDvars->pb,(BYTE *)&MDvars->primary_pb[0],
```

```c
            if (MDvars->error_status = DMsqinit(&MDvars->pb_ptr))
                return(FAILED);
                                        /* set the flag to check a look ahead */
                                        /* line so no violations will be      */
                                        /* created */
            check_next_line = TRUE;
        é
    else
        §
        DMsqgpb(&MDvars->pb_ptr);
/* save the largest pointsize of the last footnote line processed */
        if ((dev_type) && (!proc_cm_flag))
            qdata_buffer.lastlnmaxpt = MDvars->line_ptsize;
/* save the current pb of the footnote in case the page breaks on the next */
/* line of the footnote */
        STbcopy(MDvars->dmlpb_size, (TEXT *)&MDvars->pb_ptr,
                (TEXT *)&MDvars->primary_pb[0]);
/* Rprocess_2_lines() will make sure that 2 lines of each fn is processed */
        if ((proc_2_fn_lines) && (!proc_cm_flag))
            Rprocess_2_lines();
/* 00v02+ */
        qdata_buffer.last_hyphen = (BOOL)REPvars->last_hyphen;
/* 00v02- */
/* 00v04+ */
/* Update the indent level only if the line fits on the page */
        if (!proc_cm_flag)
            qdata_buffer.fnindlvl = Findnt_count();
/* 00v04- */
        Fmod_line_count(&lcl, 0, &fit_on_page);
        REPvars->curr_line.cur_line_position = (SHORT)lcl;
        é
    é
    else        /* not processing a footnote */
        §
/* save the line count before characters are sent to the formatter */
    Fmod_line_count(&lcl, 0, &fit_on_page);
    REPvars->curr_line.cur_line_position = (SHORT)lcl;
    REPvars->last_line_position = REPvars->curr_line.cur_line_position;
    if (proc_endnotes == TRUE)
        §
        if (Mvi_endnotes() != SUCCESS)
            return(FAILED);
        é
    else
        §
/* Call the Violation Manager to check for possible Repagination errors */
        if (Mvi_manager() != SUCCESS)
            return(FAILED);
        é
    é
/* clear point sizing variables */
MDvars->line_ptsize = 0;
MDvars->word_ptsize = 0;
/* MDvars->char_ptsize = 0; */
MDvars->wpitch = FALSE;
MDvars->lpitch = FALSE;
return(SUCCESS);
é
```

A:\FPRTTEXT.C          Date:12/11/1989          Time:09:23:27

```
FFFFFFF  PPPPPP  RRRRRR  TTTTTT  TTTTTT  EEEEEE  XX  XX  TTTTTT
  FF  F    PP PP   RR RR  T TT T   T TT T   EE  E   XX  XX  T TT T
  FF F     PP PP   RR RR    TT       TT     EE E    XX XX     TT
  FFFF     PPPPP   RRRRR    TT       TT     EEEE    XXX       TT
  FF F     PP      RR RR    TT       TT     EE E    XXX       TT
  FF       PP      RR RR    TT       TT     EE  E   XX XX     TT
  FFFF     PPPP    RRR RR   TTTT     TTTT   EEEEEE  XX  XX   TTTT

FFFFFFF  PPPPPP  RRRRRR  TTTTTT  TTTTTT  EEEEEE  XX  XX  TTTTTT
  FF  F    PP PP   RR RR  T TT T   T TT T   EE  E   XX  XX  T TT T
  FF F     PP PP   RR RR    TT       TT     EE E    XX XX     TT
  FFFF     PPPPP   RRRRR    TT       TT     EEEE    XXX       TT
  FF F     PP      RR RR    TT       TT     EE E    XXX       TT
  FF       PP      RR RR    TT       TT     EE  E   XX XX     TT
  FFFF     PPPP    RRR RR   TTTT     TTTT   EEEEEE  XX  XX   TTTT

FFFFFFF  PPPPPP  RRRRRR  TTTTTT  TTTTTT  EEEEEE  XX  XX  TTTTTT
  FF  F    PP PP   RR RR  T TT T   T TT T   EE  E   XX  XX  T TT T
  FF F     PP PP   RR RR    TT       TT     EE E    XX XX     TT
  FFFF     PPPPP   RRRRR    TT       TT     EEEE    XXX       TT
  FF F     PP      RR RR    TT       TT     EE E    XXX       TT
  FF       PP      RR RR    TT       TT     EE  E   XX XX     TT
  FFFF     PPPP    RRR RR   TTTT     TTTT   EEEEEE  XX  XX   TTTT

FFFFFFF  PPPPPP  RRRRRR  TTTTTT  TTTTTT  EEEEEE  XX  XX  TTTTTT
  FF  F    PP PP   RR RR  T TT T   T TT T   EE  E   XX  XX  T TT T
  FF F     PP PP   RR RR    TT       TT     EE E    XX XX     TT
  FFFF     PPPPP   RRRRR    TT       TT     EEEE    XXX       TT
  FF F     PP      RR RR    TT       TT     EE E    XXX       TT
  FF       PP      RR RR    TT       TT     EE  E   XX XX     TT
  FFFF     PPPP    RRR RR   TTTT     TTTT   EEEEEE  XX  XX   TTTT
```

```c
/*-------------------------------------------------------------------
/*    Copyright (C) 1986 Wang Laboratories, Inc.   All rights reserved
/*
/*      Module     : MPRTTEXT
/*      Creation   :
/*      Author     : Dave Chirokas
/*
/*      Description:
/*                  This module gets characters one by one from the page
/*                  and processes them accordingly. Regular characters are
/*                  sent to the formatter until an entire line has been
/*                  formatted and is ready to print.
/*
/*      Inputs:
/*
/*      Outputs:
/*
/*
/*    Rev #     Date        Revisor         Revision History
/*    00v00    01/23/89     dc              added support for IMAGES and SCI EQU.
/*    00v01    02/10/89     dc              fixes bug with casc. FNs at end of doc
/*    00v02    02/26/89     dc              bug 105 Cascading FNs at end of doc
/*                                            fail
/*    00v03    03/02/89     dc              FNs at end of doc that cascade over
/*                                            several pages fails
/*    00v04    03/30/89     dc              BUG 130 change data.attr to data.type
/*    00v05    03/31/89     MTP             bug 21,126 reserved area overflow at
/*                                            end of document
/*    00v06    04-07-89     dc              BUG157 don't chk hdr/ftr for violation
/*
/*------------------------------------------------------------------- include <rINCLUDE.H>    /* include all neccesary headers */

/* IMPORTable routines*/
IMPORT STATUS Madvance2();                  /* advance to next sequential
IMPORT STATUS Mset_format();                /* get the format line/ set u
IMPORT STATUS Mformat();                    /* send char. to formatter, ha
IMPORT STATUS Mprint_line();                /* print the column or line */
```

```
IMPORT STATUS Ncolumns();                /* handle columns */
IMPORT ERROR DMexrginfo();               /* get attribute word data for
IMPORT ERROR DMnmget();                  /* get the name of a reference
IMPORT VOID Fdo_dummy();                 /* pass dummy space to formatt
IMPORT ERROR MFNqadd();                  /* add a footnote to the queue ifdef REPAG
IMPORT ERROR FNidbuf();                  /* convert the fn # to ASCII *
IMPORT ERROR MFNidtext();                /* process footnote ID */
endif /* 00v05+ */
IMPORT BOOL check_graph_fits();
/* 00v05- */

EXPORT STATUS Mprt_text()
{
TEXT       character;                    /* current character */
DMLVSMALL   data;                        /* ref. or char. attributes */
USHORT     status;                       /* return status */
UTINY      num_sign = 0;                 /* page numbering flag */
USHORT     ext_obj_type;                 /* type of object specified by the ext
USHORT     ext_type_ptr;                 /* type of external reference VS, MSDO
UTINY      advance = FALSE;              /* flag to advance the character */
UTINY      col_done;                     /* number of columns completed */
UTINY      i;                            /* loop indexer */
TEXT       ref_char = DUMMY_CHAR;        /* reference replacement character */
/* UTINY      wrap_flag = FALSE;            /* wordwrap flag */
UTINY      send_2_formatter = FALSE;
/* 00v05+ */
BOOL       ra_flag = FALSE;              /* flag to indicate reserved */
/* 00v05- */ ifdef REPAG
TEXT id_buf[12];
#endif

/* get the next sequential character from the document. If it is a reference
/* attribute, call the correct routine and process. */
while ((MDvars->error_status = DMsqgsmall(&character, &data)) == ERSUCCESS)
    {

/* if the character is a reference attribute, get the type and process */
/* accordingly. */
        if (character == DMLCHATTR)
            {
            if ((MDvars->gps->application.wp.opttext == 0) && (DMLVBOPTION & da
                {
                send_2_formatter = TRUE;
                pps.delomit = TRUE;
                }
            else
            if ((MDvars->gps->application.wp.redline == 0) && (DMLVBDEL & data.
                {
                send_2_formatter = TRUE;
                pps.delomit = TRUE;
                }
            else
              switch (data.type)
                {

/* format reference */
            case DMLTYFORMAT:

/* if the data type is a format reference, call Fset_format to process it, */
/* only if we are in the primary document (XDOC = 0). Format lines do not */
/* get processed in merge documents */
                if (!MDvars->XDOC)          /* 0 = primary, 1 = second
                    {
                    if ((status = Mset_format()) != SUCCESS)
                        {
                        if (status == DMLPGHARD)
                            {
/* 9-15 */                   if (MDvars->error_status = REP_ENDPAGE
/* 9-15*/                       return(FAILED);
```

```
                         if ((status = Madvance2()) != SUCCESS)
                             {
                                 if (status != END_OF_CHAIN)
                                     return(FAILED);
                             }
                         return(SUCCESS);
                         }
                    else
/* hdr/ftr sep, return to Mprthead or foot */
                         if (status == HF_SEP_FLAG)
                             return(HF_SEP_FLAG);
                         else
                             return(FAILED);
                    }

/* if line numbering is invoked and we are not processing a header or footer,
/* check print_line_num to see if a line # should be printed.  If equal to 1,
/* then print it and increment the counter. */ if ((MDvars->gps->application.wp.linenumbering ==
                        && (!MDvars->hf_flag))
                        {
/************************    if (MDvars->print_line_num)
                            {           /************************/
                            Fdo_linenum(LNSTART);
                            Mline_num(MDvars->current_line_num);
                            Fdo_linenum(LNSTOP);
                            ++MDvars->current_line_num;
/************************    MDvars->current_line_num += 2;
                            }           /************************/
                        } advance = TRUE;
                    break;

/* merge or don't merge reference attribute */
            case DMLTYDMRG:
            case DMLTYDNOMRG:

/* process the merge reference only if merge printing is being done */
                    if (MDvars->printapp == WP_MERGPRNT)
                        {
                        if (!MDvars->XDOC)          /* Primary document? (XD
                            {
                            MDvars->primary_atype = data.type;  /* set /* if there are more variables in this merg
                            /* set to print, call Mmerge to switch to t
                            /* variable set in the secondary document.

if (MDvars->merge_vars)         /* more varia
                                {
                                if (Mmerge() == FAILED)
                                    return(FAILED);
                                }
                            else
                                {
                                if (MDvars->primary_atype == DMLTYDMR
                                    send_2_formatter = TRUE;
                                }
                            /* If a no merge attribute (DMLTYDNOMRG) is
                            /* processed.  switch the PB back to the ma
                            /* and output a space character to the form if (MDvars->primary_atype == DMLTYDN
                                {
                                if (MDvars->XDOC)
                                    {
                                    if (Mmerge_switch() == FA
                                        return(FAILED);
                                    }
                                ref_char = SPACE;
                                send_2_formatter = TRUE;
                                }
                            }
                        else
                            {
                            /* Else we got either a merge or don't merg
                            /* the secondary file.  If it is a don't me
```

```c
                        /* clear the merge_vars flag to indicate th
                        /* variables are done for this variable set
                        /* back to the main document.

if (data.type == DMLTYDNOMRG)
                            MDvars->merge_vars = 0;

if (Mmerge_switch() == FAILED)
                            return(FAILED);

advance = TRUE;
                    }
                }
                else
                {
                    if (data.type == DMLTYDNOMRG)
                        ref_char = SPACE;
                    send_2_formatter = TRUE;
                }
                break;

/* If a DMLTYRSPACE reference is incurred, we are processing reserved area
/* Update the pb_ptr to point to the attribute and call DMexrginfo to get the
/* associated data block. Advance to the next character. */
            case DMLTYRSPACE:
                if (MDvars->rs_count <= 1)
                {
/*                      DMsqgpb(&MDvars->pb_ptr);   */
                    if (MDvars->error_status = DMsqstop(&MDvars->pb_
                        return(FAILED);

MDvars->save_type = data.type;  /* save the typ if (MDvars->error_status = DMexrginfo(&MDvars->
                        &MDvars->extdata[MDvars->rs_count]))
                        return(FAILED);

++MDvars->rs_count;     /* count the number of R
                    ++MDvars->rs_wrap_flag; /* for wordwrapping */
/*                  wrap_flag = TRUE;       */ if (MDvars->error_status = DMsqinit(&MDvars->pb_
                        return(FAILED);
                }
                send_2_formatter = TRUE;
                break;

/* If a DMLTYEXT reference is incurred, we are processing an external ref.
/* Update the pb_ptr to point to the attribute and call DMexrginfo to get the
/* associated data block. Advance to the next character. */
            case DMLTYEXT:
                if (MDvars->rs_count <= 1)
                {
/*                      DMsqgpb(&MDvars->pb_ptr);   */
                    if (MDvars->error_status = DMsqstop(&MDvars->pb_
                        return(FAILED);

MDvars->save_type = data.type;  /* save the typ if (MDvars->error_status = DMexrginfo(&MDvars->
                        &MDvars->extdata[MDvars->rs_count]))
                        return(FAILED);

/*                  if (data.type == DMLTYEXT)  */

/* 00v00+ */
                 /* if (MDvars->extdata[MDvars->rs_count].objtype =
                        DMLEXTYGRAPH) */
                    if ((MDvars->extdata[MDvars->rs_count].objtype
                        DMLEXTYGRAPH) ||
                        (MDvars->extdata[MDvars->rs_count].objtype
                        DMLEXTYIMAGE) ||
                        (MDvars->extdata[MDvars->rs_count].objtype
                        DMLEXTYEQU))
/* 00v00- */
                    {
                        if (MDvars->error_status = DMexget(MDvars-
                            &ext_type_ptr, &ext_obj_type,
                            &MDvars->ext_name_blk[MDvars->rs_count
                            return(FAILED);
```

```
                                ++MDvars->rs_count;      /* count the number
                                ++MDvars->rs_wrap_flag;  /* for wordwrappin
/*                              wrap_flag = TRUE;        */
                                } if (MDvars->error_status = DMsqinit(&MDvars->pb_
                                return(FAILED);

}
                       send_2_formatter = TRUE;
                       break;

/* stop reference code */
             case DMLTYSTOP:
                       send_2_formatter = TRUE;
                       ref_char = STOP_REF;
                       break;

#ifdef REPAG
             case DMLTYFTNOTE:
/* if a footnote is encountered and footnotes are not being printed or  */
/* check_next_line is set (a look ahead line is being processed to check */
/* for widow/orphan condition,therefore it is not necessary to check fns)*/
/* don't process footnotes */ if ((!MDvars->gps->application.wp.footnotes) ||
                                (check_next_line))
                                send_2_formatter = TRUE;
                           else
                             { if (MDvars->error_status = DMsqstop(&MDvars->pb_
                                     return(FAILED);

FNidbuffer(&REPvars->fn_num, &MDvars->pb_ptr, id if (MDvars->error_status = MFNqadd(&MDvars->pb_p
                                     return(FAILED);

++qid;

++fnote_on_line;

++fnid_in_word_count;    /* # of fn IDs in word g if (MDvars->error_status = DMsqinit(&MDvars->pb_
                                     return(FAILED);

/* pass the footnote ID to the formatter a character at a time
                                if (MFNidtext(id_buf, &advance, MFNID) != SUCCES
                                     return(FAILED);

}
                       break;
#endif

/* unsupported reference attributes */
             default:
                       send_2_formatter = TRUE;
                       break;
             }

/* for all reference attributes (except for the format reference attribute) */
/* send the reference replacement character to the formatter. */
             if (send_2_formatter)
                  {
/* 00v04+ */
/*                if (Mformat(ref_char,(DMLSMAP)0,data.attr) != SUCCESS)  */
                  if (Mformat(ref_char,(DMLSMAP)0,data.type) != SUCCESS)
/* 00v04- */
                       return(FAILED);

/* reset the reference replacement character */
                  ref_char = DUMMY_CHAR;
                  send_2_formatter = FALSE;
                  }
         }
```

```
/* If the character is an enter text character, it means we are done with
/* either the line or a column. If the enter text character is in the merge
/* document, switch back to the primary document */
        else
           if (character == DMLCHETX)
              {
              if (!MDvars->XDOC)
                 {
                                                /* if footnotes are being done •
                                                /* set fn_end_etx to indicate  •
                                                /* the fn line ended in an ETX •
                 if (fn_flag)
                     fn_end_etx = TRUE;

MDvars->Fformat_stat = 0;      /* for Rline_end when REPAG */

/* signify column is finished *
                 MDvars->column[MDvars->column_in] = 0;

if (Mprint_line() != SUCCESS)
                     return(FAILED);

if (Fbuf_test())
                    {
                    if (check_next_line)
                       {
                       REPvars->REP_brk_page_flag = 0;  /* break the page
/* cleanup violations */
                       if (Mvi_manager() != SUCCESS)
                          return(FAILED);
                       }
                    }

/* print the line and switch to the next column.
                 if (Mcolumns() == FAILED)
                    return(FAILED);
                 }
/* set flag to advance to the next column */
               advance = TRUE;
               }

/* if we are doing a hdr or ftr and a pound character (#) is being processed,
/* call Mnumber_page to handle page numbering. */
          else
               {

/* changed for REPAG. hf_flag = 1 -- header; = 2 -- footer */
/*          if ((MDvars->hf_flag == 1) && (character == '#'))         */
            if ((MDvars->hf_flag) && (character == '#'))
               {
#ifdef REPAG
/* Repaginator Output Driver needs to know if hdr. or ftr. had a pound sign */
               if (MDvars->hf_flag == 1)
                   pps.hdrpndsign = TRUE;
                else
                   pps.ftrpndsign = TRUE;
#endif
               if (!num_sign)
                  {
                  if (Mnum_page(data) == FAILED)      /* process page num
                      return(FAILED);
                  num_sign = 1;
                  }
               else
                  advance = TRUE;
               }
              else
/* the character must be formattable, send the character off to the formatter
               {
               num_sign = 0;
               if (Mformat(character, data.attr, 0) != SUCCESS)
                  return(FAILED);
               }
          } if (advance == TRUE)
         {
         advance = FALSE;
         if ((status = Madvance2()) != SUCCESS)
```

```
                      {
                       if (status == END_OF_CHAIN)
                         {
/* 00v05+ */
/* if the remaining reserved area can not fit on the page, try to back up so  *
/* it will fit or post a reserved area overflow message. */
                          if ((!MDvars->hf_flag) && (!fn_flag))
                            {
                             for (i = 0; i <= MDvars->num_cols; i++)
                               {
                                if (REPvars->prev_line.pos_overflow[i])
                                   ra_flag = TRUE;
                               }
                            }
                          if (ra_flag)
                            {
                             REPvars->REP_brk_page_flag = check_graph_fits();
                             if (!REPvars->REP_brk_page_flag)
                               {
                                if (Mvi_manager() != SUCCESS)
                                   return(FAILED);
                               }
                            }
/* 00v05- */

/* if there are any cascading footnotes, return the error status REP_ENDPAGE *
/* and return failed in order to process them at the end of the document */ if ((!fn_next_page) && (!MDvars->hf_flag) && (!proc_endno
/* new 6/3 */               REPvars->end_doc_flag = TRUE;

/* 00v01+ */
/* This code insures that any footnotes that cascade at the end of the documen
/* will be formatted */
                          if ((fn_next_page) && (!MDvars->hf_flag) && (!proc_endnot
                              && (!fn_flag))
                            {
                             if (Mvi_manager() != SUCCESS)
                                return(FAILED);
                            }
/* 00v01- */
                          if (check_next_line)
                            {
                             REPvars->REP_brk_page_flag = 0;
/*****/                      if (Fbuf_test())
                               {
                                if (Mprint_line() != SUCCESS)
                                   return(FAILED);
                               }
                             else
                               {
                                if (fn_next_page)
                                  {
/* 00v02+ */
                                   pps.pageinfo = SOFTPAGE;

/* 00v03+ */
                                   if (MDvars->error_status = DMsqinit(&REPv
                                     {
                                      if (ERget() == DMEPBINV)
                                         STbcopy(sizeof(LINE_CHECK),
                                                 (TEXT*)&REPvars->prev_line, (TEXT*)
                                     }
/* 00v03- */
                                   for (i = 0; i <= MDvars->num_cols; i++)
                                     {
/* if the columns finished, don't advance the PB .. nasty things happen */
                                      if (REPvars->last_good.column_info[i
                                          DMchadvance(&REPvars->last_good STbcopy(MDvars->dmlpb_size,
                                              (TEXT *)&REPvars->last_good.p
                                              (TEXT *)&pps.endpb[i]);
                                     }
/* 00v02- */
/* 00v06+ */
                                   if (!MDvars->hf_flag)
/* 00v06- */
```

```
                            Mline_end(MDvars->column_in, &REPvars->cur
                            if (Rpage_break() != SUCCESS)
                                return(FAILED);
                        }
                    }
                }
                return(SUCCESS);
            }
            else
                return(FAILED);
        }
    } ifdef REPAG
    if (fn_flag)
    { if (!REPvars->REP_brk_page_flag) /* denotes page broke while proce
            return(FAILED);

if (fn_pass_finished == TRUE)
            return(SUCCESS);
    }
#endif
        MDvars->lastchar = character;        /* save the last character */
    }
return(SUCCESS);
}

****************************************************************************
****************************************************************************

A0000001

FILE A0000001 IN LIBRARY #ASCTEMP ON VOLUME SYSTEM
        10:08:14 AM    DECEMBER 11, 1989         124 LINES        1 COPY
                        BY USER IWS (AT WORKSTATION 100)
                PRINT CLASS R      FORM# 000     PRINTER 14

****************************************************************************
****************************************************************************

/****************************************************************************
*                                                                           *
*    PROCEDURE NAME: Mline_end()            MODULE NAME : Mlinend.c         *
*                                                                           *
*    CREATION DATE : 07/06/87                                               *
*                                                                           *
*       CREATED BY : Susan Chiang                                           *
*                                                                           *
*      DESCRIPTION : Check the last character and attribute on the          *
*                    line and return a LINE_CHECK block with any            *
*                    possible repaginator violation                         *
*                                                                           *
*            INPUTS : none.                                                 *
*                                                                           *
*           OUTPUTS : none.                                                 *
*                                                                           *
*            ERRORS :                                                       *
*                                                                           *
*   GLOBALS AFFECTED : none.                                                *
*                                                                           *
*   Rev #    Date    Revisor         Revision History                       *
*                                                                           *
****************************************************************************/
#include <rinclude.h>
IMPORT   VOID  Flast_char_data();
IMPORT   UTINY Findnt_count();        /* indent count at start of column */
IMPORT   UTINY rep_no_col_text;
EXPORT Mline_end(column,rep_str)
    USHORT         column;
    LINE_CHECK     *rep_str;
{
TEXT   last_char;                     /* last printable char. on the line*/
BOOL   end_cr_flag;                   /* line ended with a CR (T or F)   */
BOOL   keep_flag;                     /* last character keep_to attr.?   */
BOOL   no_brk_flag;                   /* last character no break attr.?  */
BOOL   hyphen_flag;                   /* last character a hyphen?        */
```

```c
     BOOL    ra_flag;                           /* reserved area or graph on line? */
   if (rep_no_col_text)
       {
          STbcopy (MDvars->dmlpb_size, (TEXT*)&MDvars->primary_pb[column],
                 (TEXT*)&rep_str->pb_ptrs[MDvars->column_in]);
          rep_no_col_text = FALSE;
          rep_str->EOP[MDvars->column_in] = TRUE;
       }
   else
     {
       if (MDvars->column[MDvars->column_in] == 0)
           rep_str->EOP[MDvars->column_in] = TRUE;
       else                                      /* 7/1 for ETX problem */
           rep_str->EOP[MDvars->column_in] = FALSE;
/* NOTE: this code below is inefficient  and will be changed to a bitmap */
/* when time permits */
                              /* get last character and attribute */
                              /* Formatter uses columns 1,2,3 instead of 0,1,2 */
/*     Flast_char_data((column + 1),&line_status, &keep_to_chk); */
       Flast_char_data(&end_cr_flag, &last_char, &keep_flag, &no_brk_flag,
                      &ra_flag, &hyphen_flag);
       if (end_cr_flag)              /* line ends with a CR */
              rep_str->EOP[MDvars->column_in] = TRUE;
       if (hyphen_flag)              /* line ends with a hyphen */
           {
             rep_str->pos_hyphen[MDvars->column_in] = TRUE;
             ++rep_str->num_violations[MDvars->column_in];
           }
       if (keep_flag)                /* pos. split of keep to text */
           {
             rep_str->pos_keep_to[MDvars->column_in] = TRUE;
             ++rep_str->num_violations[MDvars->column_in];
           }
       if (no_brk_flag)              /* pos. split of no break text */
           {
             rep_str->pos_no_break[MDvars->column_in] = TRUE;
             ++rep_str->num_violations[MDvars->column_in];
           }
       if (ra_flag)                  /* pos. overflow page for RA ?????? */
           {
             rep_str->pos_overflow[MDvars->column_in] = TRUE;
             ++rep_str->num_violations[MDvars->column_in];
           }
                                      /* possible period violation */
       if ((last_char == '.') && (!MDvars->gps->application.wp.rep_period))
           {
             rep_str->pos_period[MDvars->column_in] = TRUE;
             ++rep_str->num_violations[MDvars->column_in];
           }
switch (MDvars->Fformat_stat) {
       case 3:
              if (MDvars->error_status = DMsqbackup())
                  return(FAILED);
              DMsqgpb(&MDvars->pb_ptr);
              STbcopy (MDvars->dmlpb_size, (TEXT*)&MDvars->pb_ptr,
                       (TEXT*)&rep_str->pb_ptrs[MDvars->column_in]);
              if (MDvars->error_status = DMsqadvance())
                  return(FAILED);
              break;
       case 2:
              if (MDvars->error_status = DMsqstop(&MDvars->pb_ptr))
                  return(FAILED);
              STbcopy (MDvars->dmlpb_size, (TEXT*)&MDvars->mark_pb,
                       (TEXT*)&MDvars->pb_ptr);
              if (MDvars->error_status = DMsqinit(&MDvars->pb_ptr))
                  return(FAILED);
              if (MDvars->error_status = DMsqbackup())
                  return(FAILED);
              DMsqgpb(&MDvars->pb_ptr);
              STbcopy (MDvars->dmlpb_size, (TEXT*)&MDvars->pb_ptr,
                       (TEXT*)&rep_str->pb_ptrs[MDvars->column_in]);
              break;
       case 1:
       default:
              DMsqgpb(&MDvars->pb_ptr);
              STbcopy (MDvars->dmlpb_size, (TEXT*)&MDvars->pb_ptr,
                       (TEXT*)&rep_str->pb_ptrs[MDvars->column_in]);
              break;
       }
     }
                                      /* column completion information */
```

```
/*rep_str->indents[MDvars->column_in] = Findnt[MDvars->column_in]; */
rep_str->indents[MDvars->column_in] = Findnt_count();
rep_str->column_info[MDvars->column_in] = MDvars->column[MDvars->column_in];
rep_str->format_item_num = MDvars->item;   /* format reference number */
rep_str->last_ftnote = fnqcb.nextin;       /* last footnote processed */
rep_str->num_cols = MDvars->num_cols;      /* number of MDvars->column_ins in format */
}

Output Driver Routines
ODBLDPAG  C
ODFNIDRE  C
ODINSFN   C
ODINSCM   C
ODQINIT   C
ODINSSEP  C
ODQPRINT  C
ODSFIDMT  C
ODSFIDFT  C
```

*******************************************************************************
*******************************************************************************

A0000001

FILE A0000001 IN LIBRARY #ASCTEMP ON VOLUME SYSTEM
10:33:42 AM    DECEMBER 11, 1989         558 LINES       1 COPY
       BY USER IWS (AT WORKSTATION 100)
       PRINT CLASS R    FORM# 000    PRINTER 14

*******************************************************************************
*******************************************************************************

/******************************************************************************

Copyright (c) 1987 Wang Laboratories, Inc. All rights reserved

PROJECT: WP Plus Footnote/Repagination Background Utility

COMPONENT: ODbldpage - Output Driver build one page routine

AUTHOR: Dan Michaud

DATE: 12/21/87

---

DESCRIPTION : This procedure is the highest level of the Output Driver. It should be called by the Main Driver each time a page is to be constructed in the output document. It depends upon the information stored in the Generalized Parameter Structure (GPS), Page Parameter Structure (PPS)

and Footnote Queue to construct each page. When constructing pages in the

Output Document, this routine will do the following:

Insert header text, footer text, footnote text, footnote separator, slash fill characters and footnote continuation messages (including page number in place of pound sign).

Remove any references to headers, footers and footnotes found on the page.

Insert page number in place of pound sign found within headers and footers.

Insert footnote IDs in their appropriate place on each page.

When specified to do so, remove any text with deletion attribute or optional text attribute applied.

Removal and insertion of soft page breaks.

Appropriately maintain indent levels when inserting and deleting page breaks.

When the last page has been constructed in the output document, the procedure will:

Close the output document.

Catalogue the document (if specified as output to a new document).

Queue the document to print (if specified as output to printer).

---

C FUNCTION DEFINITION

ERROR ODbldpage()

INPUT fncbptr    pointer to the footnote queue control block

OUTPUT

None

ERRORS

SII errors are returned to the Main Driver

```
*************************************************************/ include <ODINS.H>

IMPORT    PPS         pps;

EXPORT ERROR  ODbldpage()
```

```
IMPORT    ERROR    ODbldhdr();

IMPORT    ERROR    ODinspage();

IMPORT    ERROR    ODinshdr();

IMPORT    ERROR    ODclnpage();

IMPORT    ERROR    ODinsslash();

IMPORT    ERROR    ODinssep();

IMPORT    ERROR    ODinsfn();

IMPORT    ERROR    ODinsftr();

IMPORT    ERROR    ODclnqueue();

/* IMPORT    ERROR    ODdelhfref();    gms - 7/13/89 */

IMPORT    ERROR    ODfinish();

IMPORT    ERROR    ODinit();

IMPORT    ERROR    ODdelpage();

IMPORT    ERROR    FNqread();

IMPORT    ERROR    DMitgoto();
IMPORT    ERROR    DMpglast();        /* gms - 5/24/89 */
IMPORT    ERROR    DMrefginfo();
IMPORT    ERROR    ODhfskip();        /* gms - 7/10/89 */
IMPORT    ERROR    DMfmget();
#ifdef PC                             /* gms - 3/7/89 */
IMPORT    BOOL     MenuUpdate();      /* MenuPack screen update for PC only */
endif /* Declarations */

FNQELEM    fnelem;                /* gms - buffer for footnote queue element */

USHORT     temppage;              /* temporary page holder */

DMLPB      pgpb;

/* If the CURRENT PAGE being built by the Output Driver is = 0, then */

/* set it equal to the 'From Page' value.                             */ if (curpage == 0)

$ curpage = (USHORT)MDvars->gps->application.wp.startpg;

lastitem = 0xffff;

& else

++curpage;   /* else, bump current page number */ ifdef PC      /* gms - 3/7/89 */

/* Progress screen for PC Repaginator */
if (MenuUpdate((INT)curpage))
   return(lasthard = 4);    /* User pressed CANCEL, get out */
                            /* Use "lasthard" global for scratch pad */
#endif
/* gms 7/10/89.  Skip processing headers/footers on "curpage" */
if (ODhfskip() != ERSUCCESS)
   return(ERget());
```

```
/* This global must be set FALSE for each page since   */
/* the first occurrence of 'slash fill' or 'footnotes' */
/* must be preceded with a single column format.       */
/* Setting 'newfmt' TRUE will cause 'ODinsfmt' to be   */
/* called.                                             */
   newfmt = FALSE;

/* if the last page processed, ended with a hard page break, then this page */
/* is a 'End of Document' footnotes page */
   if (lasthard == TRUE)
      $
         lasthard = FALSE;
         enddoc = TRUE;

/********************** dgm 1/24/89 ******************************/
         /* Fix the following bugs: QA0024, QA0038, QA0048.              */
         /* Set the current page equal to the last page in the document. */
         if (DMpglast(&curpage) != ERSUCCESS)
            return(ERget());
         /****************************************************************/

é

/* see if footnotes exist on the footnote queue and appropriately set up */
/* the 'footnotes' variable          dgm 9-12-88                         */
   footnotes = FALSE;         /* default to no footnotes */
   /* If processing 'End of Page' and footnotes on the queue */
   if (MDvars->gps->application.wp.fnote_loc == WP_FN_END_PG)
      $
      if (fnqcb.nextin != 0)    /* if footnotes exist on the queue */
         footnotes = TRUE;  /* tell Output Driver there are footnotes */
      é
   else
   /* If processing "End of Doc." and footnotes exist for this page */
      $
      if (fnqcb.fns_on_page != 0) /* if footnotes exist on the queue */
         footnotes = TRUE;  /* tell Output Driver there are footnotes */
      é
```

```
/* Insert a page break at the location specified in the Page Parameter */
/* Structure (PPS) as the end of the current page being built in the  */
/* output document */ if (ODinspage() != ERSUCCESS)

return (ERget());

/* Now delete any page breaks between the top of the current page (curpage */
/* and the page break just inserted.                                       */ if (pps.delpages == TRUE)    /* if there are pages to delete */

{ temppage = curpage + 1;  /* start with page 1 after curpage */ while (delcount > 0)

{ if (DMitgoto(DMLTYPAGE, temppage, &pgpb) != ERSUCCESS)

return (ERget());   /* point to the page break */ if (ODdelpage(&pgpb) != ERSUCCESS)

return (ERget());   /* delete it */

--delcount;            /* decrement the count */

}

}

/* NOTE - the Page Parameter Structure (PPS) indicates if 'ODinspage inserted */
/*        a hard or soft page break or no page break */
/*        nopage - no page break was inserted */
/*        softpage - soft page break inserted */
/*        hardpage - hard page break inserted */ lastpag = FALSE;    /* default to not the last page being processed */ if (pps.pageinfo == NOPAGE)

lastpag = TRUE;           /* this is last page being built */ if (pps.pageinfo == HARDPAGE)

lasthard = TRUE;          /* if just inserted hard page break */

/* insert the header text at the top of the current page being built */ if (ODinshdr() != ERSUCCESS)

return (ERget());

/* If this is not an 'End of Document' footnotes page being built */
```

```
/* the slashfill characters must be inserted.                          */ if (enddoc != TRUE)

$ if (ODinsslash() != ERSUCCESS)

return (ERget());

é

/* if processing footnotes for end of pages and footnotes exist on the */
/* footnote queue, call 'ODinssep' to insert the footnote separator    */ if (MDvars->gps->application.wp.fnote_loc == WP_FN_END_PG)

$ if (footnotes == TRUE)

$ if (ODinssep() != ERSUCCESS)

return (ERget());

é

é

/* if footnotes exist on the footnote queue, call 'ODinsfn' to         */
/* process footnotes.                                                  */ if (footnotes == TRUE)

$ if (ODinsfn() != ERSUCCESS)

return (ERget());

é

/* if page being built is an end of document footnote page, call 'ODinsslash */
/* to append slashfill characters at the of the footnote page */ if (enddoc == TRUE)

$ if (ODinsslash() != ERSUCCESS)

return (ERget());

é

/* call 'ODinsftr' to insert footer text */ if (ODinsftr() != ERSUCCESS)

return (ERget());

/* Now remove unwanted optional text and deleted text from the page just */
```

```
/* built. This includes headers, main body of text, footnotes and footers */ if (ODclnpage() != ERSUCCESS)

return (ERget());

/* if footnotes exist on the queue, call ODclnqueue */

/* to delete footnote references from the document and remove footnote */

/* elements from the queue.                                           */ if (footnotes == TRUE)         /* if footnotes on the queue */

$ if (ODclnqueue() != ERSUCCESS)   /* clean the queue */ return (ERget());

é

/* remove the header and footer references, if necessary. */
/* gms - 7/13/89.  Don't delete header/footer references at all.  Instead, */
/* leave them in the output document for the range of pages not processed */
/* by repagination. On the processed pages, the "skip" flag is set on the */
/* previous page break to suppress printing double headers/footers */
/* if (ODdelhfref() != ERSUCCESS) */
/*    return (ERget());           */

/* dgm 10-12-88     NOTE - Main Driver now calls ODfinish              */

/* if the page just built is the last page in the document, call 'ODfinish' */

/* to compact the document, close the document, catalogue it or queue it */

/* to print */

/* if (lastpag == TRUE)         */

/*    $                          */

/*       if (ODfinish() != ERSUCCESS)  */

/*          return (ERget());    */

/*    é                          */

/* gms 7/10/89. Skip processing headers/footers on "curpage" */
if (ODhfskip() != ERSUCCESS)
   return(ERget());

/* exit */ return ERSUCCESS;

é /* end EXPORT ODbldpage() */
/* gms 7/10/89. */
/* Use this routine to set page options to "skip header/footer this page." */
/* After the page insertion, or at a page break, change the page options  */
/* to "skip header/footer this page." This is for repaginating range of   */
/* pages where a header/footer reference may appear before the range.     */
/* For example: 10 page doc, repaginate pp. 2-5, hdr/ftr on p. 1 only.    */
/* At print time, p. 1 prints with hdr/ftr, pp. 2-5 print with hdr/ftr    */
/* skipped (because they're in the text now). Hdr/ftr resumes on          */
/* pp. 6-10. */
PRIVATE ERROR ODhfskip()
$
/* external functions */
IMPORT ERROR   DMhfsflags();
if (curpage)
   $
   /* Set the header flag to "skip" */
```

```
   if (DMhfsflags(curpage, DMLTYHEADER, DMLHFSKIP) != ERSUCCESS)
      return (ERget());
   /* Set the footer flag to "skip" */
   if (DMhfsflags(curpage, DMLTYFOOTER, DMLHFSKIP) != ERSUCCESS)
      return (ERget());
   é
é /* End PRIVATE ODhfskip() */
```

*********************************************************************
*********************************************************************

A0000001

FILE A0000001 IN LIBRARY #ASCTEMP ON VOLUME SYSTEM
10:36:58 AM    DECEMBER 11, 1989           166 LINES       1 COPY
               BY USER IWS (AT WORKSTATION 100)
         PRINT CLASS R    FORM# 000    PRINTER 14

*********************************************************************
*********************************************************************

/********************************************************************
Copyright (c) 1987 Wang Laboratories, Inc. All rights reserved PROJECT: WP Plus Footnote/Repagination Background Utility COMPONENT: ODfnidref - Output Driver footnote reference procedure AUTHOR: Dan Michaud

DATE: 01/11/88

---

DESCRIPTION : This procedure is called by procedure 'ODclnpage' when the
   character being processed is a footnote reference. The procedure will
   get the footnote queue identifier from the footnote reference data block.
   The queue identifier is then used to locate the correct element from the
   footnote queue. When the correct footnote element is located, the footnote
   reference is stored in the element (at 'fnrefpb', and the footnote ID
   'fnid' is copied from the element, and inserted in front of the character
   which follows the footnote reference. The procedure returns with the PB
   pointing to the character which immediately follows the last character in
   the footnote ID.

---

C FUNCTION DEFINITION

ERROR ODfnidre (fncbptr, refptr)
      FNCB *fncbptr
      DMLPB *refptr

INPUT
   fncbptr   pointer to the footnote queue control block

INPUT/OUTPUT
   refptr    on input, PB points to footnote reference character.
             on output, PB points to character which immediately follows the
             last character of the footnote ID.

OUTPUT
   None

ERRORS
   SII errors are returned to the Main Driver

*********************************************************************/ include <ODINS.H>

EXPORT ERROR  ODfnidref(fncbptr, refptr)
   FNCB   *fncbptr;
   DMLPB  *refptr;

5

```
IMPORT    ERROR    DMrefginfo();
IMPORT    ERROR    DMchstrins();
IMPORT    ERROR    DMchadvance();
IMPORT    ERROR    FNqread();
IMPORT    ERROR    FNqrewrite();

IMPORT    TEXT     *STbcopy();
IMPORT    ERROR    ODsfidmt();
IMPORT    ERROR    DMchbackup();
IMPORT    ERROR    DMtxdelete();

IMPORT    ERROR    DMchins();          /* dgm 2-22-89 */

/* Declarations */
FNQELEM   fnelem;                      /* gms - buffer for footnote queue element */
DMLTYPE   type;
DMLTYPE   fmtype;
DMLITEM   item;
/* DMLFNATTR data;                     /* dgm - 10/20/88 */
DMLREFATTR data;                       /* dgm - 10/20/88 */
USHORT    fnnum;
USHORT    offset;
USHORT    itnum;
BOOL      done;
DMLPB     beginpb;

USHORT    ident;                       /* dgm - 2-22-89 */
UTINY     j;                           /* dgm - 2-22-89 */

/* First call 'DMrefginfo' to get the reference data block info.       */
if (DMrefginfo(refptr, &type, &fmtype, &item, &data) != ERSUCCESS)
    return (ERget());

/* dgm ---- 10/20/88 */
/* fnnum = data.number;   */
fnnum = data.footnote.number;

/* Now read each element on the footnote queue until there is a match    */
/* between 'fnnum' and the 'fnqid' portion of the footnote element.      */
/* When a match is made, we have found the correct element on the queue. */
done = FALSE;         /* this will get us into loop */
itnum = 0;            /* start at top of queue */ while (done != TRUE)  /* while were not done searching the queue */
   $
   if (FNqread(fncbptr, itnum, &fnelem) != ERSUCCESS)  /* read 1 element */
       return (ERget());                               /* gms - &fnelem */

/* if element read in successfully */
   if (fnnum == fnelem.fnqid)      /* if we found the correct element */
                                   /* gms - fnelem.fnqid */
       done = TRUE;                /* get out of the loop */
   else                            /* if not done yet */
       ++itnum;                    /* look at next element on queue */
   é

/* Delete the footnote reference */
if (DMtxdelete(refptr, refptr) != ERSUCCESS)
    return (ERget());

/* copy 'refptr' to 'beginpb' */
STbcopy((USHORT)sizeof(DMLPB), (TEXT *)refptr, (TEXT *)&beginpb);

/* backup 'beginpb' to character preceding the footnote reference */
if (DMchbackup(&beginpb) != ERSUCCESS)
    return (ERget());

/********************* dgm 2-22-89  Fix bug QA0102 ********************/
/* Replace DMchstrins with DMchins so that DELETION will be preserved on */
/* footnote ID.                                                          */

/* Now insert the footnote ID in the page text chain at 'refptr'         */
/*if (DMchstrins(refptr, &fnelem.fnid[0], (UINT)STclength(fnelem.fnid)) != ERSUCCESS
    return (ERget());                                                    */ j = 0;                              /* index to first char of footnote ID */
ident = STclength(fnelem.fnid);     /* get count of chars in footnote ID */
while (ident != 0)                  /* while there are chars in the ID */
   $
```

```
    if (DMchins(refptr, fnelem.fnid[j]) != ERSUCCESS)   /* insert one of them */
        return (ERget());
    j++;                                /* get next char of the ID.         */
    idcnt--;                            /* decrement character count.       */
    é

/*********************************************************************/

/* Now backup 'refptr' to end of footnote ID */
if (DMchbackup(refptr) != ERSUCCESS)
    return (ERget());

/* Now advance 'beginpb' to 1st character of footnote ID */
if (DMchadvance(&beginpb) != ERSUCCESS)
    return (ERget());

/* apply the style over the range of the footnote ID in the 'Main Text' */
if (ODsfidmt(&beginpb, refptr) != ERSUCCESS)
    return (ERget());

/* Rewrite the queue element */
if (FNqrewrite(fncbptr, itnum, &fnelem) != ERSUCCESS)   /* rewrite the element */
    return (ERget());             /* gms - &fnelem */ return (ERSUCCESS);

é
```

```
********************************************************************
********************************************************************

A0000001

FILE A0000001 IN LIBRARY #ASCTEMP ON VOLUME SYSTEM
    10:37:40 AM    DECEMBER 11, 1989           185 LINES     1 COPY
                   BY USER IWS (AT WORKSTATION 100)
               PRINT CLASS R    FORM# 000    PRINTER 14

********************************************************************
********************************************************************

/*
       Copyright (c) 1988 Wang Laboratories, Inc. All rights reserved

Project:    WP Plus Background Footnote/Repagination Utility

Function:   ODinscm

Author:     Mike Soper

Date:       January 11, 1988

Maintenance Log

Name            Date            Description of Change

Mike Soper      3/15/88         Check pps page number for zero before
                                    using it. Null terminate DMLCHRETURNs.
    Mike Soper      4/22/88         Only apply font to continuation message
                                    if gps flag is set to indicate that a
                                    font is present.
    Dan Michaud     8/3/88          Type cast continuation message font to
                                    a USHORT.

Global Data

Name            Type            Description

-------------------------------------------------------------------

Description:
    This procedure inserts a footnote continuation message before or after
    a footnote. The message is always copied to the end of the page being
    built by the output driver. Any pound sign characters are replaced
    with page numbers. Call this routine only when continuation messages
    exist.

-------------------------------------------------------------------
```

Inputs

| | Name | Type | Description |
|---|---|---|---|
| Name Params. | | | |
| | msgtype | UTINY | Message type "continued from" or "continued to" |
| Globals | | | |

---

Outputs

| | Name | Type | Description |
|---|---|---|---|
| Params. | | | |
| Globals | | | |
| Return | | | |
| | status | ERCODE | return error status |

---

```
*/

/* include all header files, external data */
#include <ODINS.H>

EXPORT ERROR CDinscm(msgtype)
    UTINY    msgtype;              /* message type "cont. from or "cont. to" */

{

/* external functions */
IMPORT  ERROR    DMpgend();
IMPORT  DMLITEM  DMpbitem();
IMPORT  ERROR    DMchstrins();
IMPORT  ERROR    DMchbackup();
IMPORT  ERROR    DMvisset();
IMPORT  TEXT     *STccopy();
IMPORT  TEXT     *STbcopy();
IMPORT  USHORT   STcfind();
IMPORT  USHORT   STcdelete();
IMPORT  USHORT   STcinsert();
IMPORT  USHORT   STclength();
IMPORT  PPS      pps;

/* For continuation messages, allocate a buffer big enough in case */
        /* the fool wants long roman numeral page numbers every other */
        /* character.  Computed as [cntmsglen+(romanlen*halfcntmsglen)]. */

TEXT         fnmsgbuf[72+(8*36)];  /* work buffer for continuation message */
TEXT         pgnumbuf[16];         /* work buffer for page number string */
BOOL         pgnumset;             /* nonzero if pps has a page number */
TEXT         returnchar[2];        /* return graphic string for blank line */
FAST USHORT  offset = 0;           /* offset into string during search */
FAST USHORT  startoff;             /* offset to begin deleting number sign */
FAST USHORT  endoff;               /* offset to end deleting number sign */
DMLPB        pgendpb;              /* variable to receive PB at end of page */
DMLPB        contbegpb;            /* continuation message beginning PB */
DMLITEM      itemnum;              /* item number of the page end PB */

/* Initialize the return character string */
returnchar[0] = DMLCHRETURN;
returnchar[1] = (TEXT)NULL;

/* Make a copy of the continuation message to parse for page numbers */
if (msgtype == FROM_MSG)
    {
    STccopy(MDvars->gps->application.wp.fn_from_msg, fnmsgbuf);
    STcappend(returnchar, fnmsgbuf);   /* terminate with <CR> */ pgnumset = pps.cfpndsign;          /* page # indicator from pps */
    if (pgnumset)                      /* assume character if not zero */
        STccopy(pps.cfpgnum, pgnumbuf); /* buffer page string */ if (MDvars->gps->application.wp.fn_from_blnk_b4)
        STcinsert(returnchar, offset, fnmsgbuf);   /* prepend blank line */ if (MDvars->gps->application.wp.fn_from_blnk_after)
        STcappend(returnchar, fnmsgbuf);           /* append blank line */
    }
```

```
else   /* it is a TO_MSG */
    $
    STccopy(MDvars->gps->application.wp.fn_to_msg, fnmsgbuf);
    STcappend(returnchar, fnmsgbuf);    /* terminate with <CR> */ pgnumset = pps.ctpndsign;           /* page # indicator from pps */
    if (pgnumset)                       /* assume character if not zero */
       STccopy(pps.ctpgnum, pgnumbuf);  /* buffer page string */ if (MDvars->gps->application.wp.fn_to_blnk_b4)
        STcinsert(returnchar, offset, fnmsgbuf);      /* prepend blank line */ if (MDvars->gps->application.wp.fn_to_blnk_after)
        STcappend(returnchar, fnmsgbuf);              /* append blank line */
    é

/* Search for "#" characters for page number string replacement */
/* and replace all single or multiple occurences with the string */ if (pgnumset)    /* Do this only if there is a page number string */
    $
    while ((startoff = STcfind(NUMSIGN, offset, fnmsgbuf)) != STNOTFOUND)
        $                              /* startoff sets offset to begin delete */
        endoff = startoff + 1;         /* initialize endoff to end delete */
        while (fnmsgbuf[endoff] == NUMSIGN)
            endoff++;

/* Delete the "#" characters found */
        STcdelete((endoff-startoff), startoff, fnmsgbuf);

/* Insert the page number string where the "#" was */
        STcinsert(pgnumbuf, startoff, fnmsgbuf);

offset = endoff;               /* look for more where we left off */
        é
    é

/* Get the PB at the end of the page */
if (DMpgend(curpage, &pgendpb) != ERSUCCESS)
    return(ERget());

/* Get the item number of this PB */
itemnum = DMpbitem(&pgendpb);

/* Save the returned PB because it points to the start of the message */
STbcopy((USHORT)sizeof(DMLPB), (TEXT *)&pgendpb, (TEXT *)&contbegpb);

/* Insert the message in the document */
if (DMchstrins(&pgendpb, fnmsgbuf, (UINT)STclength(fnmsgbuf))
    != ERSUCCESS)
    return(ERget());

/* Make PB point to last character of continuation message */
if (DMchbackup(&pgendpb) != ERSUCCESS)
    return(ERget());

/* If gps indicates a font, apply the selected font to the text */
if (MDvars->gps->application.wp.fn_cm_font_flag)
    if (DMvisset(&contbegpb, &pgendpb, DMLTVFONT,
                (DMLVISDATA *)&MDvars->gps->application.wp.fn_cont_font)
        != ERSUCCESS)
        return(ERget());

return(ERputok());
é

********************************************************************************
********************************************************************************

A0000001

FILE A0000001 IN LIBRARY #ASCTEMP ON VOLUME SYSTEM
     10:38:37 AM    DECEMBER 11, 1989           785 LINES       1 COPY
                    BY USER IWS (AT WORKSTATION 100)
            PRINT CLASS R    FORM# 000    PRINTER 14

********************************************************************************
********************************************************************************
```

```
/***********************************************************************
Copyright (c) 1987 Wang Laboratories, Inc.  All rights reserved PROJECT: WP Plus Footnote/Repagination Background Utility COMPONENT: ODinsfn - Output Driver insert footnote text procedure AUTHOR: Dan Michaud

DATE: 01/13/88

Maintenance Log
```

| Name | Date | Description of Change |
|---|---|---|
| Dan Michaud | 5/25/88 | Set fnelem.cfflag to TRUE when ctflag shows cascading footnote. |
| Dan Michaud | 9/12/88 | Support for End of Doc. footnotes. |
| Dan Michaud | 2-14-89 | Fix bug QA0079, preserve indent level on cascading footnotes. |
| Dan Michaud | 2-27-89 | Fix bug QA0107, footnote with no text causes DMPACK error. |
| Mary Permatteo | 4-21-89 | Fix bug QA0160, preserve indent level on cascading footnotes. |

DESCRIPTION : This procedure is called by procedure 'ODbldpage'. It will
read elements from the footnote queue and copy the footnote text to the
end of the document. It will read the elements from the beginning of the
_____ ___ ____ _____ ___ ___ __ ___ _____. _____ ____ __ _____ __
the end of the page in the range specified by the PBs stored in each footnote
element. Footnote text is preceded by the footnote ID which is also stored
on the footnote queue. If the footnote queue element specifies that a footnote
continuation message is to be inserted before or after the footnote text,
'ODinscm' is called to copy the continuation message. This procedure will insert
the footnote format before inserting the footnote text if the format for the
footnote text is different from the text preceding it. Appropriate line
spacing between footnotes is also maintained by this procedure.

C FUNCTION DEFINITION

ERROR ODinsfn (fncbptr)

FNCB *fncbptr

INPUT fncbptr    pointer to the footnote queue control block

OUTPUT

None

ERRORS

SII errors are returned to the Main Driver

***********************************************************************/ include <ODINS.H>

EXPORT ERROR  ODinsfn()

$

```
IMPORT    ERROR    ODinscm();
IMPORT    ERROR    ODinsfmt();
IMPORT    ERROR    DMpgend();
IMPORT    ERROR    DMtxcopy();
IMPORT    ERROR    DMchstrins();
IMPORT    ERROR    DMchadvance();
IMPORT    ERROR    FNqread();
IMPORT    ERROR    FNqrewrite();
IMPORT    TEXT     *STbcopy();
IMPORT    ERROR    DMrefginfo();
IMPORT    ERROR    DMchbackup();
IMPORT    ERROR    ODsfidft();
IMPORT    ERROR    DMitgoto();
IMPORT    ERROR    DMchget();
IMPORT    ERROR    DMchins();
IMPORT    DMLITEM  DMpbitem();
IMPORT    ERROR    DMchgsmall();    /* dgm 4-17-89 */
```

```
IMPORT    BOOL     DMpbcompare();      /* dgm 2-27-89 */

IMPORT    ERROR    DMfmref();          /* dgm 5/11/89 */

/* Declarations */

FNQELEM    fnelem;      /* gms - buffer for footnote queue element */

DMLPB      pgpb;        /* pointer to PB at end of page */

USHORT     offset;

USHORT     itnum;

DMLTYPE    type;

DMLTYPE    fmtype;

DMLITEM    item;

DMLITEM    fnitem;

DMLREFATTR datta;

BOOL       firstread;

DMLPB      savepb;

TEXT       chr;

ERROR      retcode;

UINT       fncnt;       /* 9-12-88 dgm */

UTINY      icnt;        /* dgm 2-14-89 */

BOOL       pbssame;     /* dgm 2-27-89 */

DMLVSMALL  dadda;       /* dgm 4-17-89 */

BOOL       insfmt;      /* dgm 5-11-89 */
BOOL       retdone;     /* dgm 5/12/89 */

DMLITEM    tempitem;    /* dgm  ---   added temporarily for debug purposes*/

/*****************NOTE NOTE NOTE NOTE NOTE NOTE NOTE ******************/
/* Currently this procedure does not support the following:         */
/*                  CONTINUOUS LINE SPACING                         */
/*******************************************************************/

/* We must not process the footnotes that currently exist on the queue */
/* if: footnotes are being processed for 'End of Doc.' and this is not */
/* an end of document footnotes page.                                  */
if (MDvars->gps->application.wp.fnote_loc == WP_ENDNOTES)

S if (enddoc != TRUE)

return ERSUCCESS;
```

```
/* initialize a PB to the enter-text position of the current page */ if (DMpgend(curpage, &pgpb) != ERSUCCESS)

return (ERget());

/* Now start at the beginning of the queue, and work toward the end of the */
/* queue processing footnotes.                                             */ firstread = TRUE;          /* indicate this is 1st footnote to appear on page */
itnum = 0;                 /* start at beginning of queue */

/************************* dgm 9-12-88 *************************/ fncnt = fnqcb.nextin;   /* use this queue count for 'End of Pages' */

/* However, if doing 'End of Document' footnotes */ if (MDvars->gps->application.wp.fnote_loc == WP_ENDNOTES)

$ fncnt = fnqcb.fns_on_page;  /* use this queue count */

é

/************************* dgm 9-12-88 *************************/ while (itnum < fncnt)   /* while there are elements to read */

$ insfmt = FALSE;
    retdone = FALSE;

/* Read an element off the queue */ if (FNqread(&fnqcb, itnum, &fnelem) != ERSUCCESS)

return (ERget());

/* See if there is a footnote continuation message before the footnote.*/ if (fnelem.cfflag == TRUE) /* if we have a 'continued from' message */

$

/* and user said 'Yes' for footnote con't messages */ if (MDvars->gps->application.wp.fn_cont_message == 1)

$

/* if user chose double spacing between footnotes */
        if (MDvars->gps->application.wp.fn_line_spacing == WP_DBLLS_FN)

$
            /* and this is not the first footnote on the page */
            if (firstread == FALSE)

$
                tempitem = fnelem.cascadeitem; /* dgm added for debug */
```

```
            /* insert the footnote format of the cascading footnote */
            if (DMfmref(&pgpb, fnelem.cascadeitem, DMLFMNORM) != ERSUCCESS)
                return (ERget());

/* get to bottom of page */
            if (DMpgend(curpage, &pgpb) != ERSUCCESS)
                return (ERget());

/* insert the return */
            if (DMchins(&pgpb, DMLCHRETURN) != ERSUCCESS)
                return (ERget());

/* indicate we have already inserted double spacing */
            retdone = TRUE;

/* get to bottom of page */
            if (DMpgend(curpage, &pgpb) != ERSUCCESS)
                return (ERget());

}

}

/* copy the default format of the footnote before the con't msg */
        if (DMfmref(&pgpb, fnelem.fnfmtitem, DMLFMNORM) != ERSUCCESS)
            return (ERget());

if (DMpgend(curpage, &pgpb) != ERSUCCESS)
            return (ERget());

/* copy the 'continued from' message and blank lines before or after it */ if (ODinscm(CONTFROM) != ERSUCCESS)

return (ERget());

if (DMpgend(curpage, &pgpb) != ERSUCCESS)  /* get PB of page end */ return (ERget());

}

}

/* INSERT THE CORRECT FORMAT BEFORE THE FOOTNOTE. */ if (fnelem.cfflag == FALSE)   /* if not cascading from prev. page */
                              /* use default format of current footnote */
    { if (DMrefginfo(&fnelem.fnbegpb, &type, &fmtype, &item, &datta) != ERSUCCESS)

return (ERget());   /* get format ref. item number */

STbcopy((USHORT)sizeof(DMLPB), (TEXT *)&fnelem.fnbegpb, (TEXT *)&savepb);

if (DMtxcopy(&savepb, &savepb, &pgpb) != ERSUCCESS) /* copy format ref */ return (ERget());

} else

/* if this footnote is cascading from the previous page, */

/* use the format of the cascading footnote.            */

{ tempitem = fnelem.cascadeitem;

if (DMfmref(&pgpb, fnelem.cascadeitem, DMLFMNORM) != ERSUCCESS)
        return (ERget());

}
```

```
/* initialize 'pgpb' to the enter-text position of the current page */ if (DMpgend(curpage, &pgpb) != ERSUCCESS)

return (ERget());

/* If this is not a cascading footnote, advance past format reference */ if (fnelem.cfflag == FALSE)   /* if not cascading from prev. page */

$

/********* dgm 2-27-89    Fix bug QA0107  ********************

/* When no footnote text, endpb must also be advanced pbssame = DMpbcompare(&fnelem.fnbegpb, &fnelem.fnendpb);

if (pbssame == TRUE) /* if begin and end PBs pointing to form. ref. */

$ if (DMchadvance(&fnelem.fnendpb) != ERSUCCESS)

return (ERget());  /* advance end footnote PB */

é

/***********************************************************/ if (DMchadvance(&fnelem.fnbegpb) != ERSUCCESS)

return (ERget());  /* advance beginning footnote PB */

é

/*********** dgm 4/27/89   Move this up from below  *************/

/* If line spacing between footnotes is double line spacing, and */

/* this is not the first footnote on the page, precede the footnote */

/* with a return.                                                 */ if (MDvars->gps->application.wp.fn_line_spacing == WP_DBLLS_FN)

$ if (firstread == FALSE)     /* if this is not the first ftnote on page */

$
       if (retdone == FALSE)  /* if we have not already done double space */
          $
          if (DMchins(&pgpb, DMLCHRETURN) != ERSUCCESS)

return (ERget());   /* insert a return */ retdone = TRUE; /* indicate it is inserted */
          é

é

é firstread = FALSE;  /* dgm 4/27/89 */ if (DMpgend(curpage, &pgpb) != ERSUCCESS)

return (ERget());
```

```c
/* Now backup to last character on page */ if (DMchbackup(&pgpb) != ERSUCCESS)

return (ERget());

/* now save the pb of the beginning of the footnote ID */

STbcopy((USHORT)sizeof(DMLPB), (TEXT *)&pgpb, (TEXT *)&savepb);

/* go to page end */ if (DMpgend(curpage, &pgpb) != ERSUCCESS)

return (ERget());

/* Now insert the footnote ID before adding the footnote text */ if (DMchstrins(&pgpb, &fnelem.fnid[0], (UINT)STclength(fnelem.fnid)) != ERSUCCESS)

return (ERget());

/* Get to end of page before backing up */ if (DMpgend(curpage, &pgpb) != ERSUCCESS)

return (ERget());

/* Now backup to end of footnote ID */ if (DMchbackup(&pgpb) != ERSUCCESS)

return (ERget());

/* advance savepb to beginning of footnote ID */ if (DMchadvance(&savepb) != ERSUCCESS)

return (ERget()); /* advance beginning footnote PB */

/* Apply the style over the range of the footnote ID in the Footnote text */ if (ODsfidft(&savepb, &pgpb) != ERSUCCESS)

return (ERget());

/* Get to end of page before copying the footnote text */ if (DMpgend(curpage, &pgpb) != ERSUCCESS)

return (ERget());

/******************** dgm 2-14-89  Fix bug QA0079 ********************/

/* Preserve indent level on cascading footnotes.                     */
```

```
if (fnelem.cfflag == TRUE)    /* if we are cascading a footnote  */

$
    /******************* mtp 4-21-89 Fix bug QA0160 **************/
    if (fnelem.firstlnind > 0)   /* and there are indents to insert */
        $
        icnt = fnelem.firstlnind;    /* get the indent count */
    /******************* mtp 4-21-89 Fix bug Qa0160 **************/
        while (icnt != 0)       /* while there is indents */
            $
            if (DMchins(&pgpb, DMLCHINDENT) != ERSUCCESS) /* insert 1 indent*/ return (ERget());

--icnt;                      /* decrement the count */
            é
        if (DMpgend(curpage, &pgpb) != ERSUCCESS)
            return (ERget());

é

é

/************************************************************************/

/* Copy the footnote text. */ if (DMtxcopy(&fnelem.fnbegpb, &fnelem.fnendpb, &pgpb) != ERSUCCESS)

return (ERget());

/* Get to end of page before copying the footnote continuation message */ if (DMpgend(curpage, &pgpb) != ERSUCCESS)

return (ERget());

/* If the footnote does not end in a return, insert a format so the next */

/* footnote will not append to this one */ if (DMchbackup(&pgpb) != ERSUCCESS)

return (ERget());  /* backup to char. before enter-text char */

'* if (DMchget(&pgpb, &chr) != ERSUCCESS)

return (ERget());   */            /* dgm 4-17-89 */ if (DMchgsmall(&pgpb, &chr, &dadda) != ERSUCCESS)   /* dgm 4-17-89 */ return (ERget());

if (DMchadvance(&pgpb) != ERSUCCESS)

return (ERget());   /* advance to enter-text char */

/* dgm 4-17-89 */

/* Now insert a format (ETX) if the char is not a return .or. if the */

/* char is a return .and. has the deletion attr. applied to it */

/* NOTE - always use the default format of the footnote */ if ((chr != DMLCHRETURN) &&
```

```
        ((chr == DMLCHRETURN) && ((dadda.attr & (DMLVBDEL)) == DMLVBDEL)))

$ fnitem = DMpbitem(&fnelem.fnendpb);

if (DMitgoto(DMLTYFTNOTE, fnitem, &savepb) != ERSUCCESS)

return (ERget());

if (DMtxcopy(&savepb, &savepb, &pgpb) != ERSUCCESS)

return (ERget());

insfmt = TRUE;  /* indicate format has been inserted */ if (DMpgend(curpage, &pgpb) != ERSUCCESS)

return (ERget());

é

/* If there is a footnote continuation message after the footnote, */
/* then the footnote is still cascading. Update and rewrite the    */
/* footnote queue element.                                         */ if (fnelem.ctflag == TRUE) /* if still cascading */

$

/* copy the 'continued to' message, and blank lines before or after it */
    /* NOTE - only do this if user said 'Yes' for con't messages  */ if (MDvars->gps->application.wp.fn_cont_message == 1)

$
        if (insfmt == FALSE) /* if format has not been inserted */
            $
            if (DMfmref(&pgpb, fnelem.fnfmtitem, DMLFMNORM) != ERSUCCESS)
                return(ERget());
            é if (ODinscm(CONTTO) != ERSUCCESS)

return (ERget());

é

/* Copy fnendpb to fnbegpb for the Main Driver. */ retcode = DMchadvance(&fnelem.fnendpb); /* adv. 1 past the end */ if (retcode != ERSUCCESS)

$ if (retcode != DMEENDCHAIN)

return (ERget());

é

STbcopy((USHORT)sizeof(DMLPB), (TEXT *)&fnelem.fnendpb, (TEXT *)&fnelem.fnbegpb);

/* Since we are still cascading, update 'cfflag' for next pass */ fnelem.cfflag = TRUE;    /* need a cont. from message on next page */

/* save the format ref. item # for processing the next page */ fnitem = DMpbitem(&fnelem.fnendpb); /* get item number of footnote */
```

```
    if (DMitgoto(DMLTYFTNOTE, fnitem, &savepb) != ERSUCCESS)

return (ERget());

if (DMrefginfo(&savepb, &type, &fmtype, &item, &datta) != ERSUCCESS)

return (ERget());    /* get format ref. item number */

STbcopy((USHORT)sizeof(DMLITEM), (TEXT *)&item, (TEXT *)&fnelem.fnfmtitem);

/* Re-write the footnote element */ if (FNqrewrite(&fnqcb, itnum, &fnelem) != ERSUCCESS)

return (ERget());

è

/* add 1 to the offset so we can get the next elem. off queue */

++itnum;

/* go to end of page */ if (DMpgend(curpage, &pgpb) != ERSUCCESS)

return (ERget());

è return ERSUCCESS;

è

********************************************************************************
********************************************************************************
                              A0000002

FILE A0000002 IN LIBRARY #ASCTEMP ON VOLUME SYSTEM
    10:39:38 AM    DECEMBER 11, 1989            121 LINES        1 COPY
                   BY USER IWS (AT WORKSTATION 100)
              PRINT CLASS R     FORM# 000    PRINTER 14

********************************************************************************
********************************************************************************

/*******************************************************************************
Copyright (c) 1987 Wang Laboratories, Inc.  All rights reserved PROJECT: WP Plus Footnote/Repagination Background Utility COMPONENT: ODinssep - Output Driver insert footnote separator procedure AUTHOR: Dan Michaud

DATE: 02/22/88

DESCRIPTION : This procedure is used to insert a footnote separator at the
    bottom of the page currently being built in the output document. The
    footnote separator is a solid line which is made up of a line of spaces with
    the underline attribute applied. This solid line is followed by a single
    blank line (i.e. a carriage return). If the separator length is zero
    the separator is consisted of a blank line followed by another blank line
    (i.e. 2 blank lines).
```

```
C FUNCTION DEFINITION

ERROR ODinssep ()

INPUT
    None

OUTPUT
    None

ERRORS
    SII errors are returned to the Main Driver

**************************************************************************/ include <ODINS.H>

EXPORT ERROR  ODinssep()

$

IMPORT   ERROR    DMvisset();
    IMPORT   ERROR    DMpgend();
    IMPORT   ERROR    DMchins();
    IMPORT   TEXT     *STbcopy();
    IMPORT   TEXT     ODinsfmt();
    IMPORT   PPS      pps;

/* Declarations */
    USHORT   testbyte;
    TEXT     chr;
    UTINY    cnt;
    DMLPB    beginpb;
    DMLPB    endpb;

/* First see if have to insert a single column format reference. */    -114-
    /* and insert it if necessary */
    if (ODinsfmt() != ERSUCCESS)
        return (ERget());

/* Get the footnote separator length from the PPS */
    cnt = pps.sepcnt;

if (cnt == 0)
        $                           /* if separator line count is 0 */
        chr = (TEXT)DMLCHRETURN;        /* put in a blank line (return) */
        cnt = 1;                    /* make the count = 1 */
        é
    else
        $
        chr = ' ';                  /* otherwise, we'll put in spaces */
                                    /* and use 'cnt' as it is.    */
        é

/* Next, find the end of the current page */
    if (DMpgend(curpage, &endpb) != ERSUCCESS)
        return (ERget());

/* copy 'endpb' to 'beginpb' */
    STbcopy((USHORT)sizeof(DMLPB), (TEXT *)&endpb, (TEXT *)&beginpb);

/* Apply the character per the separator count */
    while (cnt != 0)
        $
        if (DMchins(&endpb, chr) != ERSUCCESS)  /* insert a char */
            return (ERget());                   /* decrement count */
        --cnt;
        é

/* If the string just inserted was a string of spaces, */
    /* Apply the underscore attribute to all the spaces, and append a return. */
    if (chr == ' ')         /* if we inserted spaces */
        $
```

```
        if (DMvisset(&beginpb, &endpb, DMLTVUNDER, NULL) != ERSUCCESS)
            return (ERget());      /* apply the underscore */ if (DMpgend(curpage, &endpb) != ERSUCCESS)
            return (ERget());                      /* get the end of page */ if (DMchins(&endpb, DMLCHRETURN) != ERSUCCESS)   /* insert the return following */
            return (ERget());                            /* the separator */
        é

/* Now add a blank line after the separator */
   if (DMpgend(curpage, &endpb) != ERSUCCESS)
       return (ERget());                       /* get the end of page */ if (DMchins(&endpb, DMLCHRETURN) != ERSUCCESS)   /* insert blank line following */
       return (ERget());                            /* the separator */ return ERSUCCESS;

é
```

```
                                  A0000001

FILE A0000001 IN LIBRARY #ASCTEMP ON VOLUME SYSTEM
      10:40:46 AM    DECEMBER 11, 1989           57 LINES       1 COPY
                      BY USER IWS (AT WORKSTATION 100)
                PRINT CLASS R     FORM# 000    PRINTER 14
```

```
/*****************************************************************
Copyright (c) 1987 Wang Laboratories, Inc.  All rights reserved PROJECT: WP Plus Footnote/Repagination Background Utility COMPONENT: ODqinit - Initialize the footnote queue.

AUTHOR: Dan Michaud

DATE: 03/15/88
```

---

DESCRIPTION : This procedure is used to initialize the footnote queue for the
              Footnote/Repagination Background Utility.

---

C FUNCTION DEFINITION

ERROR ODqinit

INPUT
  none

OUTPUT
  None

ERRORS
  SII errors are returned to the Main Driver

```
******************************************************************/ include <ODINS.H>

EXPORT ERROR   ODqinit()

$

/* Initialize the FOOTNOTE QUEUE CONTROL BLOCK */
fnqcb.status  = ERSUCCESS;          /* start with success */
fnqcb.itemsize = sizeof(FNQELEM);   /* size of a queue element */
fnqcb.memsize = 8192;               /* size of heap for all elements */
                                    /* allocate space and store pointer */
if (HPalloc(fnqcb.memsize, &fnqcb.memstart) != ERSUCCESS)
    return(ERget());
```

```
fnqcb.nextin = 0;                /* next element number to go on queue */
fnqcb.maxitems = fnqcb.memsize / fnqcb.itemsize;  /* max number of elements */
fnqcb.dfid = 0;                  /* DFpack id for paging file */
fnqcb.lastpage = 0;              /* last logical page in paging file */ return ERSUCCESS;

}
```

```
*****************************************************************
*****************************************************************
                             A0000001

FILE A0000001 IN LIBRARY #ASCTEMP ON VOLUME SYSTEM
     10:41:34 AM    DECEMBER 11, 1989          249 LINES       1 COPY
                   BY USER IWS (AT WORKSTATION 100)
              PRINT CLASS R    FORM# 000    PRINTER 14

*****************************************************************
*****************************************************************
/****************************************************************
Copyright (c) 1987 Wang Laboratories, Inc.  All rights reserved PROJECT: WP Plus Footnote/Repagination Background Utility COMPONENT: ODqprint - Queue the Repaginated Output Document for printing AUTHOR: Dan Michaud

DATE: 03/24/88
```

---

DESCRIPTION : This procedure is called within the Output Driver by procedure
    ODfinish.  Its purpose is to queue the repaginated Output Document for
    printing.  It makes use of the VS usersub 'LINK' subroutine.

NOTE - this procedure is written for Background Repagination, running on
           a VS.  This procedure cannot be used when porting repagination to
           PC WP Plus.

---

```
C FUNCTION DEFINITION

ERROR ODqprint ()

ERRORS
   SII errors are returned to the Main Driver

*****************************************************************/ include <ODINS.H>

/******************** dgm 1/31/89  Fix bug QA0081 ****************/
TEXT    xv[3] = "XV";   /* for extract of system volume */
TEXT    ov[3] = "OV";   /* for extract of default output volume */

/* Needed for PUTPARM to PRTPLUS.  Sets up Document ID, LIBRARY and VOLUME */
TEXT    PNAME1[] = "INPUT1  ";
INT     PCNT3    = 3;
TEXT    KW1[]    = "DOCUMENT";
TEXT    KV1[]    = "        ";
INT     KW1L     = 8;
TEXT    KW2[]    = "LIBRARY ";
TEXT    KV2[]    = "TEMPDOC ";
INT     KW2L     = 8;
TEXT    KW3[]    = "VOLUME  ";
/* TEXT  KV3[]   = "SYSTEM"; */      /* dgm 1-31-89 fix bug QA0081 */
TEXT    KV3[]    = "        ";       /* dgm 1-31-89 fix bug QA0081 */
INT     KW3L     = 6;

/* Needed for PUTPARM to PRTPLUS.  Sets up Options Screen */
TEXT    POPT[]    = "OPTIONS ";
TEXT    KWWWW1[]  = "ERRFLAG ";
TEXT    KVVVV1    = 'B';
INT     KWWWW1L   = 1;
```

```
/* Needed for PUTPARM to PRTPLUS.  Used to 'Exit' Input1 Screen */
TEXT    PNAMEEX[]  = "INPUT1  ";
INT     PCNT0      = 0;

TEXT    PFKEYV     = 'P';

/* Needed for PUTPARM to PRTPLUS.  Sets up a password for security */
TEXT    PNAME2[]   = "INPUT2  ";
INT     PCNT2      = 2;
TEXT    KWW1[]     = "FIELD1  ";
TEXT    KVV1[]     = "CONTINUE";
INT     KWW1L      = 8;
TEXT    KWW2[]     = "FIELD2  ";
TEXT    KVV2       = 'F';
INT     KWW2L      = 1;

/* Needed as PUTPARM to PRTPLUS.  Does a Delete after printing */
TEXT    PNAMED[]   = "PRINT1  ";
INT     PCNT1      = 1;
TEXT    KWWW1[]    = "DELETE  ";
TEXT    KVVV1      = '1';
TEXT    KVVV0      = '0';
INT     KWWW1L     = 1;

/* Needed for LINK to PRTPLUS */
TEXT    MSGPROG[]  = "WPNOTIFY";
TEXT    PROGNAME[] = "PRTPLUS ";
TEXT    LINKTYPE   = 'S';
TEXT    LIBRARY[]  = "@SYSTEM@";
/*      TEXT    VOLUME[] = "SYSTEM  ";  */  /*** dgm 1-31-89  fix bug QA0081 ***/
TEXT    VOLUME[]   = "        ";           /*** dgm 1-31-89  fix bug QA0081 ***/
TEXT    SPECOPT    = ' ';
TEXT    EXTOPT[]   = "  ";
TEXT    CANFLAG    = ' ';
TEXT    MSG[]      = "CANCEL Repagination";
INT     MSGLEN     = 19;
TEXT    HELPFLAG   = 'H';
TEXT    JUNK[]     = "  ";
TEXT    CANINFO[256];
INT     CANLEN     = 256;
INT     COMPCODE;

/* Needed for PUTPARM to WPNOTIFY */
TEXT    TYPED      = 'D';
TEXT    TYPEE      = 'E';
INT     PRBCNT     = 1;
TEXT    PRNAME[]   = "DETAILS ";
INT     KEYCNT     = 2;
TEXT    KSENDER[]  = "SENDER  ";
TEXT    VSENDER[]  = "WPPLUS";
INT     LSENDER    = 6;
TEXT    KLINE1[]   = "LINE1   ";
TEXT    VLINE1[]   = "Link to Print Plus failed with error   ";
INT     LLINE1     = 39;

EXPORT ERROR  ODqprint()

$

/* imports */
IMPORT  cle   VOID  LINK();
IMPORT  cle   VOID  PUTPARM();

IMPORT  cle   VOID  EXTRACT();     /**** dgm 1-31-89  fix bug QA0081 ****/

/* dgm 9-19-88 */
IMPORT  VOID   STcfill();
IMPORT  USHORT STclength();
IMPORT  TEXT   *STbcopy();

/* declarations */
INT     RETCODE;

TEXT    *ptr;

/* dgm 9-19-88 */
USHORT  liblen;
```

```
USHORT   vollen;
TEXT     *ptr2;         /* dgm 1-31-89 */

/********* dgm 1-31-89   fix bug QA0031 *************/
/* Extract the system volume for the LINK to PRTPLUS */
EXTRACT (xv[0], VOLUME[0]);
/****************************************************/

/* Set up the correct DOCUMENT ID for the PUTPARM */
/* dgm 9-19-88  ODcreidx and ODcretmp set this up, just overwrite */
/*              the blanks.                                       */
ptr = MDvars->gps->application.wp.rep_id;
STbcopy (8, (TEXT *)ptr, (TEXT *)&KV1[0]);

/***************** dgm 1-31-89   fix bug QA0081 ********************/
/* Extract the default output volume for the PUTPARM (Input 1 Screen) */
EXTRACT (ov[0], KV3[0]);                    /* default output volume */
ptr2 = &KV3;
if (*ptr2 == ' ')                           /* if no default,         */
   $
   EXTRACT (xv[0], KV3[0]);                 /* extract the system volume. */
   é
/********************************************************************/

/* dgm 9-19-88 */
/* if user chose to 'Output to Printer' and 'Output to New Doc.' */
/* overwrite 'SYSTEM' and 'TEMPDOC' with the volume and library */
/* previously saved in ODcreidx.                                 */
if (MDvars->gps->application.wp.repag_to_loc == WP_BOTH_REPAG)
   $
   STcfill((USHORT)8, (TEXT)' ', (TEXT *)&KV2[0]); /* blank the library */
   STcfill((USHORT)6, (TEXT)' ', (TEXT *)&KV3[0]); /* blank the volume  */
   liblen = STclength(&MDvars->gps->application.wp.rep_lib_name);
   STbcopy(liblen, (TEXT *)&MDvars->gps->application.wp.rep_lib_name,
           (TEXT *)&KV2[0]);
   vollen = STclength(&rep_vol[0]);
   STbcopy(vollen, (TEXT *)&rep_vol[0],
           (TEXT *)&KV3[0]);
   é

/* This PUTPARM sets up the password to bypass security */
PUTPARM(TYPEE, PRBCNT, PNAME2[0], PCNT2,
        KWW1[0], KVV1[0], KWW1L,
        KWW2[0], KVV2, KWW2L, RETCODE);

/* This PUTPARM sets up the Document ID, Library and Volume (Input1 screen) */
PUTPARM(TYPEE, PRBCNT, PNAME1[0], PCNT3,
        KW1[0], KV1[0], KW1L,
        KW2[0], KV2[0], KW2L,
        KW3[0], KV3[0], KW3L, RETCODE);

/*This PUTPARM invokes PF key 16 (Exit key) upon completion of Input1 Screen*/
PUTPARM(TYPEE, PRBCNT, PNAMEEX[0], PCNT0,
        PFKEYV, RETCODE);

/* PUTPARM for 'Print1 Screen' to delete doc. after printing. */
/* dgm 9-19-88  NOTE - delete after print if 'Output to Printer' only */
if (MDvars->gps->application.wp.repag_to_loc == WP_PTR_REPAG)
   $
   /* If 'Output to printer' use value of '1' (KVVV1) to delete after print */
   PUTPARM(TYPEE, PRBCNT, PNAMED[0], PCNT1,
        KWWW1[0], KVVV1, KWWW1L, RETCODE);
   é
else
   $
   /*if both 'New Doc.' and 'Printer' use value of '0' (KVVV0) to not delete*/
   /* after print since we are printing the document that was created as the*/
   /* next available ID in the specified library */
   PUTPARM(TYPEE, PRBCNT, PNAMED[0], PCNT1,
        KWWW1[0], KVVV0, KWWW1L, RETCODE);
   é

/* PUTPARM for 'Options Screen' */
PUTPARM(TYPEE, PRBCNT, POPT[0], PCNT1,
        KWWWW1[0], KVVVV1, KWWWW1L, RETCODE);

/* Link to PRTPLUS (Print Plus) program dynamically */
LINK(PROGNAME[0], LINKTYPE, LIBRARY[0], VOLUME[0], SPECOPT, NULL,
     CANFLAG, MSG[0], MSGLEN, HELPFLAG, *JUNK, CANINFO[0],
     CANLEN, COMPCODE, RETCODE);
```

```
/* if link to PRTPLUS was successful */
if (COMPCODE == 0)
   return ERSUCCESS;

/* if link failed, notify the user */
else
   $
   if (COMPCODE == 8)  /* if unsuccessful link */
      $
      /* Convert link error to acsii in msg text */
      itoa(RETCODE, &VLINE1[37]);   /* MICROSOFT C 5.0 STANDARD FUNCTION */

/* Do the PUTPARM before linking to WPNOTIFY */
      PUTPARM(TYPEE, PRBCNT, PRNAME[0], KEYCNT,
              KSENDER[0], VSENDER[0], LSENDER,
              KLINE1[0], VLINE1[0], LLINE1, RETCODE);

/* Link to WPNOTIFY */
      LINK(MSGPROG[0], LINKTYPE, LIBRARY[0], VOLUME[0], COMPCODE, RETCODE);
      é
   é

é

*****************************************************************************
*****************************************************************************
                               A0000001

FILE A0000001 IN LIBRARY #ASCTEMP ON VOLUME SYSTEM
   10:42:02 AM    DECEMBER 11, 1989              136 LINES       1 COPY
                     BY USER IWS (AT WORKSTATION 100)
              PRINT CLASS R     FORM# 000     PRINTER 14

*****************************************************************************
*****************************************************************************

/****************************************************************************
Copyright (c) 1987 Wang Laboratories, Inc. All rights reserved PROJECT: WP Plus Footnote/Repagination Background Utility COMPONENT: ODsfidft - Output Driver apply footnote ID style to footnote Text procedure AUTHOR: Dan Michaud

DATE: 02/23/88
```

---

DESCRIPTION : This procedure is used to apply the appropriate style to a footnote ID in footnote
   The calling routine is responsible for passing the correct beginning and ending
   PBs for the range of the ID which will have the style applied. This routine
   will check the GPS and apply the appropriate style over the range specified
   by the beginning and ending PBs. Currently, there are 5 styles that may be
   applied: BOLD, FONT, SUPERSCRIPT, SUBSCRIPT and UNDERSCORE. Any combination
   of these may be used. However SUPERSCRIPT and SUBSCRIPT may not be used
   together.

---

```
C FUNCTION DEFINITION

ERROR ODsfidft (pb1ptr, pb2ptr)

INPUT
   pb1ptr    PB pointing to first character to which attribute is to be applied
   pb2ptr    PB pointing to last character to which attribute is to be applied OUTPUT
   None ERRORS
   SII errors are returned to the Main Driver

*****************************************************************************/
```

```
#include <ODINS.H>

EXPORT ERROR  ODsfidft(pb1ptr, pb2ptr)
DMLPB   *pb1ptr;
DMLPB   *pb2ptr;

S

IMPORT   ERROR   DMvisset();

/* Declarations */
UTINY    odstyle;
USHORT   fnfont;

/***** dgm 2-6-89 fix bug QA0086 ******/
BOOL     done;
TEXT     chr;
DMLPB    temppb;
IMPORT   ERROR    DMchget();
IMPORT   ERROR    DMchadvance();
IMPORT   ERROR    DMchbackup();
IMPORT   TEXT     *STbcopy();

odstyle = MDvars->gps->application.wp.fn_id_fstyle;
if ((odstyle & (FTBSUPER)) == FTBSUPER)
   S
   /* Apply the style to the range of text */
   if (DMvisset(pb1ptr, pb2ptr, DMLTVSUPER, NULL) != ERSUCCESS)
      return (ERget());
   é odstyle = MDvars->gps->application.wp.fn_id_fstyle;
if ((odstyle & (FTBSUB)) == FTBSUB)
   S
   /* Apply the style to the range of text */
   if (DMvisset(pb1ptr, pb2ptr, DMLTVSUB, NULL) != ERSUCCESS)
      return (ERget());
   é odstyle = MDvars->gps->application.wp.fn_id_fstyle;
if ((odstyle & (FTBUNDER)) == FTBUNDER)
   S
   /*******************************************************/
   /** dgm 2-6-89 fix bug QA0086 (Don't apply underscore to slashes / if (DMchget(pb1ptr, &chr) != ERSUCCESS)
      return (ERget());

if (chr == '/')
      S
      if (DMchadvance(pb1ptr) != ERSUCCESS)
         return (ERget());
      é if (DMchget(pb2ptr, &chr) != ERSUCCESS)
      return (ERget());

if (chr == '/')
      S
      if (DMchbackup(pb2ptr) != ERSUCCESS)
         return (ERget());
      é if (DMvisset(pb1ptr, pb2ptr, DMLTVUNDER, NULL) != ERSUCCESS)
       return (ERget());
   é
   /*******************************************************/ odstyle = MDvars->gps->application.wp.fn_id_fstyle;
if ((odstyle & (FTBBOLD)) == FTBBOLD)
   S
   /* Apply the style to the range of text */
   if (DMvisset(pb1ptr, pb2ptr, DMLTVBOLD, NULL) != ERSUCCESS)
      return (ERget());
   é odstyle = MDvars->gps->application.wp.fn_id_fstyle;
if ((odstyle & (FTBFONT)) == FTBFONT)
   S
```

```
    if (MDvars->gps->application.wp.fn_id_ffont_flg)
        $
        /* get the font number */
        fnfont = (USHORT)MDvars->gps->application.wp.fn_id_ffont;
        /* apply the style to the range of text */
        if (DMvisset(pb1ptr, pb2ptr, DMLTVFONT, (DMLVISDATA*)&fnfont) != ERSUCCESS)
            return (ERget());
        é
    é return ERSUCCESS;

é
```

*********************************************************************************
*********************************************************************************

A0000001

FILE A0000001 IN LIBRARY #ASCTEMP ON VOLUME SYSTEM
    10:42:32 AM     DECEMBER 11, 1989              132 LINES         1 COPY
                        BY USER IWS (AT WORKSTATION 100)
                 PRINT CLASS R     FORM# 000     PRINTER 14

*********************************************************************************
*********************************************************************************

```
/*********************************************************************************
Copyright (c) 1987 Wang Laboratories, Inc.  All rights reserved PROJECT: WP Plus Footnote/Repagination Background Utility COMPONENT: ODsfidmt - Output Driver apply footnote ID style to Main Text procedure AUTHOR: Dan Michaud

DATE: 02/23/88
```

---

DESCRIPTION : This procedure is used to apply the appropriate style to a footnote ID in Main Tex
   The calling routine is responsible for passing the correct beginning and ending
   PBs for the range of the ID which will have the style applied.  This routine
   will check the GPS and apply the appropriate style over the range specified
   by the beginning and ending PBs.  Currently, there are 5 styles that may be
   applied: BOLD, FONT, SUPERSCRIPT, SUBSCRIPT and UNDERSCORE.  Any combination
   of these may be used.  However SUPERSCRIPT and SUBSCRIPT may not be used
   together.

---

```
C FUNCTION DEFINITION

ERROR ODsfidmt (pb1ptr, pb2ptr)

INPUT
   pb1ptr    PB pointing to first character to which attribute is to be applied
   pb2ptr    PB pointing to last character to which attribute is to be applied OUTPUT
   None ERRORS
   SII errors are returned to the Main Driver

*********************************************************************************/ include <ODINS.H>

EXPORT ERROR  ODsfidmt(pb1ptr, pb2ptr)
DMLPB   *pb1ptr;
DMLPB   *pb2ptr;

$

IMPORT   ERROR   DMvisset();
```

```
/* Declarations */
UTINY    odstyle;
USHORT   fnfont;

/******* dgm 2-6-89 fix bug QA0086 ******/
BOOL     done;
TEXT     chr;
DMLPB    temppb;
IMPORT   ERROR   DMchget();
IMPORT   ERROR   DMchadvance();
IMPORT   TEXT    *STbcopy();

odstyle = MDvars->gps->application.wp.fn_id_mstyle;
if ((odstyle & (FTBSUPER)) == FTBSUPER)
    {
    /* Apply the style to the range of text */
    if (DMvisset(pb1ptr, pb2ptr, DMLTVSUPER, NULL) != ERSUCCESS)
        return (ERget());
    } odstyle = MDvars->gps->application.wp.fn_id_mstyle;
if ((odstyle & (FTBSUB)) == FTBSUB)
    {
    /* Apply the style to the range of text */
    if (DMvisset(pb1ptr, pb2ptr, DMLTVSUB, NULL) != ERSUCCESS)
        return (ERget());
    } odstyle = MDvars->gps->application.wp.fn_id_mstyle;
if ((odstyle & (FTBUNDER)) == FTBUNDER)
    {
    /**************************************************************/
    /**** dgm 2-6-89 Fix bug QA0086 don't apply underscore to slash ****/
    done = FALSE;
    STbcopy((USHORT)sizeof(DMLPB), (TEXT *)pb1ptr, (TEXT *)&temppb);
    while (done != TRUE)
        {
        if (DMchget(&temppb, &chr) != ERSUCCESS)   /* get a char. */
            return (ERget());
        if (chr != '/')                            /* if it's not a slash */
            {                                      /* apply the underscore */
            if (DMvisset(&temppb, &temppb, DMLTVUNDER, NULL) != ERSUCCESS)
                return (ERget());
            }
        done = DMpbcompare(&temppb, pb2ptr);       /* see if we are done */
        if (done == FALSE)                         /* if not done */
            {
            if (DMchadvance(&temppb) != ERSUCCESS)  /* move to next char. */
                return (ERget());
            }
        }
    /**************************************************************/
    } odstyle = MDvars->gps->application.wp.fn_id_mstyle;
if ((odstyle & (FTBBOLD)) == FTBBOLD)
    {
    /* Apply the style to the range of text */
    if (DMvisset(pb1ptr, pb2ptr, DMLTVBOLD, NULL) != ERSUCCESS)
        return (ERget());
    } odstyle = MDvars->gps->application.wp.fn_id_mstyle;
if ((odstyle & (FTBFONT)) == FTBFONT)
    {
    if (MDvars->gps->application.wp.fn_id_mfont_flg)
        {
        /* get the font number */
        fnfont = (USHORT)MDvars->gps->application.wp.fn_id_mfont;
        /* Apply the style to the range of text */
        if (DMvisset(pb1ptr, pb2ptr, DMLTVFONT, (DMLVISDATA*)&fnfont) != ERSUCCESS)
            return (ERget());
        }
    } return ERSUCCESS;
}
```

We claim:

1. In a word processing system for reviewing an original document containing lines of body and footnote texts and for preparing a final multipage output document with pages having (i) body text, (ii) footnote references within the body text, and (iii) for each footnote reference, footnote text corresponding to that footnote reference, apparatus which responds to footnote references each having corresponding footnote text that extends across plural pages in which at least one other footnote reference appears in the body text of one of said plural pages, said apparatus comprising:

driver means for assembling a page of the output document, for each page the driver means building that page with a combination of (i) body text including any desired footnote references and (ii) footnote text corresponding to the footnote references in the body text; and a processor routine responsive to footnote text corresponding to each footnote reference and executed by the drive means to direct the driver means to assemble each page in accordance with first style requirements including (i) having at least one line of body text appear on the page, (ii) for each footnote reference having corresponding footnote text extending across the page, having at least two lines of the corresponding footnote text appear on the page, and (iii) for each footnote reference in the body text of the page, having at least a portion of corresponding footnote text appear on that page.

2. The apparatus of claim 1 wherein the processor routine further directs the driver means to build the page also in accordance with second style requirements in which lines of footnote text extending across the page are given priority over any subsequent lines of body text and are inserted on the page in order of respective footnote reference.

3. In a word processing system for reviewing an original document containing lines of body and footnote texts and for preparing a final multipage output document wherein pages have both body and footnote text appearing on them, a method for building each page of the output document comprising the steps of:

for each page, assembling the page with (a) at least one line of body text including desired footnote references, and (b) at least a portion of footnote text corresponding to footnote references in the line of body text; and responding to each footnote reference appearing in the body text of a respective page and having corresponding footnote text that extends beyond said respective page, by having at least two lines of the corresponding footnote text appear on consecutive pages succeeding the respective page, so that each page is built in accordance with first style requirements including (i) having at least one line of body text appear on the page, (ii) for each footnote reference having corresponding footnote text extending across the page, having at least two lines of the corresponding footnote text appear on the page, and (iii) for each footnote reference in the body text of the page, having at least a portion of corresponding footnote text appear on that page.

4. The method of claim 3 further including the step of, for each page, assembling the page also in accordance with second style requirements including giving a set of lines of footnote text extending across the page from previous pages priority over subsequent lines of body text for the page, and inserting the set of lines of footnote text on the page in order of respective corresponding footnote reference.

5. In a word processing system for preparing a final output document from an original document, footnote processing apparatus comprising:

a driver for assembling pages of the final output document from lines of body text, footnote references within lines of body text and lines of footnote text corresponding to the footnote references, for each page, the driver providing at least one line of body text, and for each or certain pages, the driver additionally providing lines of footnote text corresponding to at least one of (i) each footnote reference within the body text of the page, and (ii) at least one footnote reference within a body text of a previous page, the corresponding footnote text extending across plural pages, such that each of the certain pages has both body text and footnote text appearing on the page.

6. Apparatus as claim in claim 5 wherein footnote text corresponding to a footnote reference on one of the certain pages includes multiple lines, the driver providing at least two lines of the footnote text on the one page and for any remaining lines of the footnote text, the drive providing at least two lines on each of plural consecutive succeeding pages, such that the footnote text extends across plural pages and each of the plural consecutive succeeding pages has both body text and footnote text appearing on the page.

7. Apparatus as claimed in claim 6 further comprising a processor routine, the drive executing the processor routine such that on each of the plural consecutive succeeding pages the driver (a) initially provides one line of body text, (b) for each footnote reference in that line of body text, provides an initial two lines of footnote text corresponding to the footnote reference, and (c) provides as many remaining lines of the footnote text extending across the plural consecutive succeeding pages as will fit on the page such that the lines of footnote text which extend across plural pages are given priority over additional lines of body text on the page.

8. Apparatus as claimed in claim 5 wherein for each footnote reference in the body text f a page, the driver further assembles the page with at least two lines of corresponding footnote text.

9. Apparatus as claimed in claim 5 wherein for the lines of footnote text additionally provided by the driver, the driver assembles one of (i) at least two lines of footnote text and (ii) all lines of footnote text having a length less than two full lines and corresponding to a footnote reference within the body text of the page.

* * * * *